United States Patent [19]

Khaw

[11] Patent Number: 5,432,887
[45] Date of Patent: Jul. 11, 1995

[54] NEURAL NETWORK SYSTEM AND METHOD FOR FACTORY FLOOR SCHEDULING

[75] Inventor: Fook C. Khaw, Singapore, Singapore

[73] Assignee: Singapore Computer Systems, Singapore, Singapore

[21] Appl. No.: 31,954

[22] Filed: Mar. 16, 1993

[51] Int. Cl.⁶ .............................................. G06F 15/18
[52] U.S. Cl. ........................................ 395/11; 395/22; 395/23
[58] Field of Search .................... 395/11, 22, 73, 26

[56] References Cited

U.S. PATENT DOCUMENTS

| | | | |
|---|---|---|---|
| 4,727,487 | 2/1988 | Masui et al. | 395/11 |
| 5,040,123 | 8/1991 | Borber et al. | 395/904 |
| 5,235,673 | 8/1993 | Austvoid et al. | 395/22 |
| 5,311,421 | 5/1994 | Nomura et al. | 364/157 |

OTHER PUBLICATIONS

Rabelo et al, "Adaptive Scheduling and Control Using ANN and Expert Systems for a Hierarchical/Distributed FMS Architecture", Proc of Rensseloer's Int'l Conf on CIM, May 21–23 1990, pp. 538–545.
Zhang et al, "Solving Job-Shop Scheduling Problem with Priority Using Neural Network", 1991 IEEE Int'l Joint Conf on Neural Networks, Nov. 18–21 1991, pp. 1361–1366.
Foo et al, "Stochastic Neural Networks for Solving Job Shop Scheduling: Part I Problem Representation", IEEE Int'l Conf on Neural Networks, Jul. 24–27 1988, pp. 275–282.
Ghryssolouris et al, "The Use of Neural Networks in Determining Operational Policies for Manufacturing Systems", pp. 166–175.
Stottler et al, "Automatic Translation from an Expert System to a Neural Network Representation", Int'l Joint Conf on Neural Networks, Jun. 7–11 1992 pp. 13–20 vol. 1.
"The Gaussian Machine: A Stochastic Neural Network for Solving Assignment Problems", Akiyama et al., Journal of Neural Network Computer, pp. 43–51.
"Scaling Neural network for Job-Shop Scheduling", Zhou et al, Abstract Paper of Dept. of Energy and Transportation.
Using the Taguchi Paradigm for Manufacturing System Design Using Simulation Experiments, R. J. Mayer, Computers Ind. Engng., vol. 22, No. 2, pp. 195–209.
"Stochastic Neural Networks for Solving Job–Shop Scheduling: Part 1. Problem Presentation", Foo et al., University of S. Carolina Abstract Paper.
Job Shop Scheduling by Simulated Annealing, paper by Peter J. M. Van Laarhoven Centre for Quantitative Methods, Nederlandse Philips.
A Goal Programming Network for Mixed Integer Linear Programming: A Case Study for the Job-Shop Scheduling Problem, Int. Jrnl of Neural Systems, 2:3, 201–209.
A Timetable Scheduling Using Neural Networks with Parallel Implementation on Transputers, Lim et al., Inst of Systems Science.
The Use of Neural Networks in Determining Operational Policies for Manufacturing Systems, Ghryssolouris et al., pp. 166–175.
Scheduling for Minimizing Total Actual Flow Time by Neural Networks Arizono et al., Int. Jrn. Prod. Res., 1992, vol. 30, No. 3 pp. 503–511.

Primary Examiner—Allen R. MacDonald
Assistant Examiner—Stuart B. Shapiro
Attorney, Agent, or Firm—Steven F. Caserza; Flehr Hohbach Test Albritton and Herbert

[57] ABSTRACT

Methods are developed on a digital computer for performing work order scheduling activity in a dynamic factory floor environment, in a manner which enables scheduling heuristic knowledge from a scheduler to be encoded through an adaptive learning process, thus eliminating the need to define these rules explicitly. A sequential assignment paradigm incrementally builds up a final schedule from a partial schedule, assigning each work order to appropriate resources in turns, taking advantage of the parallel processing capability of neural networks by selecting the most appropriate resource combination (i.e. schedule generation) for each work order under simultaneous interaction of multiple scheduling constraints.

34 Claims, 28 Drawing Sheets

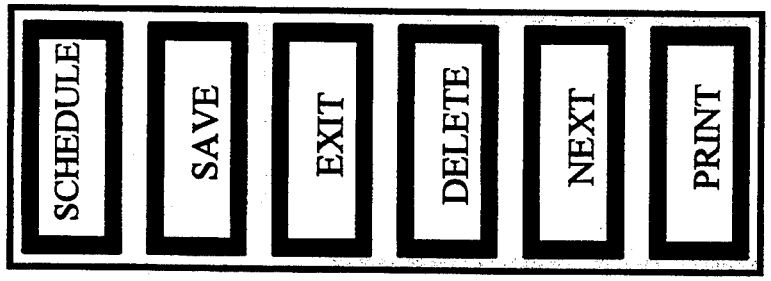
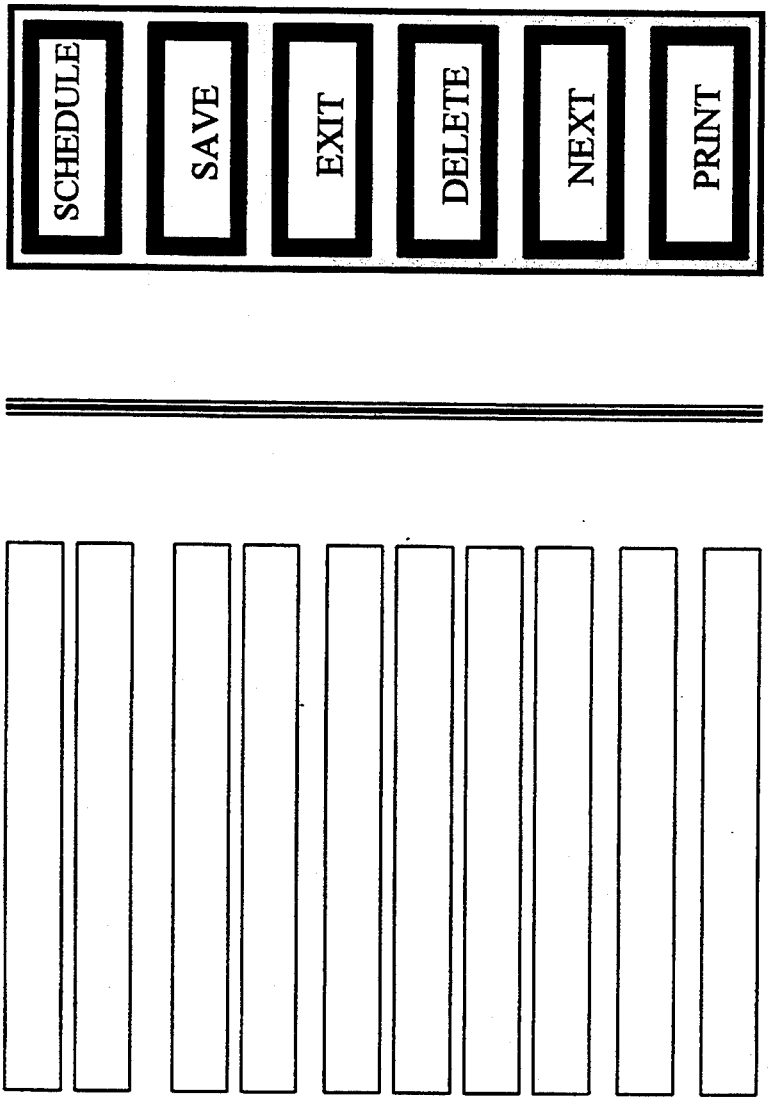
Figure 2

PART SCREEN

| SAVE | CANCEL | EXIT | DELETE | NEXT | PRINT |

PART NUMBER 910:

FAMILY GROUP:

FAMILY GP PRIORITY:

COMPONENT GROUP:

SETUP HOUR:

SETUP REDUCTION:

RUN HOUR:

LOT SIZE:

TOOLING:

Figure 3

NEURAL NETWORK SYSTEM AND METHOD FOR FACTORY FLOOR SCHEDULING

BACKGROUND

This invention pertains to neural network technology, and more specifically, to a novel neural network system and method for scheduling manufacturing resources in a dynamic factory floor environment. Factory floor scheduling involves building a schedule by assigning manufacturing resources (i.e. start and end times and machines) to each operation of a work order (also known as production, job, or manufacturing orders) which is subjected to a set of production constraints (e.g. resource requirements, quality standards, priority of customer, etc.). FIG. 1 shows, in block diagram form, key concepts concerning factory floor scheduling process. Referring now to FIG. 1, work orders 810 which represent demands from customers together with production constraints 850 such as machine workload and performance goals, etc. are input to drive scheduling process 800 to produce a feasible factory floor schedule 860.

FIG. 2 shows a screen of the data which work order 810 may contain. Typically these data are entered by a production planner into a database. Data related to work order 810 can then be retrieved from the database for use by scheduling process 800. An example of these related data is depicted in the example of a Part Data Screen, as shown in FIG. 3. Given part number 910 from work order 810, data relevant to part number 910, such as family group it belongs to, standard lot size, run hours, tooling required, etc., are then retrieved from the database and used in scheduling process 800 (FIG. 1). The output of scheduling process 800 is a factory floor schedule 860 which is normally represented in the form of a Gantt chart. An example of such a Gantt chart is shown in FIG. 4. It is to be understood that FIGS. 2, 3, and 4 are merely examples for purposes of illustration.

For the past three decades, numerous methods such as MRP II 830 (for example, refer to Kanet, "MRP 96: Time to Rethink Manufacturing Logistics", Production and Inventory Management journal, 2nd Quarter, 1988), and simulation 840 (for example, refer to MacFarland, "Shop Floor Scheduling and Control Using Simulation Technology," Integrated Manufacturing, May 1990) as as shown in FIG. 1 have been developed to tackle scheduling problems on the factory floor. However, most of these prior art methods are not designed for scheduling in a dynamic factory floor environment. In reality, all factory floors are dynamic. This is because there are just too many variables and factors both on the factory floor and from marketing for a production schedule to be valid for an entire day or even a single shift. For example, machine breakdown, operator and tooling availability, and changes in the demand and order requirements all contribute to scheduling and factory floor problems. Because a schedule is generated as a plan to utilize given resources, conflicts result when resource changes occur. Therefore a good factory floor scheduling system must be able to adjust the schedule to accommodate unexpected situations, changes in order requirements, and other environmental conditions. MRP II 830 systems as shown in FIG. 1 are the most popular production scheduling tools for multi-product, small lot size job shop production environment. Despite its popularity, the MRP II 830 system has not been widely used as a scheduling tool in the dynamic factory floor due to its many deficiencies.

Other approaches to dynamic factory floor scheduling tend to be too rigid and too complicated to be applicable in a reallife scheduling environment. Simulation 140 technique as shown in FIG. 1, for example, require accurate problem formulation to make a sharp distinction between constraints (which must be satisfied) and costs. A solution which achieves a very low cost but violates one or two constraints is simply not allowed. In a real-life scheduling environment, it is usually preferable to schedule work orders with the same part number together so that the number of machine setups can be reduced. But this is not an absolute constraint. It does not apply when a work order has different due date priority. These types of "soft" constraints are inherent in many scheduling environments and the optimal solution is the one which minimizes the total number violations of soft constraints.

Neural network technology is beginning to enjoy wide-spread popularity in recent years. Neural networks are mathematical models of human biological brain. They have powerful learning algorithms that allow an application system to learn from past examples. They also possess many unique and useful properties such as parallel processing, which offer a completely different computational paradigm as compared to other approaches. In the area of scheduling, several researchers have applied neural network technology to solve this type of problem. Most of these approaches typically attempt to solve scheduling problem of not more than ten work orders 810 by using an iterative improvement paradigm with a global objective function to be optimized to search for a near-optimal solution. Examples of such neural networks are simulated annealing or Gaussian machine (for example, please refer to Akiyama, et al., "The Gaussian Machine: A Stochastic Neural Network for Solving Assignment Problems," *Journal of Neural Network Computing, Winter* 1991). However these approaches suffer great limitation when facing real-life scheduling environment where at any time there can be as many as 300–500 existing and new work orders 810 to be scheduled.

SUMMARY OF THE INVENTION

The present invention provides methods which are developed on a digital computer for performing work order scheduling activity in a dynamic factory floor environment. The present invention enables scheduling heuristic knowledge from a scheduler to be encoded through an adaptive learning process, thus eliminating the need to define these rules explicitly. Unlike other neural network based scheduling system, the present invention uses a sequential assignment paradigm which incrementally builds up a final schedule from a partial schedule. This is achieved by assigning each work order to appropriate resources in turn. The present invention takes advantage of the parallel processing capability of neural networks by selecting the most appropriate resource combination (i.e. schedule generation) for each work order under simultaneous interaction of multiple scheduling constraints.

One embodiment of the system of this invention includes two main subsystems and methods. The first subsystem and method is designed to allow a system designer or a knowledge engineer to model the dynamic scheduling environment and to build up a scheduling knowledge base through a neural network learning process. It includes methods to build a simulator which functions as a automatic knowledge acquisition tool, methods to build a knowledge processor for encoding scheduling knowledge, methods to build a neural network for sequencing of work orders and methods to build a neural network for assigning resources to work orders.

The second subsystem is the actual scheduling system designed for use by a planner or a scheduler. It is developed after the first subsystem has built the knowledge bases. It includes a neural network module which consists of a sequencer including a neural network previously trained and a method for sequencing of work orders, a scheduling engine including a neural network previously trained for assigning resources to work orders, a competitive neural network and method for on-line scheduling and constraints propagation of manufacturing resources, and a knowledge processor for encoding and decoding of scheduling data. In addition, a user interface module, a database module, and a reports/charts module are also provided, allowing the users to conveniently interact with the subsystem.

BRIEF DESCRIPTION OF THE DRAWINGS

The present invention as defined by the claims is better understood with the text read in conjunction with the following drawings:

FIG. 2 is a representative example of a Work Order Entry Screen showing data that is contained in the screen.

FIG. 3 is a representative example of Part Data Screen which can be retrieved for a given part number associated with a work order 810 of FIG. 1.

DETAILED DESCRIPTION OF PREFERRED EMBODIMENTS

Figure 5:
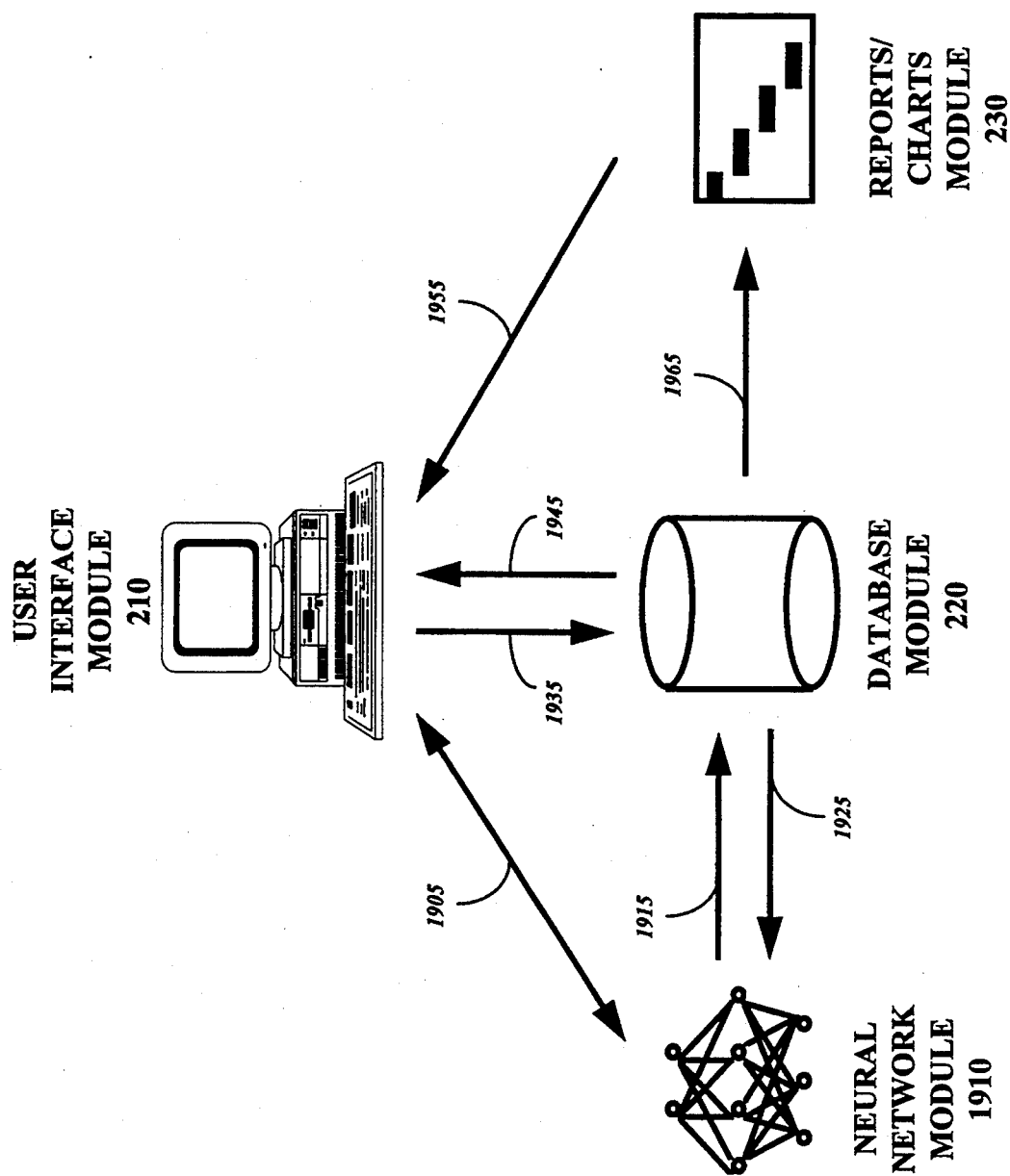
FIG. 5 is a representation of the architecture of one embodiment of the present invention.

In describing the preferred embodiments of the present invention, reference will first be made to FIG. 5. FIG. 5 is a high level block diagram which shows the major elements of one embodiment of the present invention. It should be understood that FIG. 5 is only a high level representation of the overall architecture of one embodiment of the present invention, which is intended to provide a reference point by which the preferred methods of operation of the present invention can be described.

As will be discussed in greater detail below, one embodiment of the present invention utilizes three neural networks to perform two major scheduling tasks: sequencing of work orders 810 (FIG. 1) to be scheduled according to their priority index which is calculated from a user-defined operational policy, and assignment of these work orders 810 to machines and start/end dates according to a set of scheduling constraints 850. As shown in FIG. 5, neural network module 1910, which consists of the three neural networks, receives inputs 1925 in the form of work orders 810 to be scheduled and constraint data 850 from database module 220, and produces output 1915 in the form of factory floor schedule 860 to database module 220.

Figure 4:
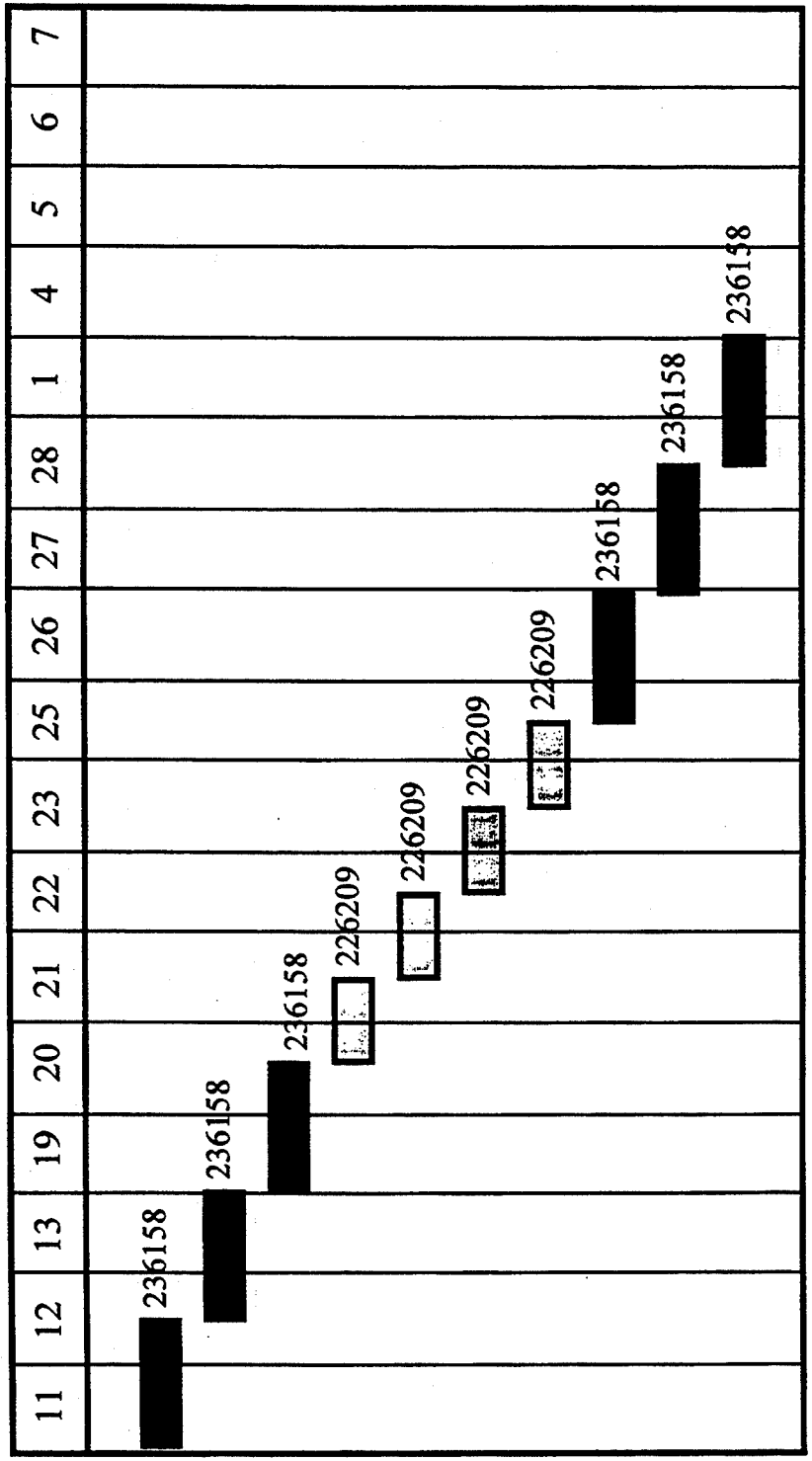
FIG. 4 is a representative example of a Gantt chart that represents a factory floor schedule 860 of FIG. 1.

Database module 220 is the location in which production data is stored. A user can retrieve existing data 1945 from and can input new data 1935 to database module 220. As shown in FIG. 5, data 1965 stored in database module 220 can also be used to generate meaningful production reports and/or Gantt charts by the reports/charts module 230 which can provide a tabular or graphical representation of scheduling output, such as the graphical representation shown in FIG. 4. In addition, the user may interact with neural network module 1910 directly when human intervention is desired during a scheduling process. This is shown in FIG. 5 as bi-directional interface 1905 between user interface module 210 and neural network module 1910.

Central to the present invention is the three neural networks contained in neural network module 1910 which is implemented in two stages. The first stage involves using a feedforward neural network to build a operational policy knowledge base and using a recurrent neural network to build a scheduling knowledge base through a training or learning process. The second stage involves using the trained feedforward neural network, the trained recurrent neural network and a competitive neural network to perform the two major scheduling tasks. A competitive neural network is a variation of feedforward architecture in which lateral inhibitory connections are allowed, and in which neurons both cooperate and compete with each other in order to carry out some task. An example of such connections is shown in inhibitory connection 1888 of FIG. 6.

In order to fully appreciate the various aspects and benefits produced by the present invention, a good understanding of neural network technology is required. For this reason, the following paragraphs discuss neural network technology as applicable to neural network module 1910 of the system and method of the present invention.

Essentially a neural network is a mathematical model of the human biological brain. It is usually implemented as a computer simulation model of a network of interconnected neurons. Although hardware implementation of neural networks is now possible, neural networks used in neural network module 1910 of the present invention are preferably conveniently provided as computer simulations which are used to solve the dynamic factory floor scheduling problem.

A neural network is a hierarchical collection of neurons, each of which may consist of five equations (summation, transfer, error, output, and learning functions) to compute results. Each neuron may receive multiple input values but produces only one output value. The outputs of neurons in a lower level layer are provided as inputs to the neurons of higher layers. The highest layer produces the final outputs.

Figure 6:
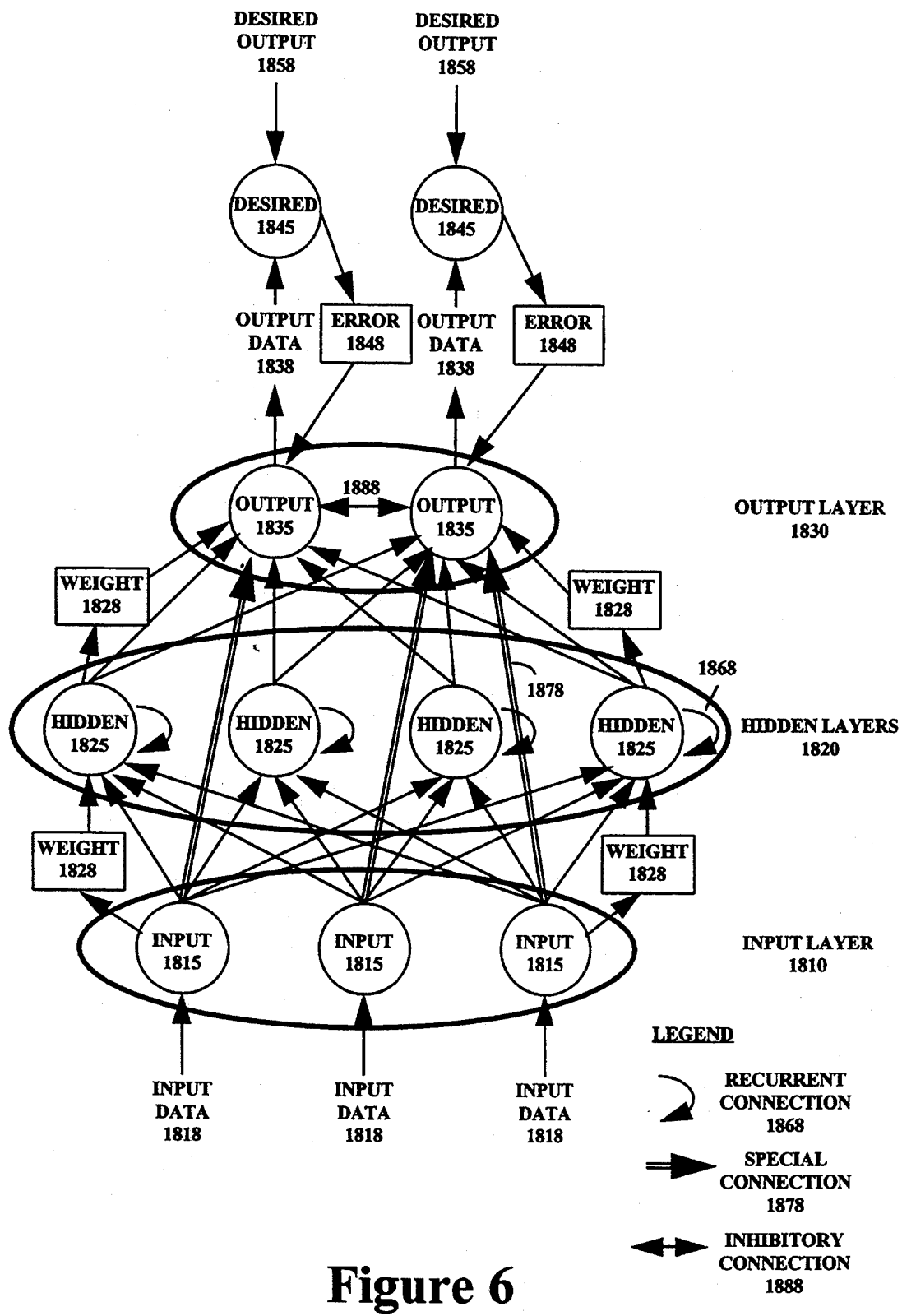
FIG. 6 shows a representative example of a neural network with learning capability.

FIG. 6 shows a representative example of a preferred form of a neural network 130 suitable for use by neural network module 1910 of the present invention. It should be noted that the example shown in FIG. 6 is merely illustrative of an embodiment of neural network module 1910. As discussed below, other embodiments for neural network module 1910 can be used. The embodiment of FIG. 6 has input layer 1810, hidden layer 1820, and output layer 1830. Input layer 1810 includes a layer of input neurons 1815 which take their values from external input data 1818.

Hidden layer 1820 includes a set of neurons 1825. The outputs of input neurons 1815 of input layer 1810 are used as inputs by each neuron 1825. More than one hidden layer 1820 can be used in the neural network, in which event subsequent hidden layers take the outputs from the previous hidden layer as their inputs. Output layer 1830 has a set of neurons 1835, which take the output of neurons 1825 (of the last hidden layer when more than one hidden layer is utilized) as their input values.

For each connection between layers 1810, 1820, and 1830, an adjustable variable called weight 1828 is defined. For purpose of illustration, only four weights 1828 are shown. However, each connection between layers 1810, 1820, and 1830 has an associated weight. Weights 1828 determine how much relative effect an input value has on the output value for a neuron. When a neuron uses its own output value in a layer, the neuron is said to have a recurrent connection 1868 as shown in FIG. 6. When each neuron in a source layer connects to all neurons in the destination layer, the two layers are said to be fully connected. When each neuron in the source layer connects to the neuron in the destination layer in corresponding position, the two layers are said to be correspondingly connected. Sometimes it is desirable to connect specific neurons in different layers to enforce certain relations; this type connection is called a special connection 1878, as shown in FIG. 6.

Having discussed the basics of neural network technology, reference will now be made in detail to a presently preferred embodiment of this invention, an example of which is illustrated in the accompanying drawings.

1. Knowledge Acquisition 105 and Simulator 110

Figure 7:
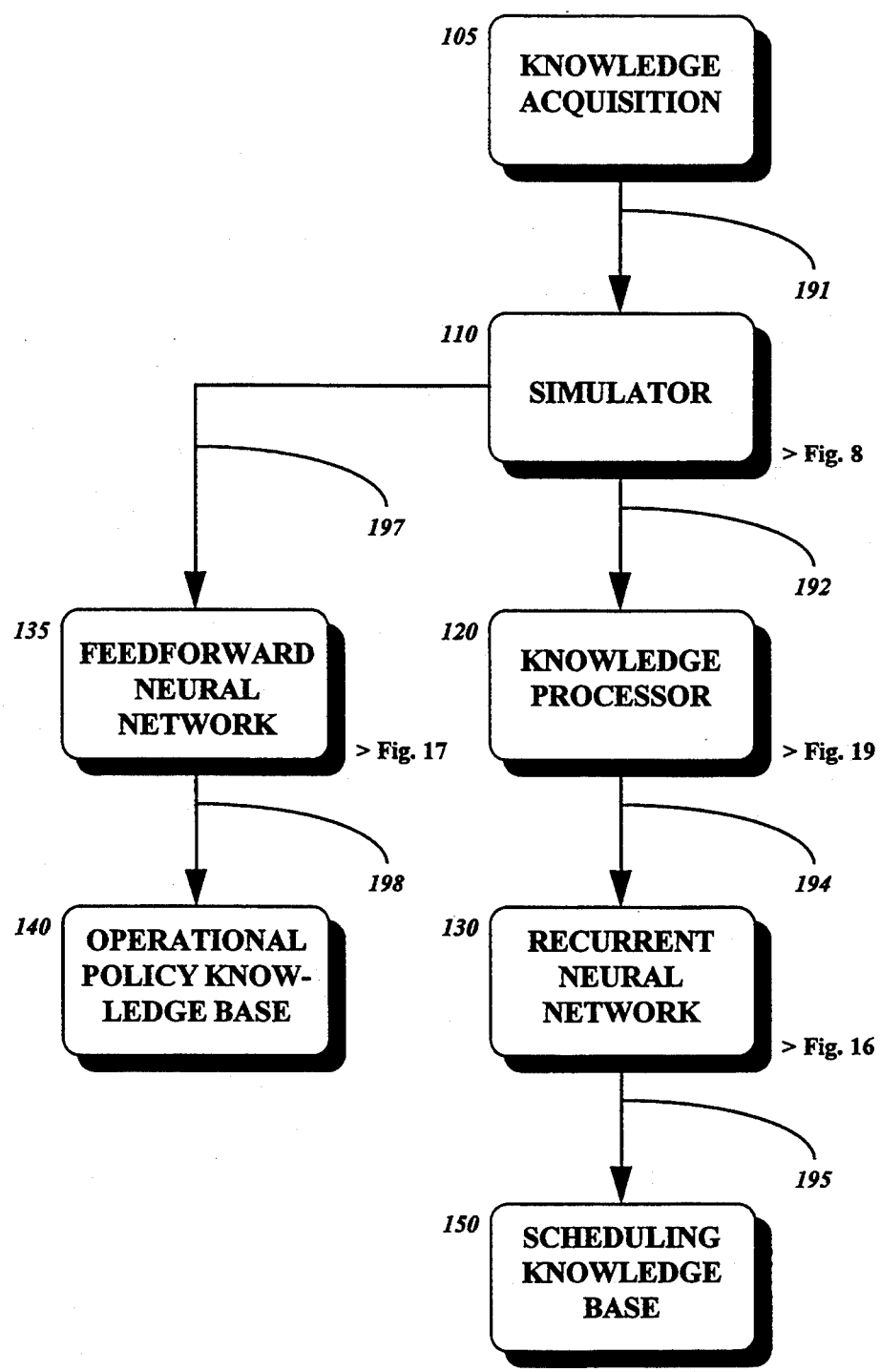
FIG. 7 shows a high level block diagram of one embodiment of a system for implementing the method of the present invention for building operational policy knowledge base 140 and scheduling knowledge base 150 within feedforward neural network 135 and recurrent neural network 130 respectively, through a learning process.

FIG. 7 shows a high level block diagram of the major steps which are used in accordance with this invention to build operational policy knowledge base 140 and scheduling knowledge base 150, which is part of neural network module 1910 of FIG. 5. Referring now to FIG. 7, a first knowledge acquisition step 105 involves conducting a detailed study to acquire specific knowledge and to collect data on the scheduling process and its constraints in a factory floor. Typical activities in knowledge acquisition step 105 include iterative interviews with human expert schedulers, functional and information modeling, and requirements analysis.

The data to be collected however, will vary from factory to factory. This is because the scheduling problem is domain specific due to the different types of constraints faced by a factory. The main scheduling function can be quite similar though. In general, these data include scheduling configuration (such as number of machines in a work center, scheduling horizon, types of products manufactured, etc.), scheduling constraints (such as available capacity, capability of machine, customer priority, tooling required, etc.), and scheduling logic (such as scheduling rules or heuristics, and scheduling methods).

Data collected from knowledge acquisition 105 (as shown in step pointer 191 of FIG. 7) are then used by simulator 110 method to generate training data for use by recurrent neural network in method step 130. Simulator step 110 also provides an automatic knowledge acquisition tool intended to supplement the data collection effort for a scheduling environment in a factory. Simulator 110 utilizes a simulator which may be developed using any simulation languages such as SIMAN IV, a product of Systems Modeling, Inc., of Pittsburg, Pa. or any simulation software packages such as WITNESS, a product of AT&T Istel, Visual Interactive Systems, Inc. of Cleveland, Ohio or any high level programming languages such C++.

Figure 1:
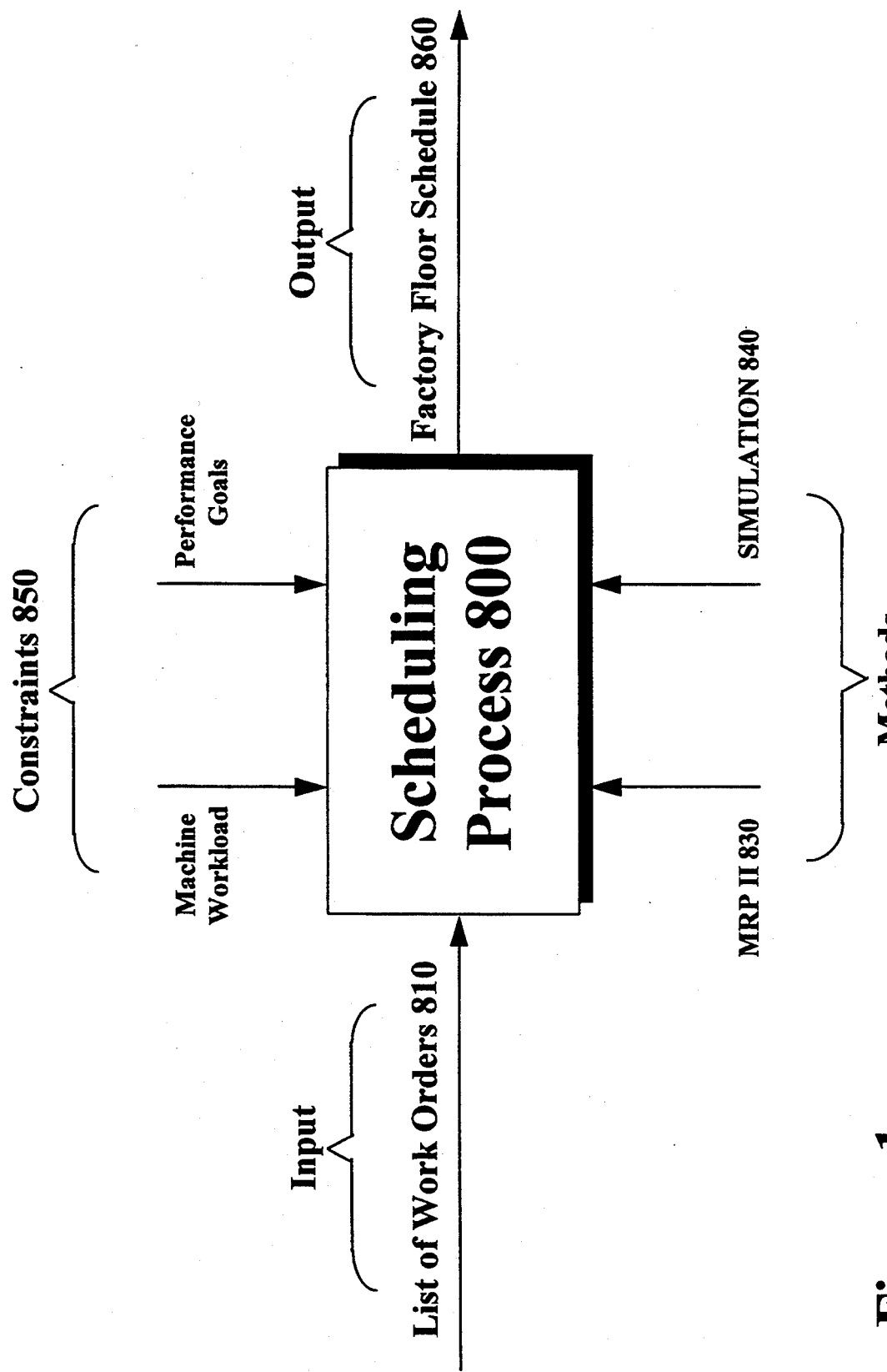
FIG. 1 is one embodiment of a high level block diagram showing aspects of one embodiment of a scheduling process 800 having inputs from work order 810 and constraints 850 to produce factory schedule 860.
Figure 8:
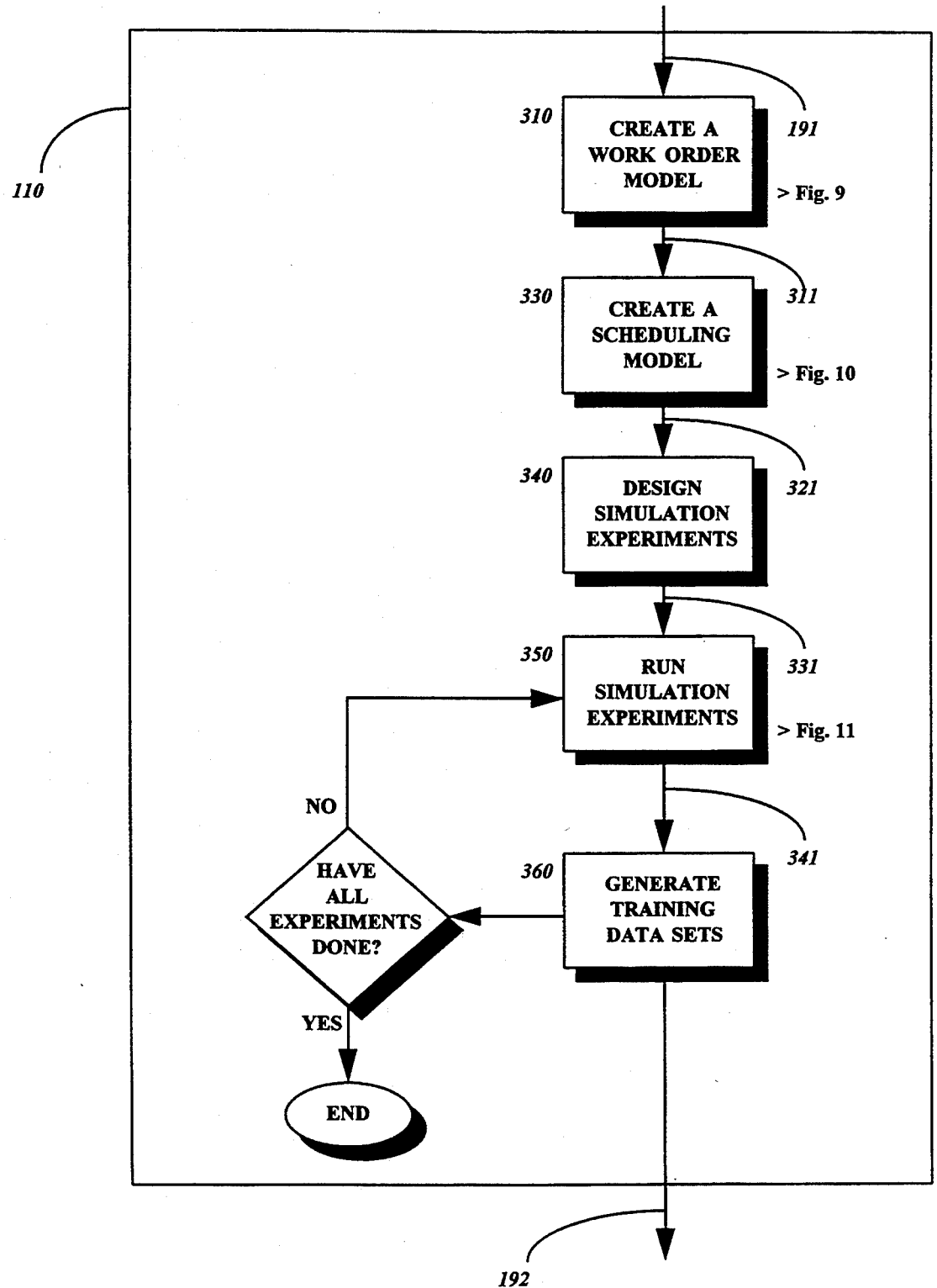
FIG. 8 is one embodiment of an intermediate block diagram of one embodiment of steps in accordance with this invention which make up simulator 110 of FIG. 7 for generating scheduling data for training feedforward neural network 135 and recurrent neural network 130.

FIG. 8 shows in more detail a representative embodiment of simulator 110. As shown in FIG. 8, this embodiment is made up of eight steps. Step pointer 191 shows that the first step of this embodiment is a create a work order model step 310, which is used to generate lists of work orders 810 (FIG. 1). Although different factories may use different types of scheduling data attached to their work orders 810, they typically include similar information such as part number, family group number, order quantity, customer's need date, and earliest start date.

Figure 9:
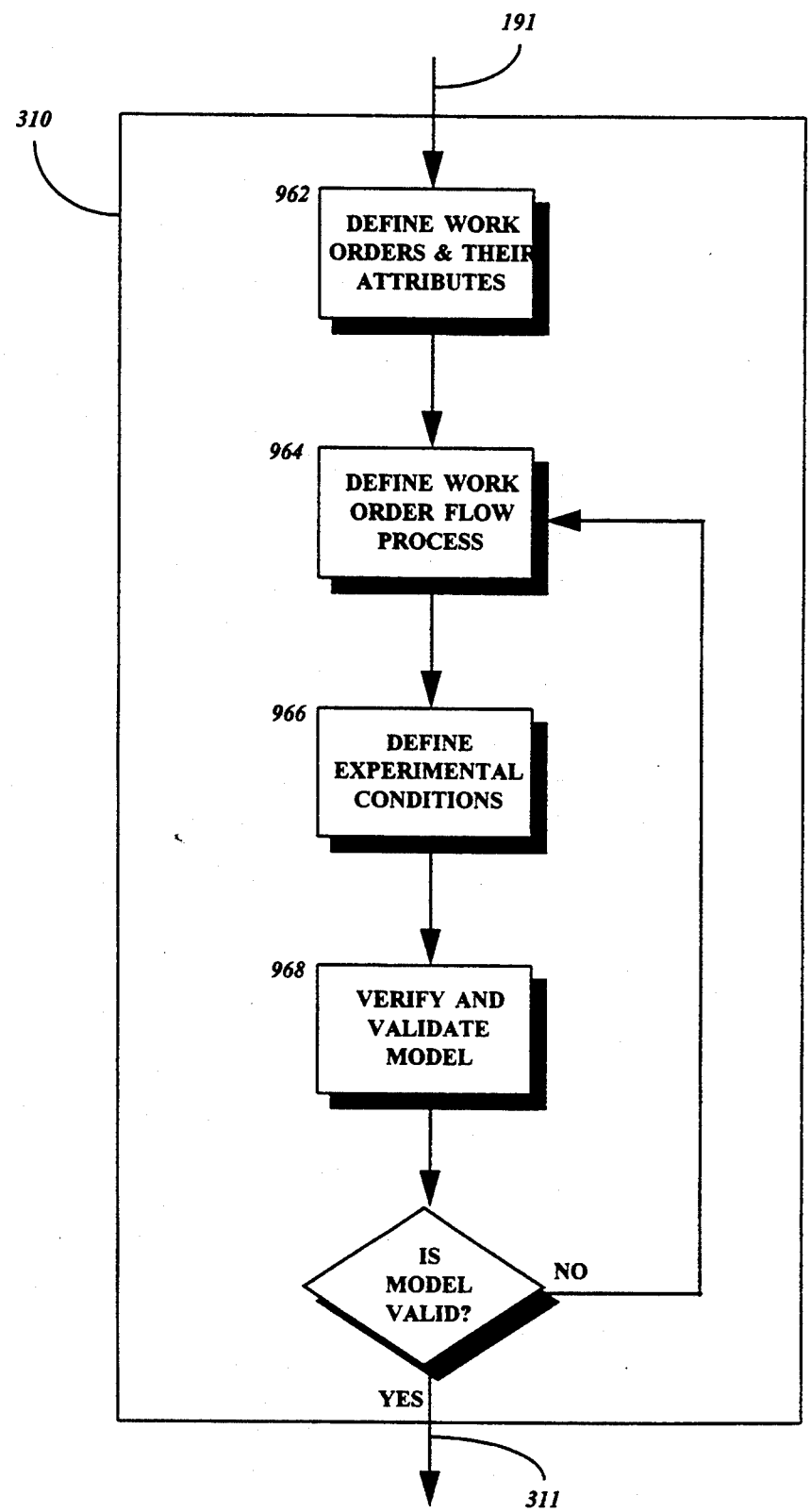
FIG. 9 is one embodiment of a detailed block diagram of one embodiment of creating work order model 310 of FIG. 8 showing the steps needed to define and build the work order model.

A more detailed example of create work order model step 310 is shown in FIG. 9 and software listing 1 of the Appendix. As shown in FIG. 9, work orders 810 and their relevant scheduling attributes such as those described above, must first be defined (step 962). This is followed by definition of flow process for creating work orders 810 (step 964). Flow process step 964 models when and how many work orders 810 should be created, what scheduling data must be included, and when these work orders should be released to the factory floor. The next step (step 966) in creating a work order model 310 is to define experimental conditions to be setup for the model. This typically includes defining scheduling parameters such as range of part numbers, defining different machine workload conditions, etc. The last step (step 968) in FIG. 9 is to verify and validate work order model 310 to ensure model accuracy. This is normally done by using statistical method to test the output data generated by the model. A specific example of the details of steps 962, 964, 966, and 968 is shown in software listing 1 of the Appendix. It should be understood however, the details required by work order model 310 differ from factory to factory. Therefore software listing 1 of the Appendix should be treated as guidelines to create such model to be used in the present invention.

Figure 10:
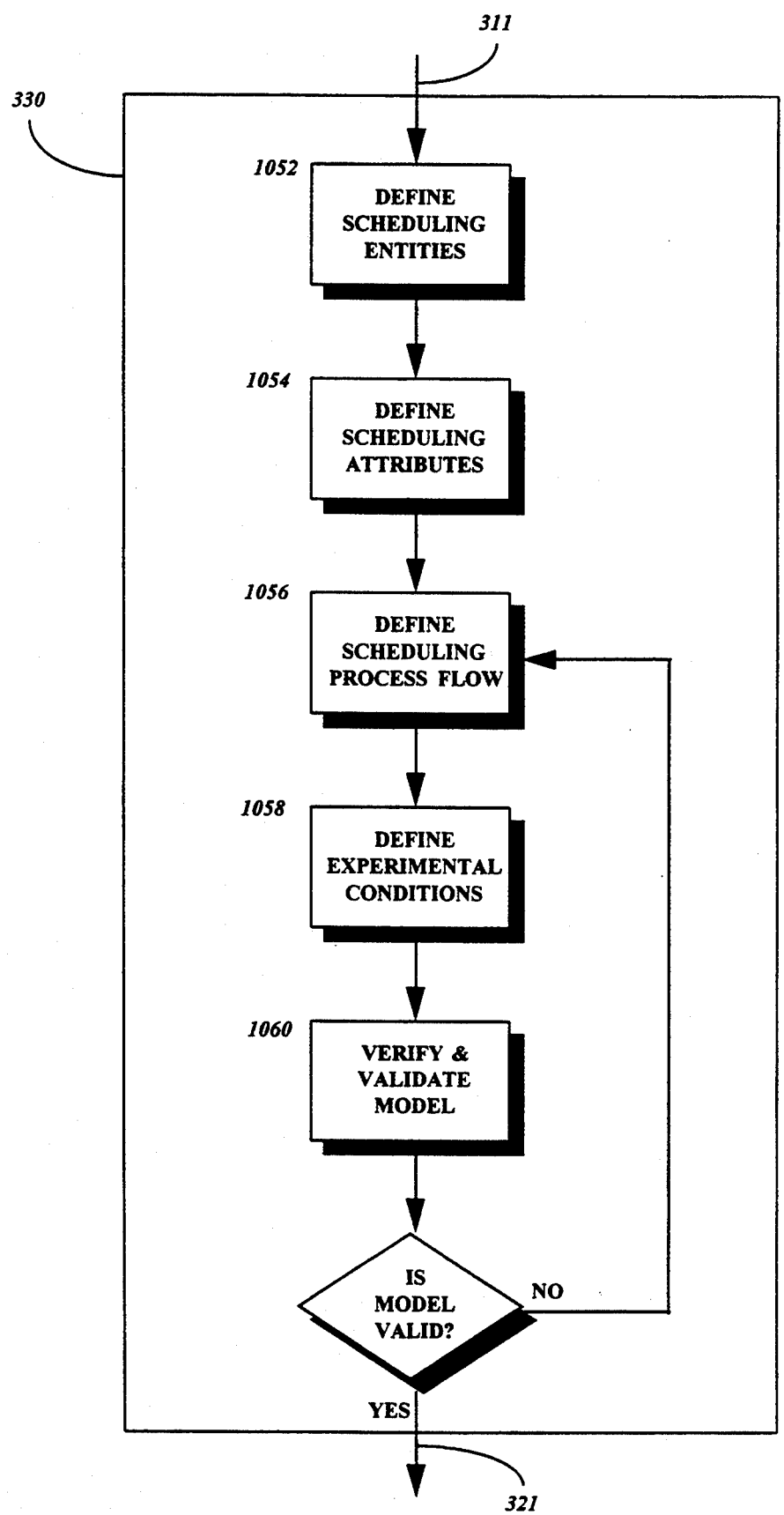
FIG. 10 is one embodiment of a detailed block diagram of one embodiment of creating scheduling model 330 of FIG. 8 showing the steps needed to define and build the scheduling model.

Referring again to FIG. 8, the create a scheduling model step 330 creates a scheduling model whose purpose is to model the specific scheduling logic with the specific scheduling configuration of the factory concerned. FIG. 10 shows the detailed steps and software listing 2 of the Appendix is a more detailed example of creating scheduling model 330. Similar to the create a work order model 310, the first step (step 1052 in FIG. 10) in creating scheduling model 330 is to define scheduling entities and their corresponding attributes and variables (step 1054). The next step (step 1056) if to define scheduling process flow whose function is to model the scheduling logic of the specific factory's scheduling environment. Possible simulation experimental conditions (step 1060) such as initialization of starting simulation conditions, different scheduling scenarios, etc. must also be identified and defined. Finally, the resultant model must be verified and validated (step 1060) before it is used to generate data. A specific example of the details of steps 1052, 1054, 1056, 1058, and 1060 is given in software listing 2 of the Appendix. This example should be treated as guidelines to create such model for use in the present invention.

Step 340 in FIG. 8 is to design simulation experiments using work order model 310 and scheduling model 330. To ensure sufficient and representative data are collected from simulator 110 (FIG. 7) to be used for training the neural networks, a robust design method (also known as Taguchi method) for designing simulation experiments is preferably employed. It should be understood that this particular method is merely used as an example of how training data can be generated. Using the robust design method, the total number of simulation experiments required to collect the data can be greatly reduced. This can be achieved by first identifying all the control factors (simulation parameters) to be studied. Typical examples of control factors of interest are the inputs to work order model 310 and scheduling model 330 which are machine workload, operational policy, and number of shifts per day. Simulation experiments can be conducted according to the experimental conditions as setup in the design matrix. A more detailed description of robust design method is discussed in Mayer and Benjamin, "Using The Taguchi Paradigm For Manufacturing System Design Using Simulation Experiments", Computers in Industrial Engineering, Vol. 22, No. 2, pp. 195-209, 1992, which is incorporated herein by reference.

Figure 11:
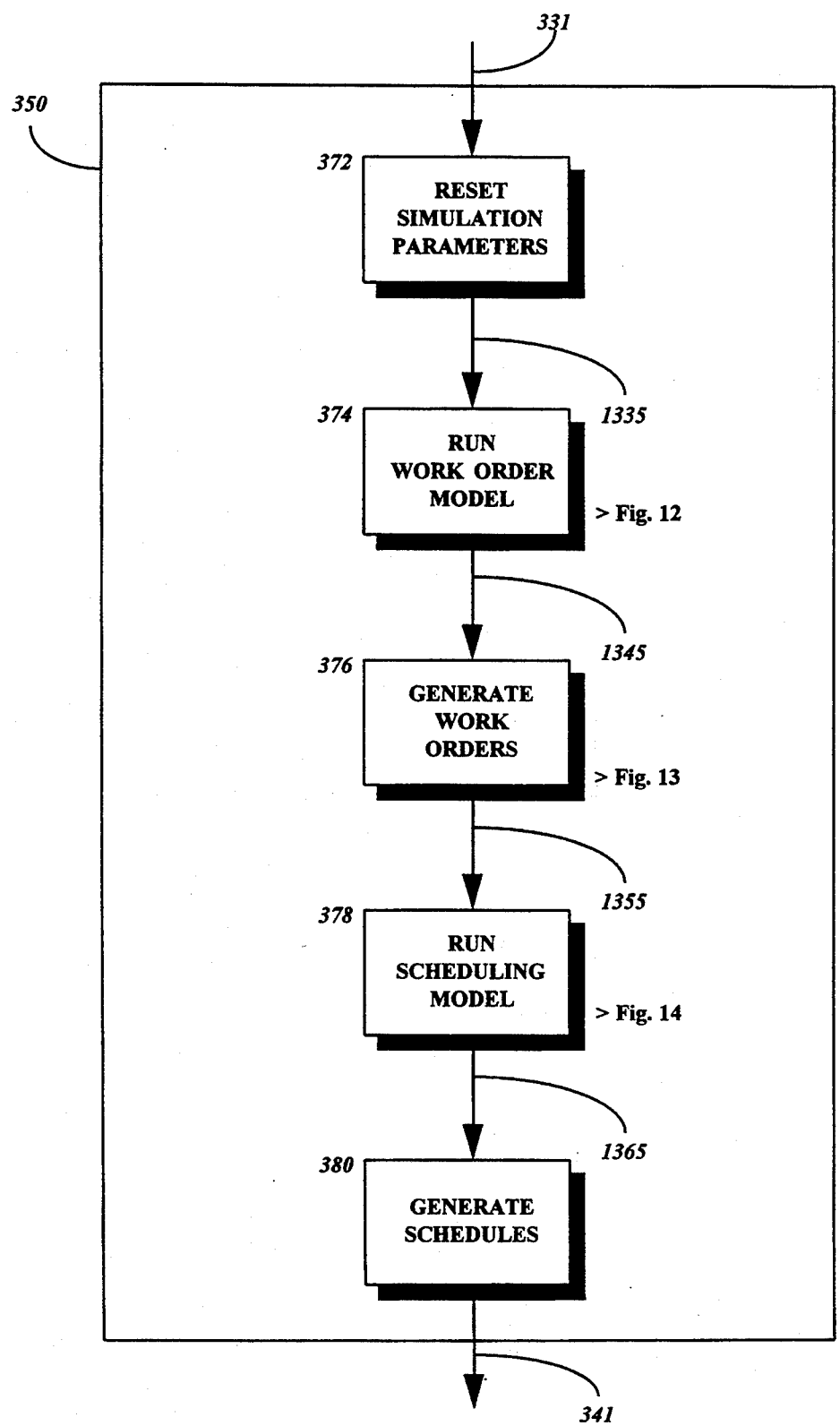
FIG. 11 is one embodiment of an intermediate block diagram of one embodiment of steps for running simulator 110 for generating training data sets of FIG. 8.
Figure 12:
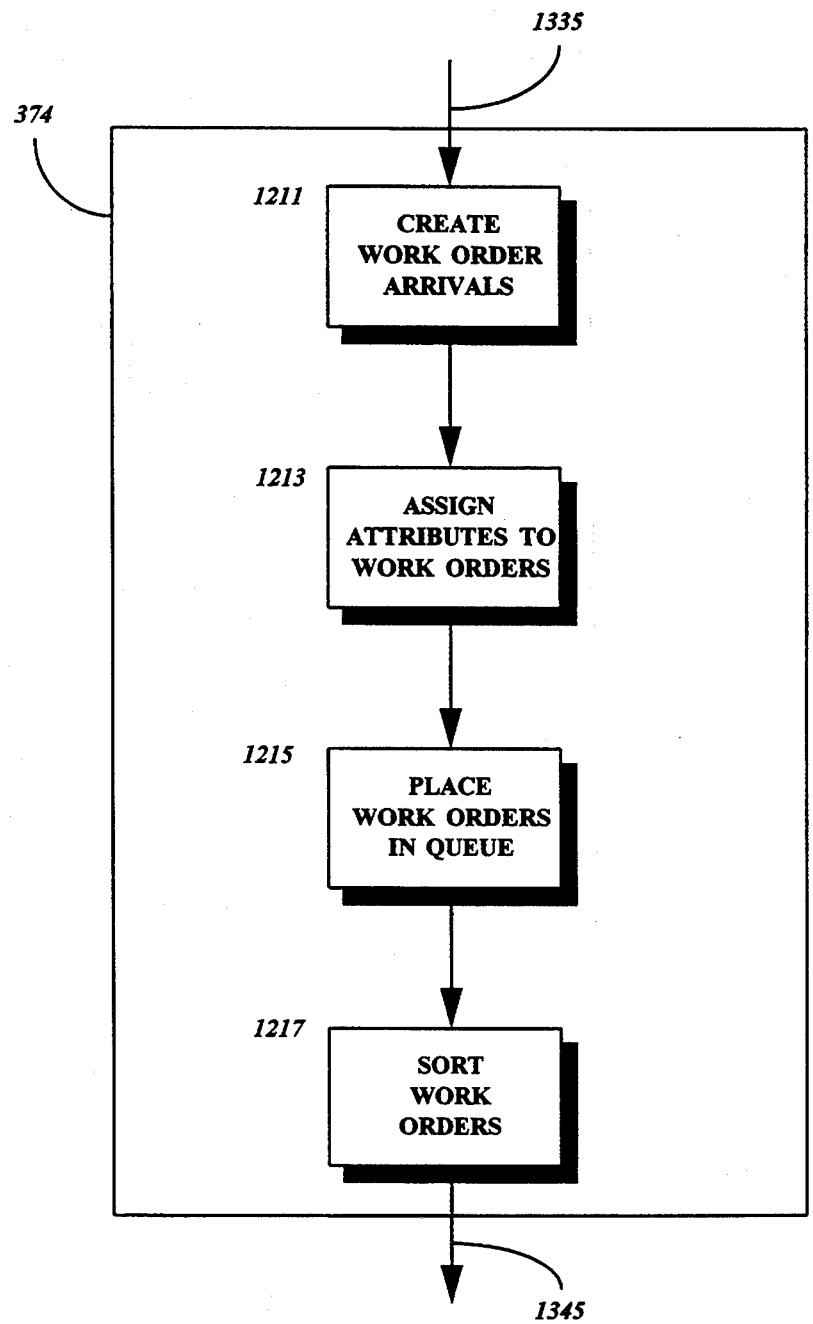
FIG. 12 is one embodiment of a detailed block diagram of one embodiment of running work order model 310 of FIG. 11 for generating representative work orders 810 as training data.

After design of simulation experiments step 340 is completed, simulation runs can be carried out as shown in step 350 in FIG. 8 and a more detailed steps is given in FIG. 11. Referring to FIG. 11, before a simulation is run, a set of simulation parameters (i.e. control factors) must first be set according to the design (step 372). Next work order model 310 is run to generate sorted list of work orders 810 (step 374). A more detailed example of running work order model 310 which has been created in step 370 (FIG. 8) is shown in FIG. 12. In this example, the arrival of work orders (step 1211 in FIG. 12) which, in a make-to-order factory floor environment, is typically modeled as Poisson processes. The work orders created are then assigned with attributes (step 1213). The assignment of attributes to work orders created are then assigned with attributes (step 1213). The assignment of attributes to work orders are of random nature as defined in the experimental condition setup (step 966 in FIG. 9). These work orders are placed in a sorting queue (step 1215) before they are sorted according to their priority index (step 1217) which will be described in detailed in the following paragraph.

Figure 13:
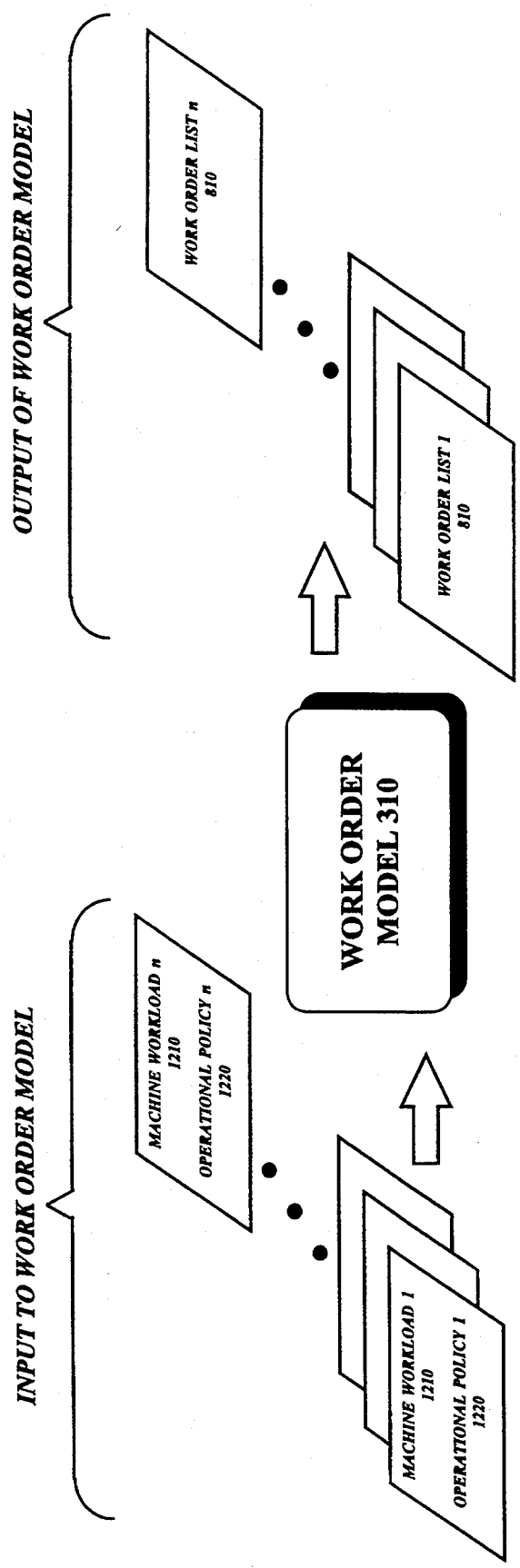
FIG. 13 is one embodiment of a detailed block diagram of one embodiment of work order model 310 of FIG. 11 showing the types of input and output data used by the model in the modeling phase.

The input and output of running work order model 310 is shown in FIG. 13. The inputs to work order model 310 are machine workload 1210 and user defined operational policies 1220 whereas the output is a sorted list of work orders 810. Machine workload data 1210 is defined as the arrival rate of work orders. This data can be obtained from the factory under study. An operational policy 1220 in FIG. 13, on the other hand, is a criteria for making a particular scheduling decision based on available information at the decision point. It normally consists of weights expressing the relative importance of criteria used in the scheduling decision making. Based on the factory's specifications, the created work order is then assigned with other relevant scheduling data. The priority index of the created work order is then calculated using a user-defined formula. An example of such formula is shown below:

$$INDEX_i = ESD_i * w_{esd_i} + EDD_i * w_{edd_i} + PR_i w_{pri} \quad (1)$$

where;

$ESD_i$ is the earliest start date of work order i;
$EDD_i$ is the earliest due date of work order i;
$PR_i$ is the priority of work order i; and
$w_{esd}$, $w_{edd}$, and $w_{pr}$ are user-defined operational policies for work order i.

Finally work order model 310 sorts all the created work orders 810 according to their priority index (step 1217 in FIG. 12).

Figure 14:
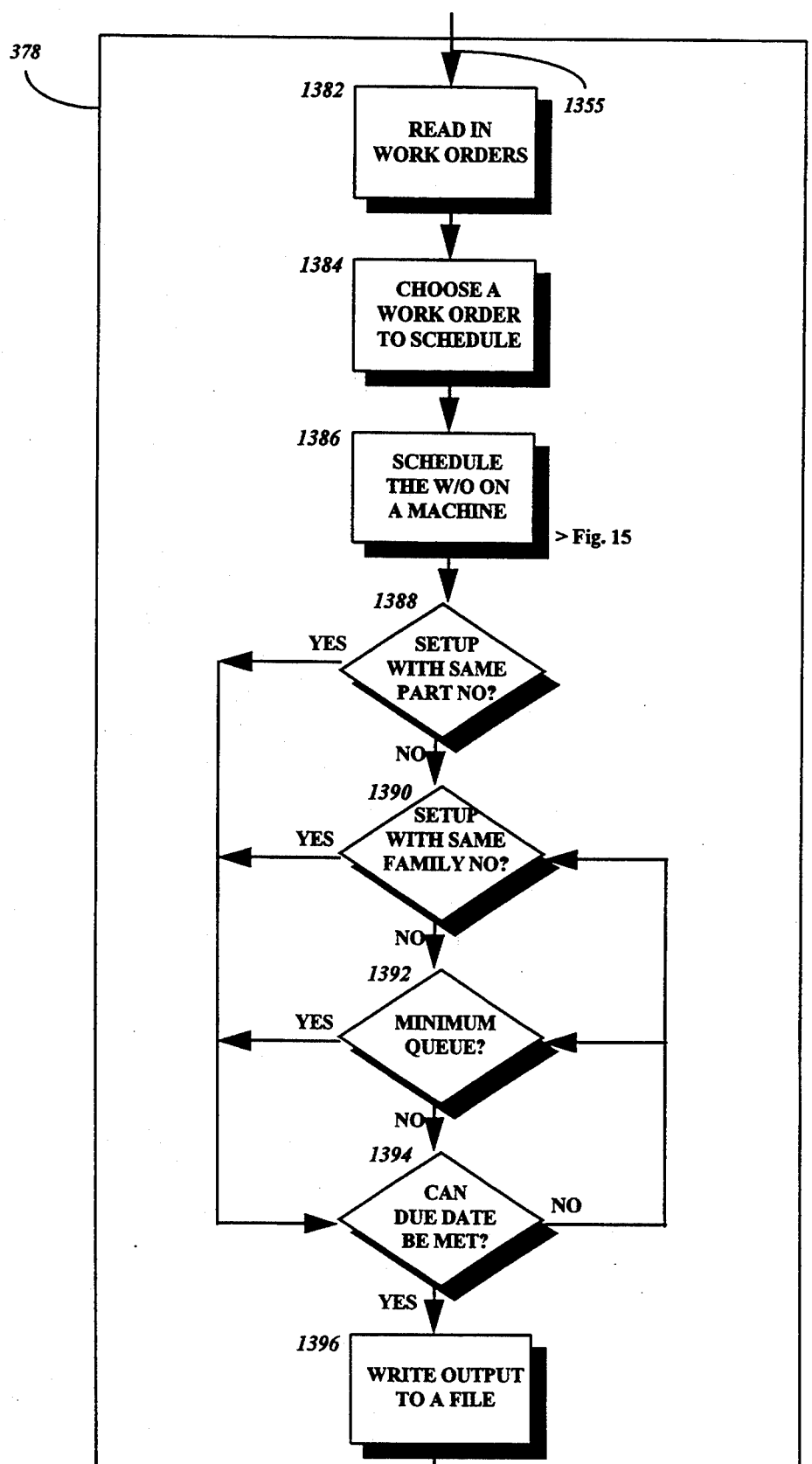
FIG. 14 is one embodiment of a detailed block diagram of one embodiment running scheduling model 330 of FIG. 11 for generating representative factory floor schedules 860 as training data.
Figure 15:
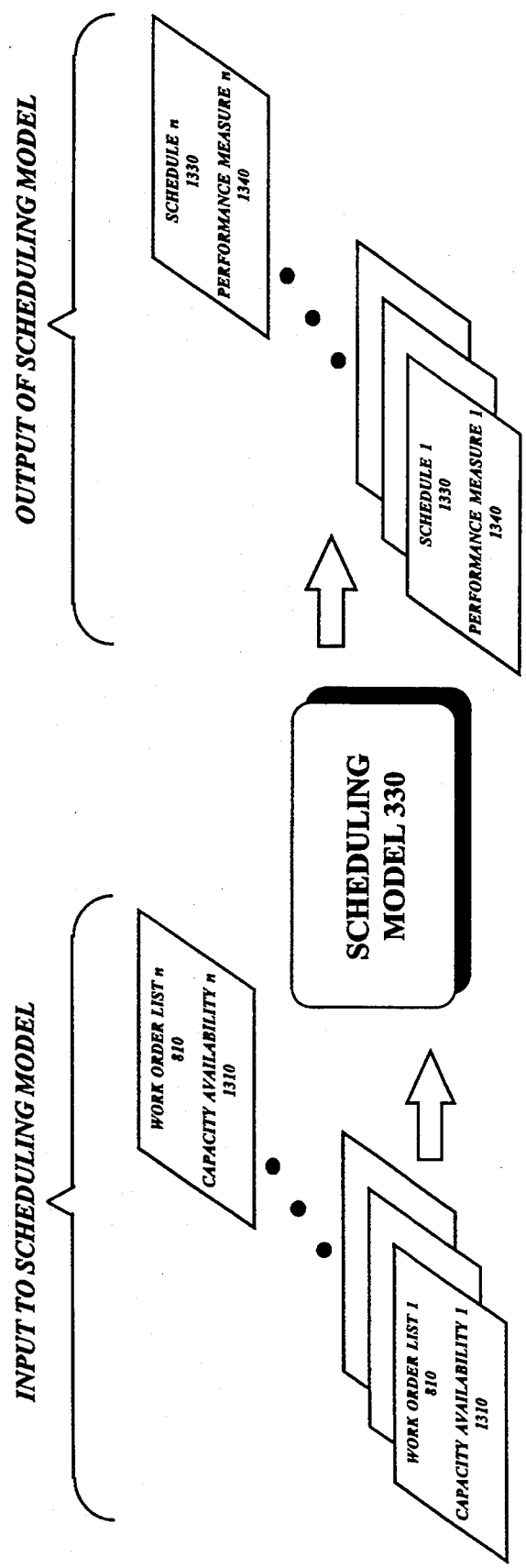
FIG. 15 is one embodiment of a detailed block diagram of one embodiment of scheduling model 330 of FIG. 13 showing the types of input and output data used by the model in the modelling phase.

Referring again to FIG. 11, scheduling model 330 is run (step 378) to generate schedules for work orders 810 generated. FIG. 14 shows one exemplary embodiment of run scheduling model 378, in which the scheduling model created receives the list of work orders 810 from the work order model and attempts to schedule these work orders according to the logic and configuration of the factory floor concerned. FIG. 15 shows the input and output data as applicable to scheduling model 330. As shown in FIG. 15, beside the list of work orders 810, the other input to the scheduling model is capacity availability of the machines and manpower. The output of scheduling model 330 is a schedule 1330 which is a planned list of work orders 810 to be executed on each machine at a specified start data for a specified time duration. Another output of scheduling model 330 is performance measure 1340 (such as machine utilization, mean flow time, etc.) of the overall scheduling process. Such performance measures can be defined by the user when defining the scheduling model created by step 330 in FIG. 8.

The last step in FIG. 8 is to collect training data sets (step 360) from each run of the simulation experiments. Each training data set consists of the input and output from running work order 310 as well as the input and output from running scheduling model 330. These training data sets are later used to train the neural networks.

2. Knowledge Processor 120

The outputs of simulator 110 (FIG. 7) are data that represent production schedules as shown in step pointer 192 of FIG. 7. Before inputting these data into recurrent neural network 130 for training, they are first preprocessed. Similarly, during the recall phase of operation depicted in FIG. 11, input data from database 220 of FIG. 11 is also preprocessed. This is accomplished by knowledge processor 120 (FIG. 7) whose function is to provide an interface between neural network module 130 and database module 220. During the learning phase depicted in FIG. 7, data generated by simulator step 110 in the form of a schedule is pre-processed by knowledge processor 120 into the format recognized by recurrent neural network 130. This preprocessing involves translating and encoding the data into a series of codes such as binary codes or coarse conjunctive codes. The encoding process is based on the knowledge representation strategies used in representing scheduling input and output data in recurrent neural network 130. The rationale for using these representation strategies will be discussed in detail below. During the scheduling phase depicted by the method chart of FIG. 18, knowledge processor 120 (FIG. 7) is used to translate input data into neural network codes and also to translate neural network output codes into database format.

Figure 18:
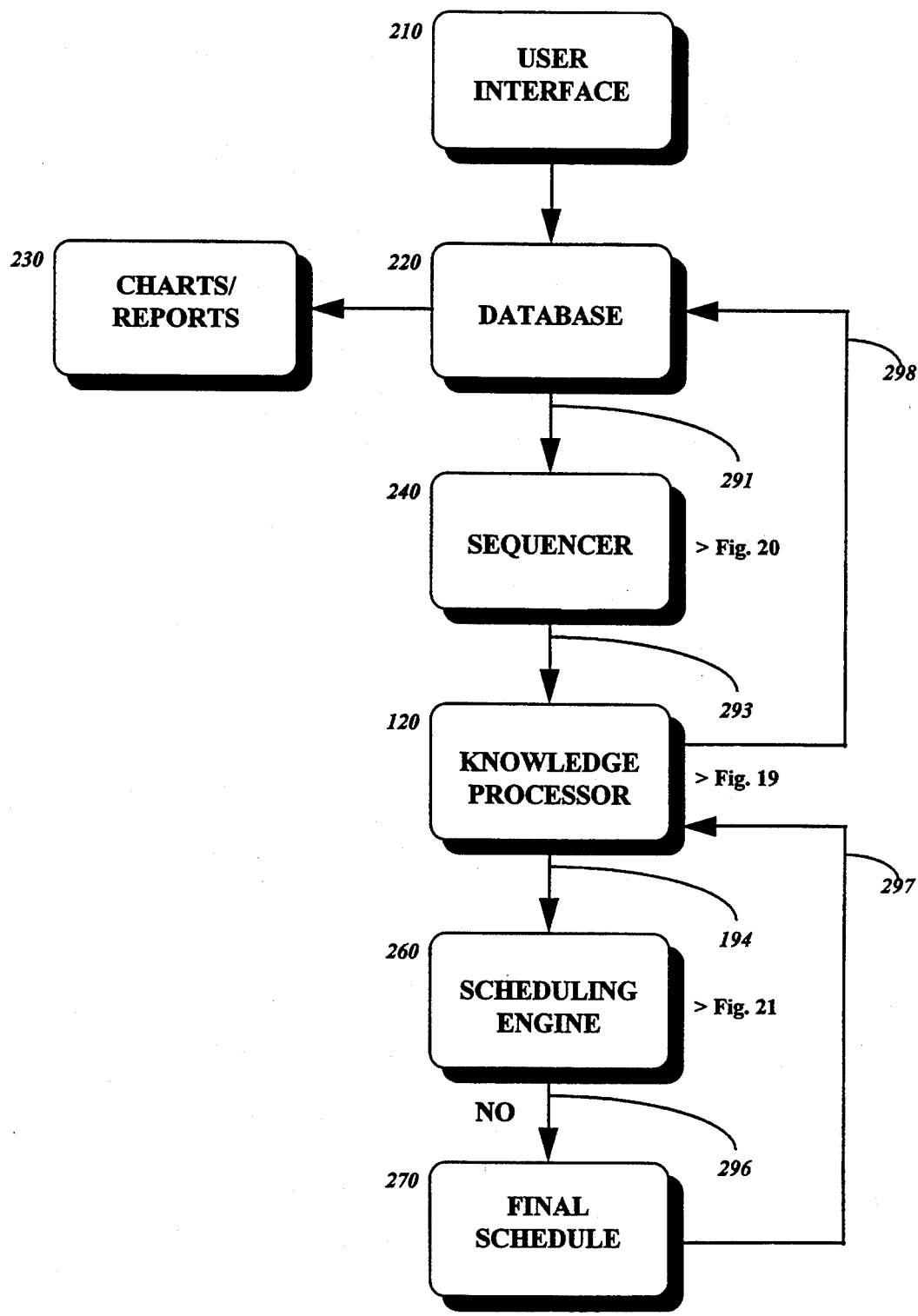
FIG. 18 shows a high level block diagram of one embodiment of a system for implementing method of the present invention for factory floor scheduling using a scheduling engine 260 which contains a trained recurrent neural network and a competitive neural network.
Figure 19:
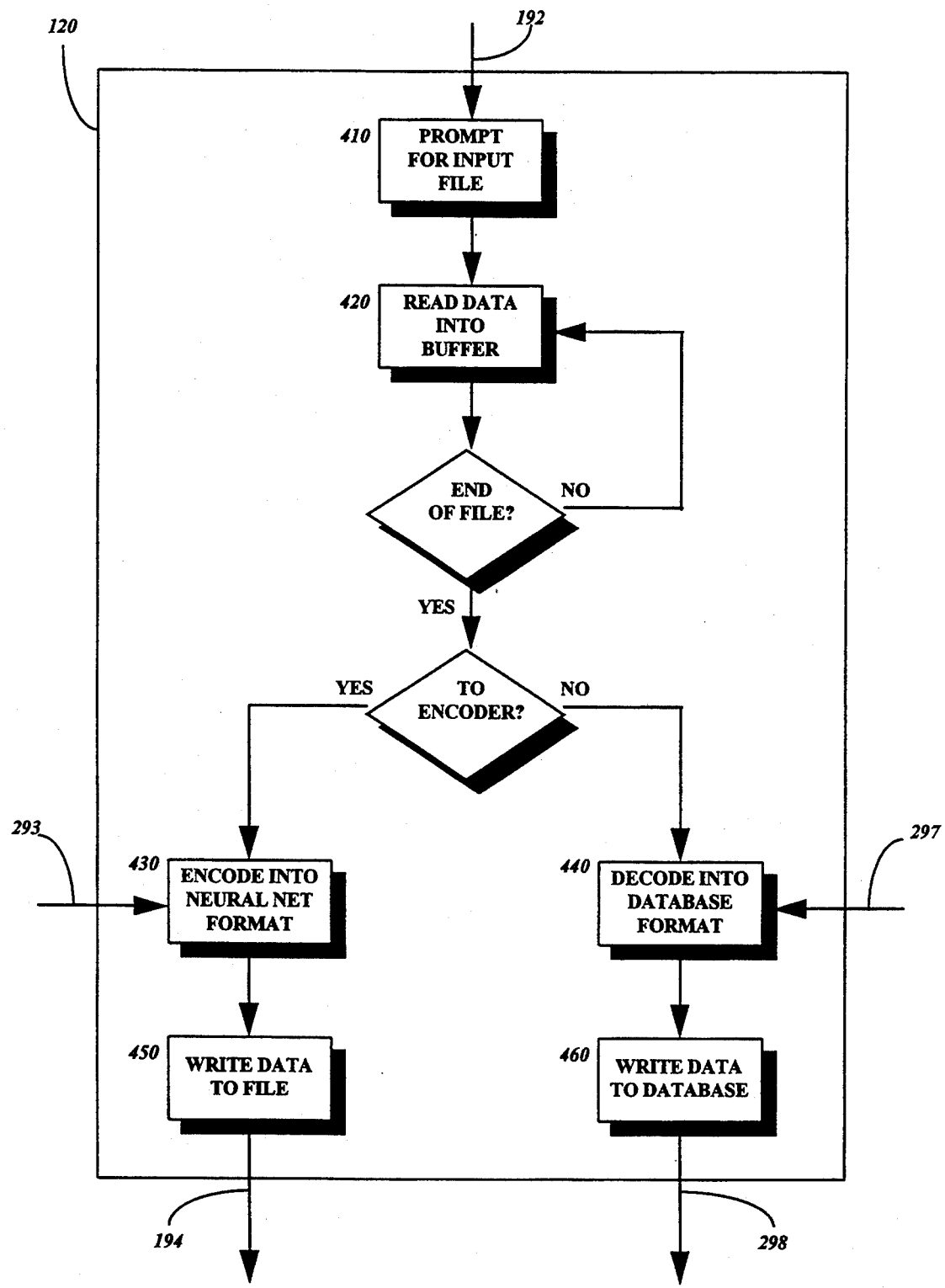
FIG. 19 shows one embodiment of an intermediate block diagram of one embodiment of the steps which make up knowledge processor 120 of FIG. 11 and FIG. 18 for translating data into neural network codes and for converting neural network output into database format.

FIG. 19 shows the details of one exemplary embodiment of the operation of knowledge processor 120, which consists of two main components: encoder (preprocessor) 430 and decoder (post processor) 440. Referring now to FIG. 19, step pointer 192 indicates that an input file from simulator 110 of FIG. 7 is to be read by method step 410. Data are also read into a buffer from database 220 (FIG. 18), as shown in step 420. Once all the data are read into the buffer, the encoding process of step 430 begins. Input data can also be encoded one at a time as indicated by step pointer 293. Encoding process step 430 first converts scheduling input (i.e. work order 810) data such as part number, family group number, earliest start date, run time, etc. into binary codes. These binary codes are later fed to input layer 1810 (FIG. 6) of neural network 130 (FIG. 7). Next, encoding process step 430 continues to convert the scheduling output (i.e. a schedule) into coarse conjunctive codes. Specifically this is done for data such as setup time, machine number, and start/end time units. These conjunctive codes are later fed as desired output data to output layer 1830 (FIG. 6) of recurrent neural network 130 (FIG. 7). The converted data are then written to a file as shown in step 450 or input directly to neural network 130 for training or scheduling. The decoding process, as shown in step 440, functions as a postprocessor for scheduling engine 260 (FIG. 11) to convert the scheduling output from neural network 130 (FIG. 7) to database format.

Knowledge processor 120 (FIG. 7) is, in one embodiment, implemented in the "C" language. In one embodiment, the design of knowledge processor 120 is integrated with recurrent neural network 130 (FIG. 7) and scheduling engine 260 (FIG. 11), although it need not be linked directly with simulator 110 and sequencer 240 as shown in FIG. 7 and FIG. 11, respectively.

3. Recurrent Neural Network 130 and Scheduling Knowledge Base 150

Recurrent neural network 130 in FIG. 7 is a facility that allows scheduling knowledge base 150 to be built using a learning method. The architecture of recurrent neural network 130 of the present invention is based on the recurrent neural network model which is designed to deal with time-varying data. A more detailed description of using a recurrent neural network for handling time-varying input or output is discussed in Williams and Zipser, "A Learning Algorithm for Continually Running Fully Recurrent Neural Networks", *Neural Computation*, Vol 1, pp 270–280, 1989, which is incorporated herein by reference. However, it should be understood that other time delay neural network models are equally applicable as well. Similar to the general neural network architecture as shown in FIG. 6, recurrent neural network 130 consists of layers of neurons, including an input layer 1810, one or more hidden layers 1820, and an output layer 1830. Neurons in input layer 1810 preferably use binary coding for representing scheduling input data. Neurons in output layer 1830, on the other hand, preferably use coarse conjunctive coding for representing scheduling output. The advantages of using this knowledge representation method will be clear when we describe scheduling knowledge base 150 below. There are connections from input layer 1810 to hidden layers 1820 and output layer 1830, and from hidden layers 1820 to output layer 1830. Additionally each neuron in hidden layers 1820 and output layer 1830 has a recurrent connection 1868 back to itself. These connections carry weights that collectively encode scheduling knowledge base 150.

An important issue to consider when using neural networks for solving complex problems is the design of such neural networks. The design of a neural network essentially involves the determination of the best network architecture. This includes decisions on such factors as how many hidden layers are required, how many neurons in each hidden layer, what learning coefficient is appropriate, etc. From the existing work, currently there is still lack of a systematic method which allows a designer to consider several key factors critical to a successful neural network design concurrently. The design of recurrent neural network 130 of the present invention is based on the Taguchi method. Using the Taguchi method, a neural network which is robust against initial weights condition during learning phase and insensitive to the architectural and input variations during recall phase can be achieved. A more detailed description of using the Taguchi method for neural network design is discussed in Khaw, Lim and Lim, "Using Taguchi Method for the Optimal Design of Neural Networks", paper submitted to *Neural Networks*, January 1993, which is incorporated herein by reference.

A key factor to consider when designing a neural network for scheduling is the knowledge representation strategy. Knowledge representation in neural networks is concerned with how concepts are represented in neural networks. There are many approaches to this. Some of them are distributed, in which each concept is represented by a pattern of micro features. Others are localist, in which single neurons are associated with concepts. Regardless of which approach is used, the causal relationship between concepts is represented by the strength of connections between them and the neural network as a whole constitutes the knowledge base. The examples of the present invention now described make use of binary coding for neurons in input layer 1810 and coarse conjunctive coding for neurons in output layer 1830. It should be noted that the use of binary coding and coarse conjunctive coding methods should be treated as the preferred methods in relation to the present invention. Other representation strategies can be used as well. Basically, binary coding is a method of decomposing a single input value into a series of codes in binary format. Examples of binary codes are shown in Table 1.

TABLE 1

| Value of Data | Binary Codes |
|---|---|
| | $2^7$ ....... $2^0$ => Binary Numbering |
| 1 | 0 0 0 0 0 0 0 1 |
| 5 | 0 0 0 0 0 1 0 1 |
| 10 | 0 0 0 0 1 0 1 0 |
| 32 | 0 0 1 0 0 0 0 0 |

Coarse conjunctive coding, on the other hand, is a method of decomposing an output value into a series of codes based on the position of the value. Examples of coarse conjunctive codes are shown in Table 2.

TABLE 2

| Value of Data | Coarse Conjunctive Codes |
|---|---|
| | 0 1 2 3 0 1 2 3 4 5 6 7 8 9 => Position Numbering |
| 1 | 1 0 0 0 0 1 0 0 0 0 0 0 0 0 |
| 5 | 1 0 0 0 0 0 0 0 0 1 0 0 0 0 |
| 10 | 0 1 0 0 1 0 0 0 0 0 0 0 0 0 |
| 32 | 0 0 0 1 0 0 1 0 0 0 0 0 0 0 |

As shown in FIG. 7, recurrent neural network 130 is designed to build scheduling knowledge base 150 through an adaptive learning (or training) process. It is trained by feeding training data which have been generated and encoded by simulator 110 and knowledge processor 120, respectively. A training data is composed of an input vector and a desired output vector. With reference to FIG. 6, training data is first presented to input layer 1810 as input vector 1818 and to output layer 1830 as desired output vector 1858. There are basically two methods to present training data to the neural network. One is to feed training data to the network in a random order while the other one is based on a sequential manner. Since a scheduling problem deals with sequences of events in a series of time steps, a sequential training approach is more appropriate. In the sequential approach, training data are fed to the network in a fixed sequence as specified in the training data itself.

Referring now to FIG. 6, input vector 1818 is presented to input layer 1810 and is propagated through to output layer 1830 to obtain output vector 1838. As this information propagates through the network, the new state of each neuron is also set using a set of equations. Examples of these equations for a standard summation function (equation 2) and a hyperbolic tangent transfer function (equation 3) are given below:

$$z_j = \sum_{i=0}^{N} w_{ji} x_i \qquad (2)$$

$$f(z) = \frac{e^z - e^{-z}}{e^z + e^{-z}} \qquad (3)$$

It should be noted that other type of equations are equally applicable as well, for example a sigmoidal transfer function. Referring to FIG. 6, for each neuron in output layer 1830, calculate the scaled local error and delta weight using a method similar to the Generalized Delta Rule which is based on steepest descent method as follows:

$$\Delta w_{ji,s} = \alpha \times \epsilon_{j,s} \times X_{i,s-1} \qquad (4)$$

where;

$w_{ji,s}$ is the weight 1828 from neuron j to neuron i;

s indicates the layer number;

j,s is the scaled local error of neuron j in layer s;

$x_{i,s-1}$ is the current output value of the ith neuron in layer s-1; and

α is the learning coefficient.

The delta weights are then added to the corresponding previous weights 1828. This is repeated until the layer above input layer 1810 is reached. The learning progress of the network is monitored by means of statistical instruments such as root-mean-squared error graph, weights distribution histogram, etc. After a large number of presentation of the input vectors 1818, the network will converge to a solution that minimizes the difference between the desired output 1858 and measured network output 1838.

Figure 16:
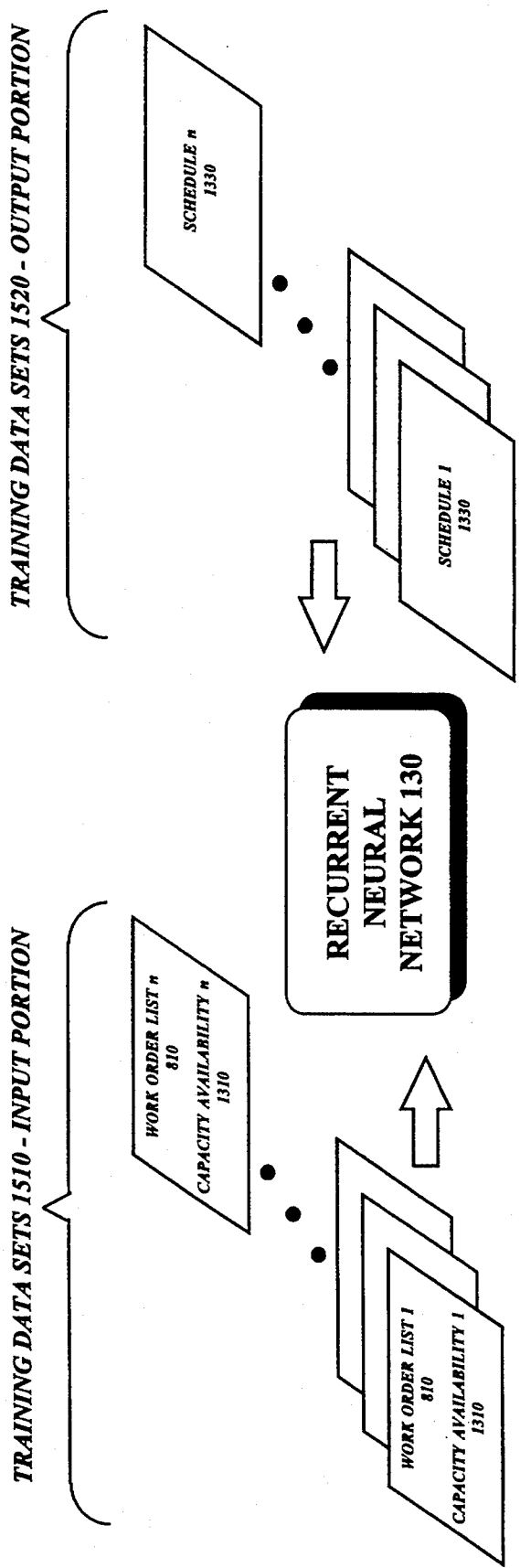
FIG. 16 shows one embodiment of a detailed block diagram of one embodiment of recurrent neural network 130 of FIG. 7 showing the types of input and output data used by the network in the learning phase.

FIG. 16 is a detailed block diagram which shows the types of data used in one embodiment of this invention to train recurrent neural network 130. As shown in FIG. 16, a set of training data from training data sets 1510 which form work order lists 810 and a set of training data from training data sets 1520 which form schedules 1330 is fed to input layer 1810 and output layer 1830, respectively, of recurrent neural network 130 for training. Once neural network 130 converges, another set of training data from training data sets 1510 and 1520 are then used for training. This process is repeated until all the training data sets have been used for training recurrent neural network 130. At this point, scheduling knowledge base 150, which was initialized to random values in the beginning of training, has been exposed to the various scheduling patterns. Scheduling knowledge base 150 is now said to have learned and it now contains the scheduling knowledge which is spread throughout its connection weights, which connection weights are then fixed. Although scheduling knowledge base 150 is domain specific, it generally includes heuristics to assign machines to schedule work orders, heuristics to determine the number of machine setups required, and heuristics to determine start and end times of work orders.

4. Feedforward Neural Network 135 and Operational Policy Knowledge Base 140

Feedforward neural network 135 (FIG. 7) is a facility which allows operational policy knowledge base 140 to be built using a learning method. The architecture of feedforward neural network 135 of the present invention preferably is based on the back-propagation neural network model. A more detailed description of back-propagation neural network model is given in McClelland and Rumelhart, "Parallel Distributed Processing: Explorations in the Microstructure of Cognition". *The MIT Press*, 1986, which is incorporated herein by reference. Similar to the recurrent neural network 130 discussed above with reference to FIG. 6, neural network 135 has a multi-layer architecture which includes an input layer, one or more hidden layers, and an output layer. All the neurons in a layer are fully connected to the adjacent layer(s). Each neuron has a similar set of equations such as equations [2], [3], and [4] above. Feedforward neural network 135 is designed and is trained using the same learning method as described above with respect to recurrent neural network 130.

Figure 17:
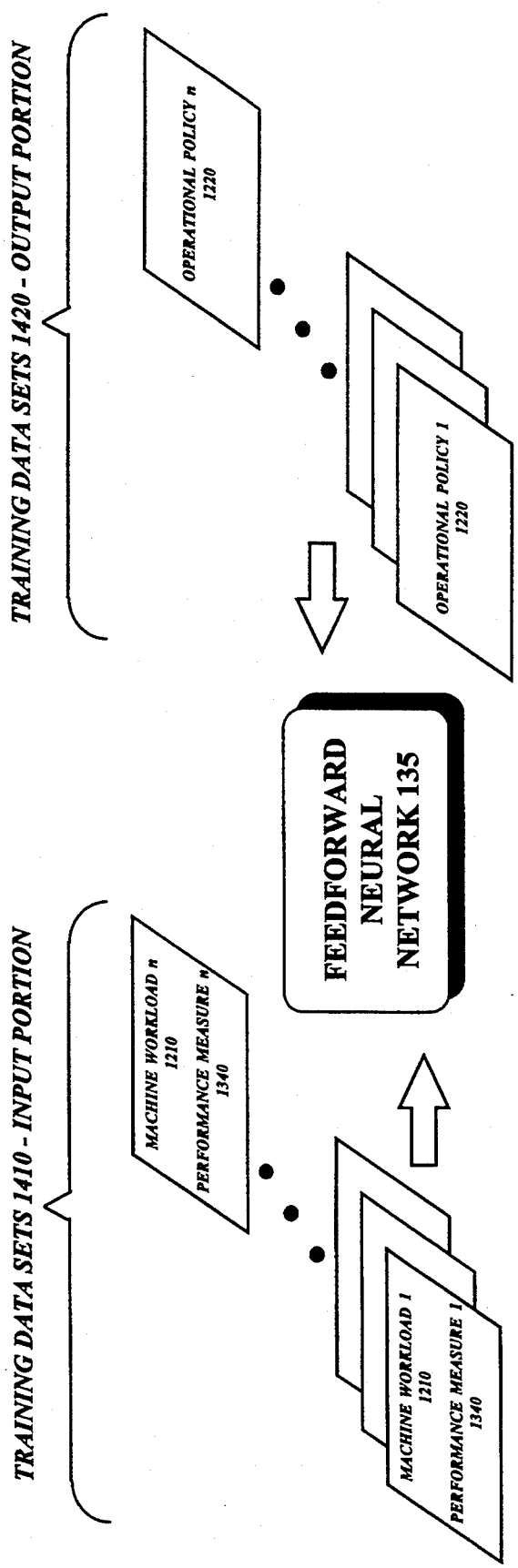
FIG. 17 shows one embodiment of a detailed block diagram of one embodiment of feedforward neural network 135 of FIG. 7 showing the types of input and output data used by the network in the learning phase.

As shown in FIG. 17, a set of training data from training data sets 1410 (which represent machine workload 1210 and performance goals 1340) and a set of training data from training data sets 1420 (which represent operational policy 12230) are used to train neural network 135. These training data sets are generated from simulator 110 (FIG. 7) for training neural network 135 whose purpose is to address the complexity of sequencing decisions based on multiple criteria with often conflicting consequences. After neural network 135 is trained, it is capable of mapping the complex relationships between the desired characteristics of the sequencing solutions and the relative importance of the scheduling criteria. As will be discussed in greater detail below, these scheduling criteria or operational policies are used to determine the rank of each work order 810 for scheduling.

5. User Interface 210, Database 220, and Charts/Reports 230

FIG. 18 shows a high level diagram which can be used to implement the scheduling method of the present invention. The method steps shown in FIG. 18 control the operation of the preferred architecture of the present invention which is shown in FIG. 5. Referring now to FIGS. 11 and 5, a first method step serves to develop user interface module 210. User interface module 210 is a general type of graphical user interface which, in general, includes an order entry screen that allows users to enter new work order 810 information; screens for defining various types of constraints such as work center, machine, part, tooling, and calendar; and a screen that allows users to define various scheduling parameters before a scheduling process is performed. All the screens preferably provide functions for data maintenance such as adding, deleting, copying, listing, saving, printing, etc.

As shown in FIGS. 181 and 5, database 220 is a facility to store static data such as constraint data as entered from the constraint screens and dynamic data such as existing machine schedule. Database 220 is also a tool for organizing, managing, and retrieving these data. Database 220 further serves as a place to interface with an external database, if the need arises. Database 220 can be conveniently developed using a commercial database tool or a spreadsheet package such as Microsoft Excel, a product of Microsoft Corporation of Redmond, Wash., USA.

Also shown in FIGS. 18 and 5 is charting/reporting module 230, which provides a convenient method of presenting visual displays of scheduling input and output data in a meaningful way. For example, standard Gantt charts can be used to provide a graphical representation of a schedule. In addition, users can view and print many types of production reports provided by this module as desired. 6. Sequencer 240

Neural network module 1910 as shown in FIG. 5 includes sequencer 240, knowledge processor 120, and scheduling engine 260 which together are used to generate final schedule 270 as shown in FIG. 18. Sequencer 240 receives from database 220 a list of work orders 810 to be scheduled, and ranks and sorts all these work orders 810 in a priority sequence. As will be discussed in detail below, sequencer 240 consists of feedforward neural network 135 previously trained to make operational policies. It should be noted that trained feedforward neural network 135 consists of an operational policy knowledge base 140 which is stored in connection weights spread over the entire network. Although other methods such as the simple scoring method, analytical hierarchy process, or scheduling heuristics can be used to achieve the same objective, the neural network approach is employed here for its capability to map the relationships between the desired characteristics of the scheduling solutions and the operational policies for the work orders. Using the output of trained feedforward neural network 640 (FIG. 20), a priority index is determined for each work order and these work orders are then listed according to their priority indices.

Figure 20:
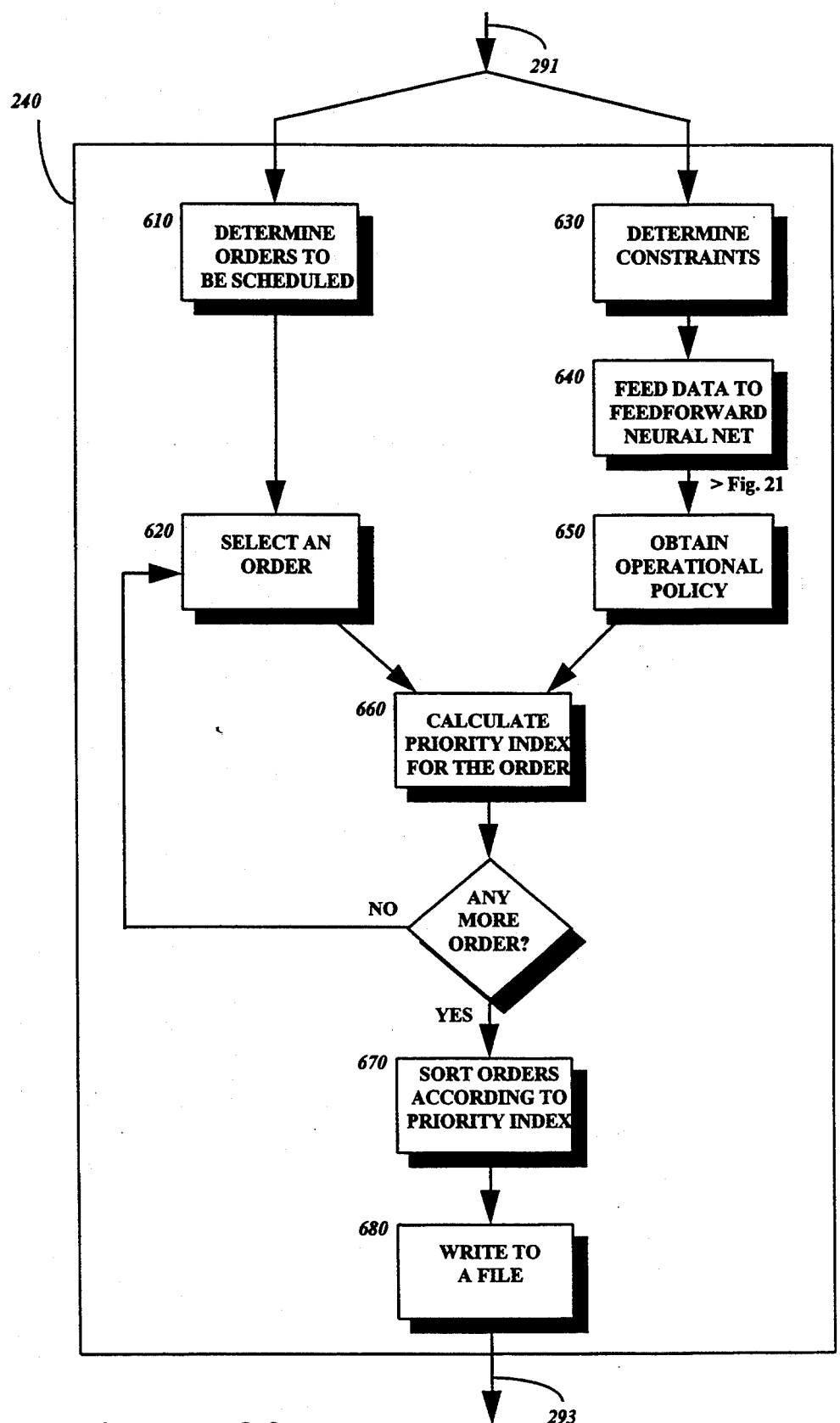
FIG. 20 shows one embodiment of an intermediate block diagram of one embodiment of the steps which make up the sequencer 240 of FIG. 18 which contians a trained feedforward neural network for ranking work orders 810 in a priority sequence.
Figure 21:
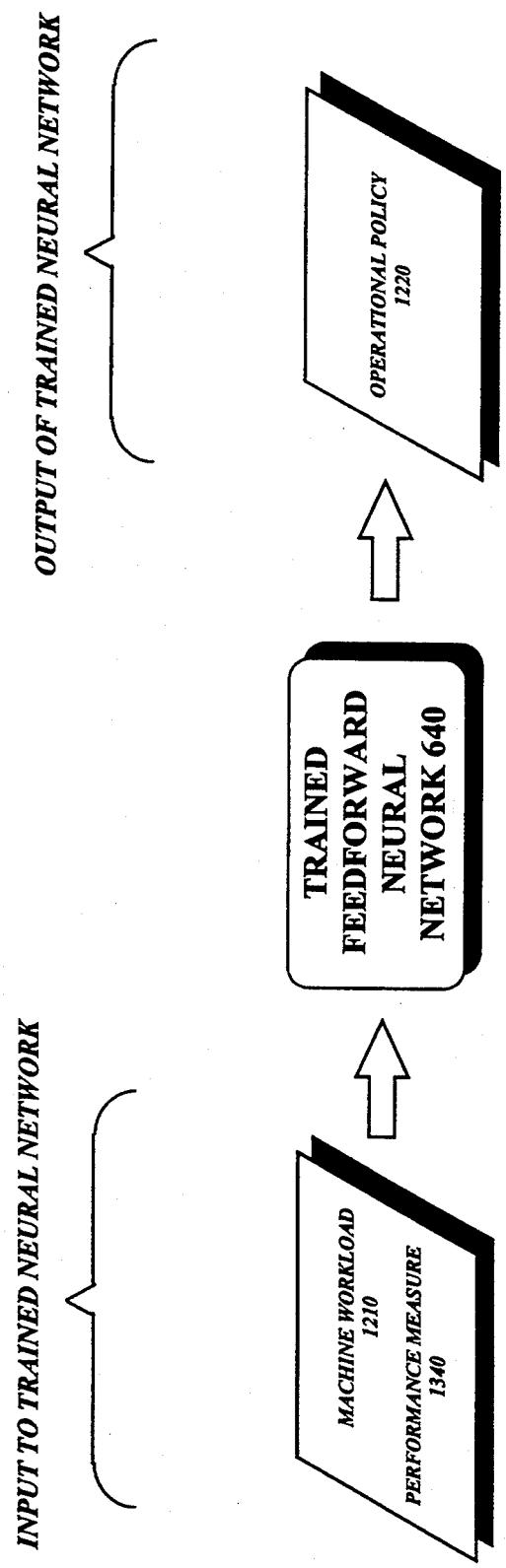
FIG. 21 is one embodiment of a detailed block diagram of one embodiment of the trained feedforward neural network 640 of FIG. 20 showing the types of input and output data used by the network in the recall phase.

FIG. 20 is a detailed block diagram of one embodiment of sequencer 240 of the present invention. Step pointer 291 as shown in FIG. 15 indicates that list of work orders 810 to be scheduled and constraints 850 are input to sequencer 240 in parallel. Constraints 850 are machine workload 1210, and performance goals 1340, as shown in FIG. 21. As shown in step 640 of FIG. 15, constraints 850 are fed to feedforward neural network 135, previously trained to establish the relationship between the relative importance of scheduling criteria and the overall performance of the factory floor, to obtain operational policies 1220 (FIG. 21) for a work order 810.

FIG. 21 shows, in detail, the types of data used and generated by sequencer 240. With reference to FIG. 21, machine workload 1210 data can be determined from the load of the existing schedule which is available from database module 220. Performance goals 1340 are user-defined parameters as discussed above with respect to simulator 110 (FIG. 7). These data represent global scheduling parameters which will affect the final schedule 270 generated. The output of the trained neural network 640 is operational policies 1220 which reflects the relative importance of different scheduling criteria used. As shown in step 620 in FIG. 20, a work order is selected at random from the work order list 810 to calculate the priority index of the work order using the operational policies and equation [1] above (step 660). All the work orders 810 are then sorted according to their priority index and they are written a file as shown in step 680 in FIG. 20. These sorted work orders 810 are later used for scheduling.

7. Scheduling Engine 260

Figure 28:
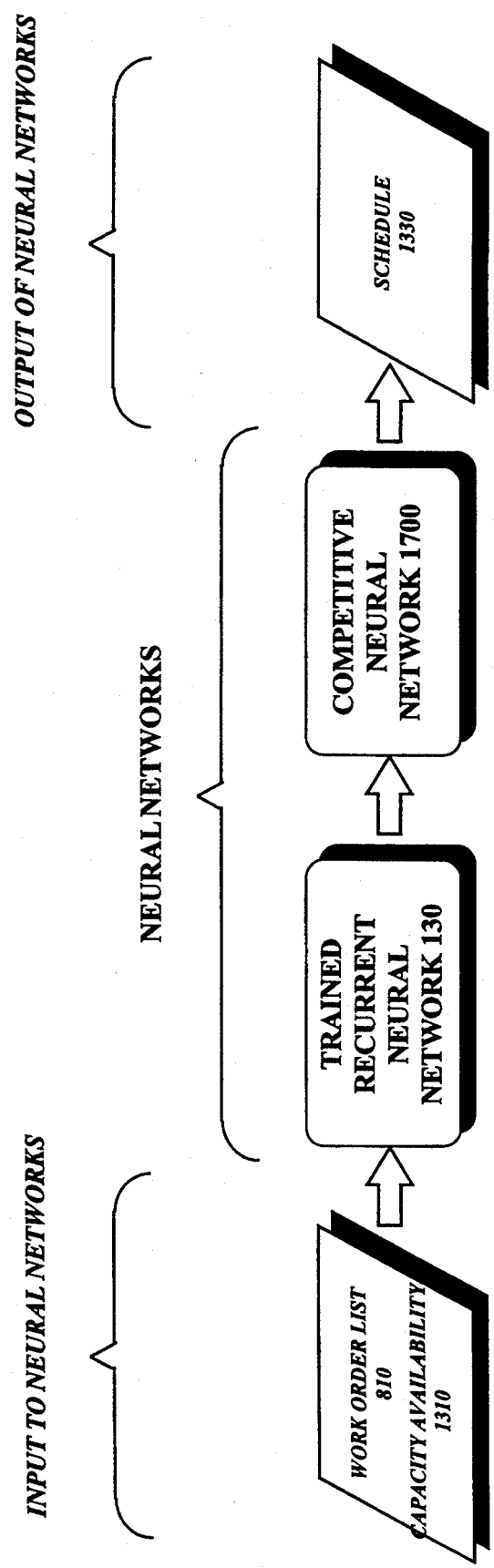
FIG. 28 is one embodiment of a detailed block diagram of one embodiment of trained recurrent neural network 130 and competitive network 1700, of FIG. 22 showing the types of Input and output data used by the networks in the recall phase.

Referring to FIG. 18, before inputting to scheduling engine 260 for scheduling, the list of sorted work orders 810 are preprocessed by knowledge processor 120 as indicated by step pointer 293. After preprocessing of work orders 810 is completed, the work order at the top of the list is then fed to scheduling engine 260 for scheduling. As shown in Figure 28, scheduling engine 260 is embedded with a recurrent neural network 130 previously trained to build a scheduling knowledge base 150 and a competitive neural network 1700. In other words, scheduling engine 260 is a system of two neural networks and together they are used to solve the dynamic scheduling problem. New to the scheduling engine 260 of the present invention is competitive neural network 1700 which can be implemented using the interactive activation and competitive model. It should be understood that the use of interactive activation and competitive network is not exclusive to the present invention. Other types of competitive neural networks such as the Boltzmann machine are applicable as well. A more detailed description of Boltzmann machine can be found in Ackley, Hinton, and Sejnowski, "Learning and Relearning in Boltzmann Macines" in Parallel Distributed Processing: Volume 1 Foundation, edited by McClelland and Rumelhart, MIT Press, 1988.

An interactive and competitive network consists of a collection of neurons organized into some number of competitive pools. There are excitatory connections among neurons in different pools and inhibitory connections among neurons within the same pool. This organization allows neurons in different pools to interact with one another and neurons within the same pool to compete with one another. The updating equations for summation and transfer functions are given in [5] and [6] below:

$$net_i = \sum_j w_{ij} output_j + extinput_i \quad (5)$$

If $net_i > 0$, $\Delta a_i = net_i(max - a_i) - decay(a_i - rest)$ (6)

where;
$max = 1$, $min < rest < 0$, and $0 < decay < 1$

The decay rate determines how fast the stable condition is reached. The recommended values are $max = 1$, $min = -0.2$, $rest = 0$, and $decay = 0.07$. A full description of this particular network can be found in James L. McClelland and David E. Rumelhart, "Explorations in Parallel Distributed Processing: A Handbook of Models, Programs, and Exercises", MIT Press, 1988.

The neurons in the interactive activation and competitive network of the present invention are organized into a number of pools such as setup time pool, machine pools, and time unit pools. The trained recurrent neural network 130 is linked with the competitive network 1700 via corresponding connections from the output layer of the recurrent neural network 130 to the pools of the interactive activation and competitive network. In addition there are connections between the input layer of the recurrent neural network 130 and the interactive and competitive network.

Figure 22:
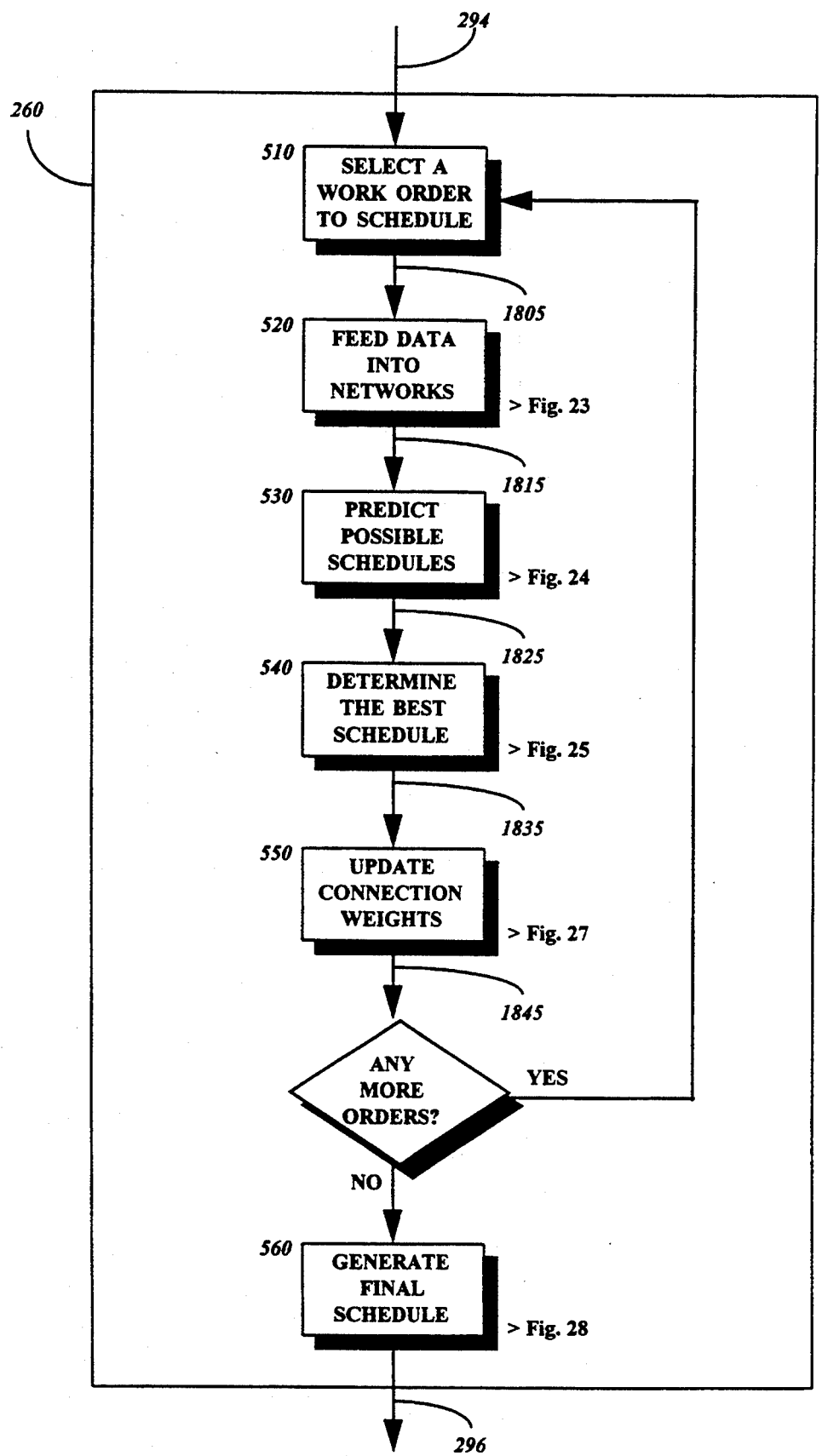
FIG. 22 is one embodiment of an intermediate block diagram of oneembodiment of the steps which make up the scheduling engine 260 of FIG. 18 for generating schedule for producing schedgle for work orders 810.
Figure 23:
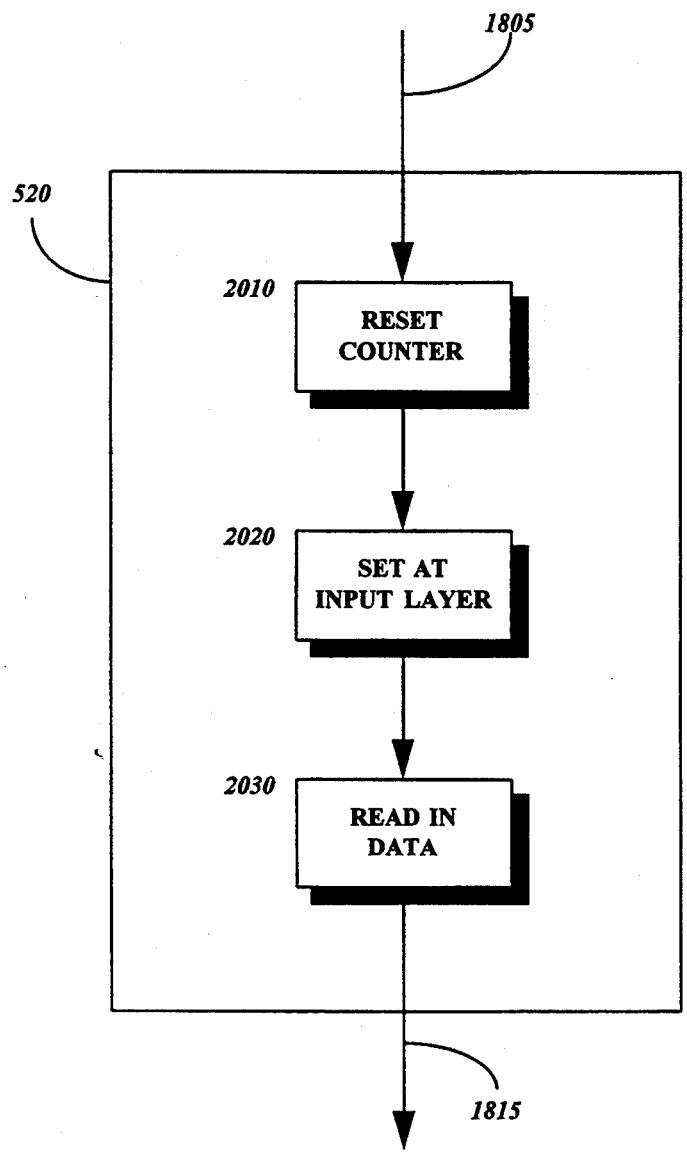
FIG. 23 is one embodiment of a detailed block diagram of one embodiment of the steps of inputting data into neural networks of FIG. 22.

The scheduling approach of the present invention is based on sequential assignment paradigm which builds up final schedule 270 from a partial schedule incrementally. As shown by step pointer 293 of FIG. 18, a work order 810 from sequencer 240 is selected for scheduling. The work order is then encoded by knowledge processor 120 and fed to scheduling engine 260. Referring now to FIG. 22, scheduling of work orders 810 by scheduling engine 260 begins with selecting a work order from an input file to schedule (step 510). The work order and together with capacity availability data, which represents input vector 1818 of FIG. 6, is first fed to trained recurrent neural network 130 (step 520). FIG. 23 shows a more detailed figure of step 520. Before input vector 1818 is read into the neural network, the processing counter is reset to a predefined value. This counter is used by competitive neural network 1700 to determine the number of cycles needed for interaction and competition. The input vector is then read into the input layer of trained recurrent neural network 130 (steps 2020 and 2030).

Figure 24:
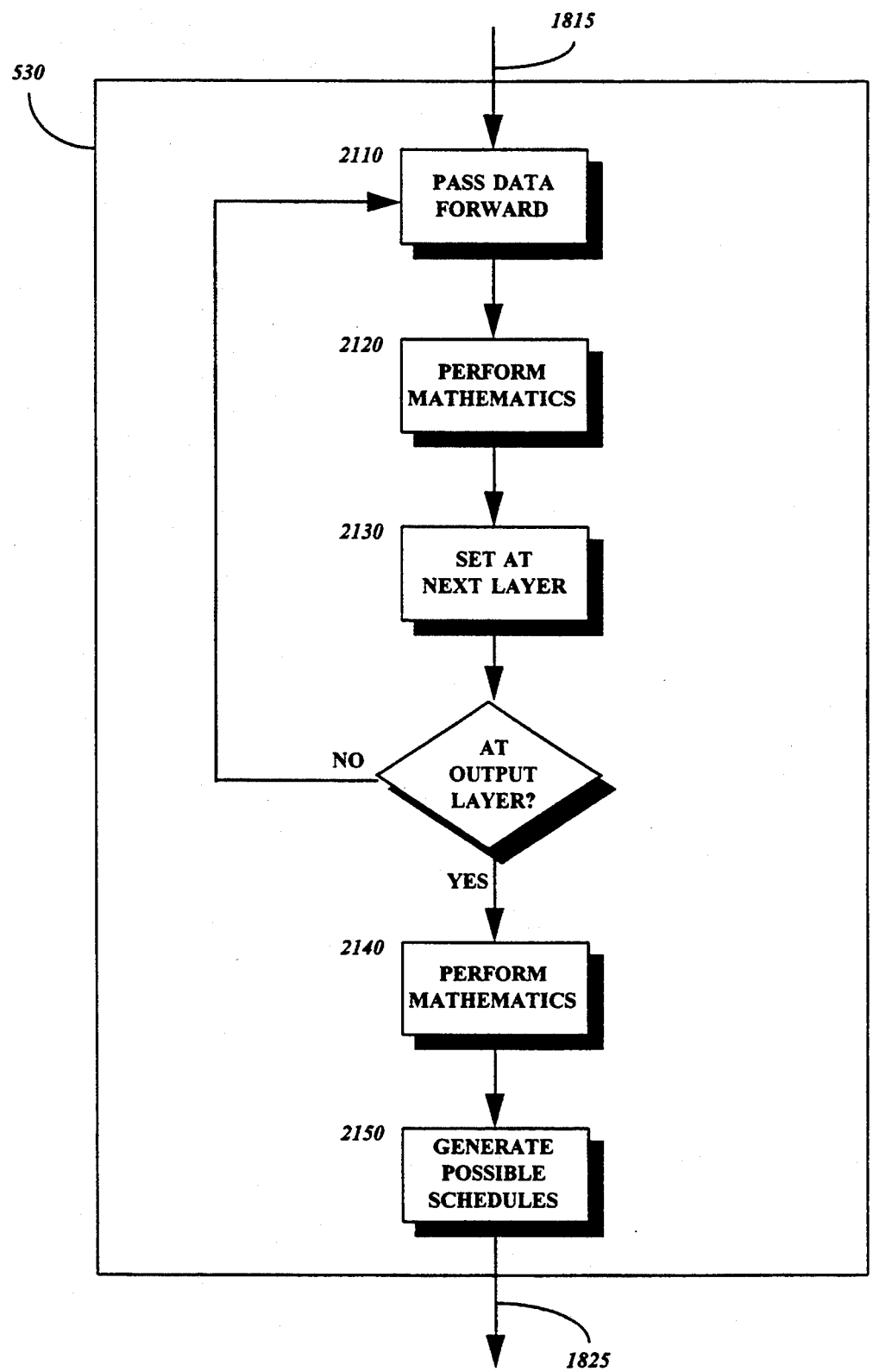
FIG. 24 is one embodiment of a detailed block diagram of one embodiment of the steps of predicting possible schedules of FIG. 22 using a trained recurrent neural network 130.

From the input layer of trained recurrent neural network 130, input vector 1818 are passed forward to the next layer after having been processed by a set of equations, e.g. equations (2) and (3) taking into account of connection weights 1828 of FIG. 6 between the layers (steps 2120 and 2130 of FIG. 24). This process is repeated until the output layer of trained recurrent neural network is reached. The output of the output represents possible schedules for the work order. These output are subsequently propagated to competitive neural network 1700 for determining the best schedule among the possible schedules. It should be noted that the trained recurrent neural network 130 consists of a scheduling knowledge base which is stored in connection weights 1828 (FIG. 6) spread over the whole network. These connection weights are fixed during the recall or scheduling phase.

Figure 25:
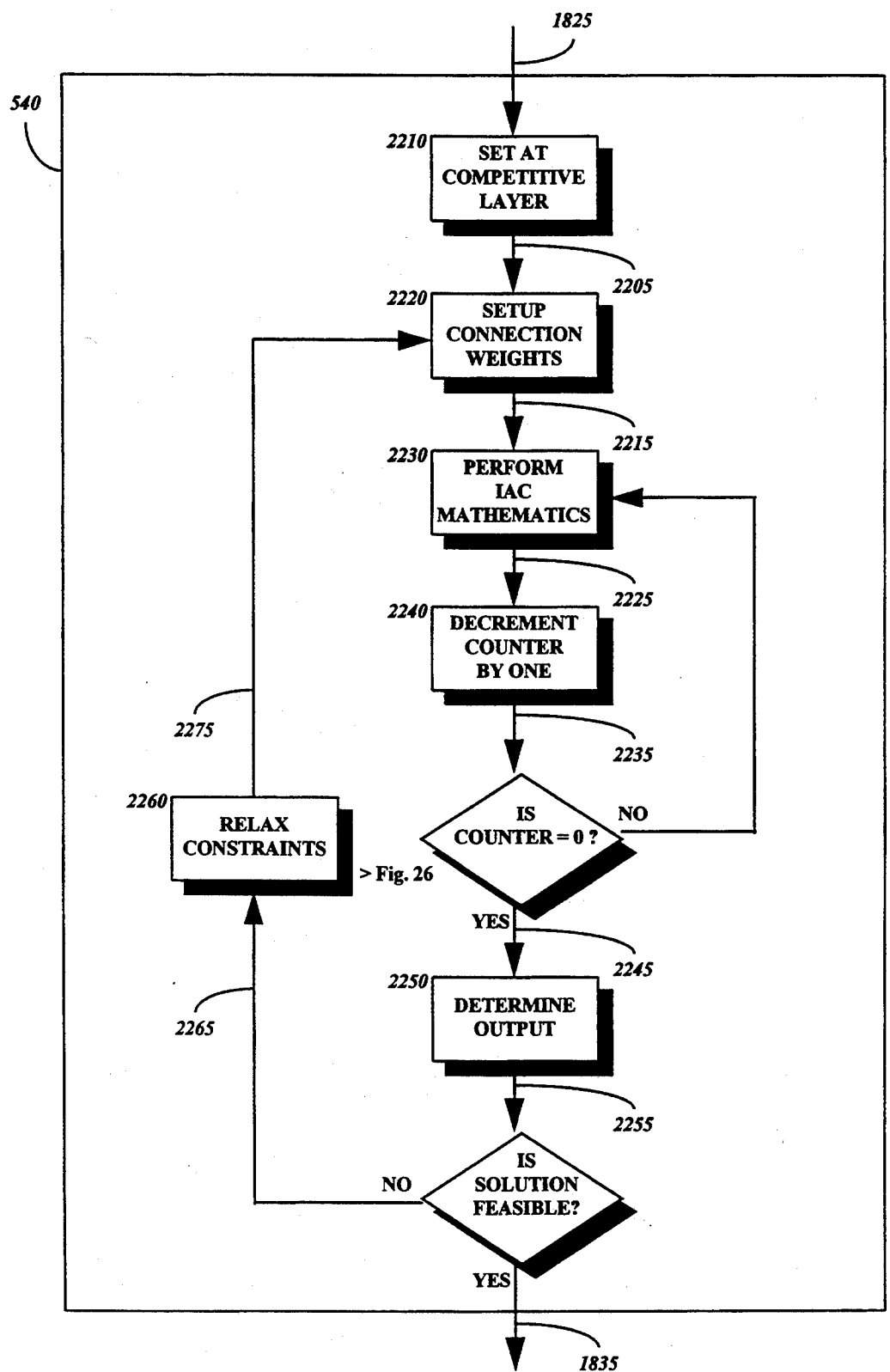
FIG. 25 is one embodiment of a detailed block diagram of one embodiment of the steps of determining output which represents schedule of FIG. 22 using competitive neural network 1700.

Once the possible schedules have been calculated, step pointer 1825 in FIG. 22 shows that the schedules are used to determine the best schedule (step 540). Referring now to FIG. 25, the next stage of the scheduling process is set at the competitive neural network 1700. Before competitive neural network 1700 begins processing, its connection weights must be setup (step 2220). This involves special connections 1878 (FIG. 6) which are affected by the input vector 1818. Excitatory or inhibitory weights are assigned to these connections as appropriate. For example, all connections which relate to the same part number of the work order being scheduled are assigned with excitator (positive) values. After connection weights are properly setup, then interactive and competitive process (step 2230) can begin. This process continues until the processing counter is equal to zero. After which the output of the processing is determined (step 2250). A specific example of the details for steps 2220, 2230, and 2250 is given in software listing 3 of the Appendix.

Figure 26:
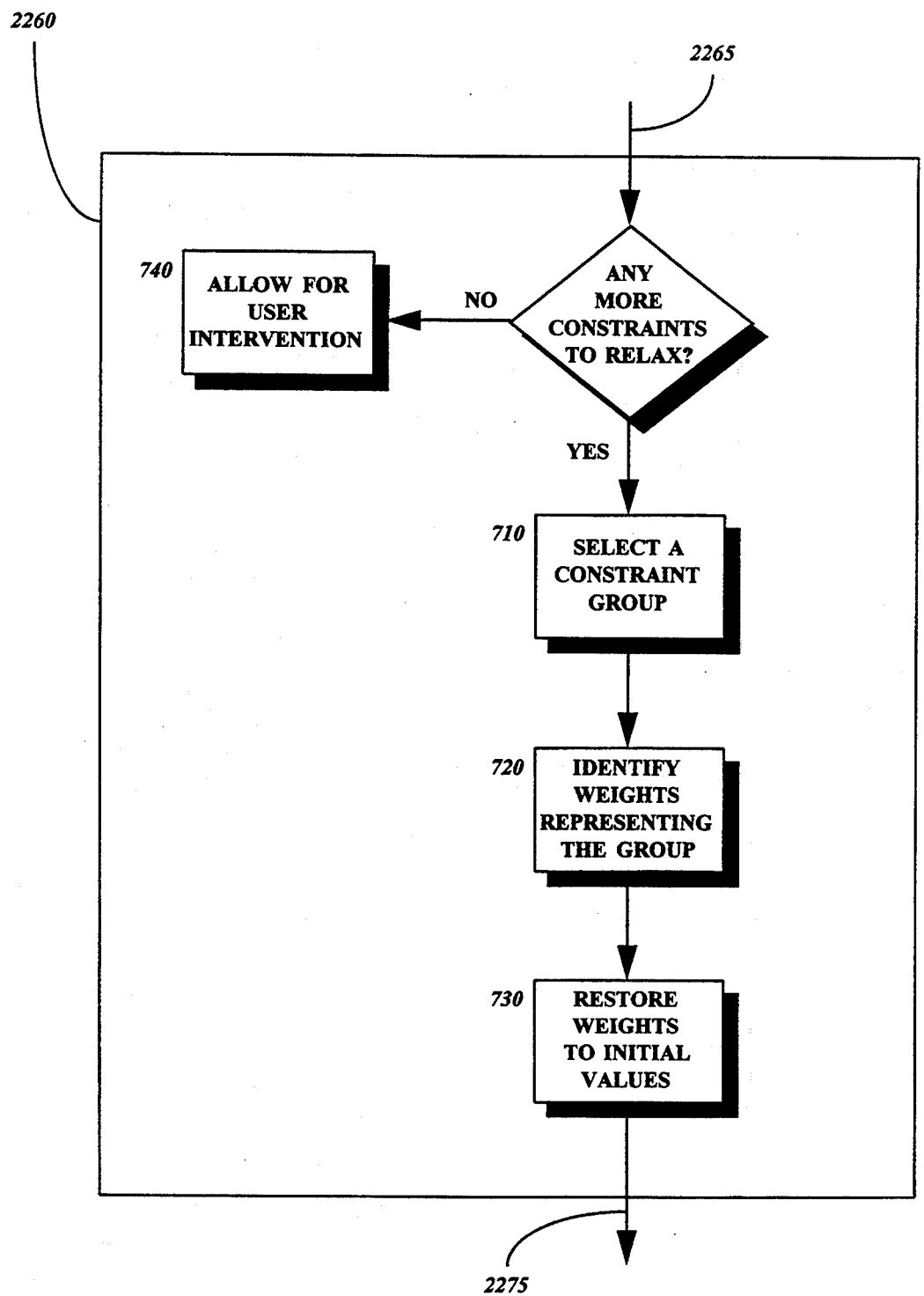
FIG. 26 is one embodiment of a detailed block diagram of one embodiment of the steps for constraints relaxation of FIG. 24 when scheduling of a work order is unsuccessful.

When a work order assignment is not successful, then soft constraints can be relaxed. In this invention, soft constraints are divided into priority groups by their importance. Relaxation of soft constraints will proceed from the least important group to the most important group. As shown in FIG. 26, relaxation of constraints involves first identifying the connections that represent the constraints (step 720) and then restoring the connection weights to the fixed weights as stored in the scheduling knowledge base 150 (step 730). Unsuccessful work order assignment can still arise after constraint relaxation. In this situation, human intervention is required (step 740). The user intervention module allows a user to delete a previous assignment from the schedule or add a new assignment for a work order into the schedule. Typical examples of the messages from the user intervention module are rescheduling of existing work orders, change of the order's customer need dates, and/or increase of manpower capacity.

Referring to FIG. 22, after the best schedule has been determined, relevant connection weights must be updated to reflect new scheduling constraints (step 550). A more detailed description of this process is given in FIG. 27. As shown in step 2310 of FIG. 27, the processing layer is again set at the competitive neural network 1700. All variable weights related to the output (step 2250 in FIG. 25) is first initialized. The appropriate excitatory or inhibitory values are then assigned to the connection weights (steps 2330 and 2340). For example, after a work order is assigned to machine A from time unit 10 to time unit 20, then other work orders are not allowed to use machine A from time unit 10 to time unit 20 anymore. A large inhibitory or negative weight is assigned to the appropriate connection to enforced this constraint. FIG. 28 shows the details of the input data used and output data generated by trained recurrent neural network 130 and competitive neural network 1700. A specific example of the details for steps 2320, 2330, and 2340 is given in software listing 3 of the Appendix.

Those skilled in the art, having the benefit of the teachings of the present invention as herein above set forth may effect numerous modifications thereto. It should be understood that such modifications are to be construed as lying within the contemplation of the present invention as defined by the appended claims.

All publications and patent applications mentioned in this specification are herein incorporated by reference to the same extent as if each individual publication or patent application was specifically and individually indicated to be incorporated by reference.

APPENDIX

```
;*******************************************************************
;*                                                                  *
;*              SOURCE LISTING 1                                    *
;*              ------------------                                  *
;*                                                                  *
;*   SIMULATOR was developed using the SIMAN IV simulation language, a *
;*   product of Systems Modeling Corporation, Sewickley, PA 15143, USA. *
;*   It consists of a WORK ORDER MODEL and a SCHEDULING MODEL.      *
;*   This is the WORK ORDER MODEL which is used to create work orders *
;*   with all scheduling data, and together with machine workload and *
;*   operational policies.                                          *
;*                                                                  *
;*                                                                  *
;*        Programmer:    John Khaw                                  *
;*        First Created: 1 November 1991                            *
;*        Latest Mod.:   28 October 1992                            *
;*                                                                  *
;*            © Singapore Computer Systems, Ltd. 1993               *
;*                 All Rights Reserved                              *
;*                                                                  *
;*******************************************************************
;
; This MODEL portion of the WORK ORDER MODEL consists of two parts:
;
; The first part creates work orders which are then placed in a queue.
;
```

```
; This portion of codes correspond to step 964 of Figure 9.
; *****************************************************
;
First    CREATE:      EX(Order);                        Poisson arrivals of WO
         BRANCH,      1:                                !Stop creating WO at 150
                      If,TNOW < Enough,Continue:
                      Else,Second;
;
; Assign details to created work order such as work order no., part number,
; component group number, family group number, earliest start date,
; order due date, order priority, and priority index (score).
;
Continue ASSIGN:      J = J + 1:
                      WorkOrder = J:
                      PartNo = DP(Part,6);              !Use a discrete dist.
                      CompGrp = P(PartNo,1):            !Predefined
                      FamilyGrp = P(PartNo,2):          !Predefined
                      EarliestSD = TNOW:                !TNOW is current time
                      DueDate = EarliestSD + TR(
                      DateDue):                         !TNOW+a triangular dist.
                      RunTime = TR(Run,9);              !Use a triangular dist.
                      Priority = DP(Prior):             !Order priority
                      Score = EarliestSD*esd +
                      DueDate*edd + Priority*pr;        Score is priority index
SortingQ  QUEUE,      SortingQ:
                      DETACH;                           Sorting queue
;
; The second part of this MODEL portion sorts all the created work orders.
;
; Work orders are sorted based on priority index (score).
; If priority indices are the same, then sort the work orders based on
; earliest start date which is accomplished by the SCHEDULING MODEL.
;
Second   ASSIGN:      Number = Number + 1;
         SEARCH,      SortingQ:                         !Queue where WOs are put
                      MIN(Score);                       Sorted by min. score BRANCH,      1:
                      If,J > 0,Move:
                      Else,Done;
Move     REMOVE:                                        !Remove WO w/ min score
                      J,SortingQ,File:
                      DISPOSE;                          and place it in the file
File     WRITE,       SNNFile,"(9(F6.0, 2X))":
                      Number,PartNo,CompGrp,
                      FamilyGrp,EarliestSD,DueDate,
                      RunTime,Priority,Score;           Write output to a file
         DELAY:       :
                      DISPOSE;
Done     ASSIGN:                                        !Ending simulation time
                      TFIN = TNOW:
                      DISPOSE;
END;

BEGIN;
;
;    This is the ELEMENT portion of the WORK ORDER MODEL.
;
;
;    This portion of codes correspond to step 962 of Figure 9.
;    *****************************************************
;
PROJECT,       Work Order Model,KFC,1/11/91;
;
;    Attributes attached to work orders are defined here.
;
ATTRIBUTES:    WorkOrder:
               PartNo:
               CompGrp:
               FamilyGrp:
               EarliestSD:
               DueDate:
               RunTime:
               Priority:
               Score;
```

```
;   The relationships of part number, component group number, and family
;   group number, and all distributions used are defined here.
;
QUEUES:         SortingQ,LVF(Score);
PARAMETERS:     PN1,1,1:
                PN2,1,1:
                PN3,15,8:
                PN4,2,1:
                PN5,2,1:
                PN6,2,1:
                PN7,4,2:
                PN8,4,2:
                PN9,15,8:
                PN10,8,4:
                PN11,8,4:
                PN12,5,2:
                PN13,9,4:
                PN14,6,3:
                PN15,6,3:
                PN16,10,5:
                PN17,7,3:
                PN18,10,5:
                PN19,12,6:
                PN20,10,5:
                PN21,3,7:
                PN22,14,7:
                PN23,13,6:
                PN24,13,6:
                PN25,13,6:
                PN26,5,2:
                PN27,9,4:
                PN28,14,7:
                PN29,9,4:
                PN30,11,5:
                Order,0.4:
                Part,0.033,1,0.066,2,0.1,3,0.133,
                4,0.166,5,0.2,6,0.233,7,0.266,8,
                0.3,9,0.333,10,0.366,11,0.4,12,
                0.433,13,0.466,14,0.5,15,0.533,16,
                0.566,17,0.6,18,0.633,19,0.666,20,
                0.7,21,0.733,22,0.766,23,0.8,24,
                0.833,25,0.866,26,0.9,27,0.933,28,
                0.966,29,1.0,30:
                DateDue,90,120,180:
                Run,1,6,12:
                StartDate,90:
                Prior,0.1,1,0.3,2,0.7,3,0.9,4,1.0,
                5;
;
;   These variables are used to define operational policies.
;
;
;   This portion of codes correspond to step 966 of Figure 9.
;   ************************************************************
;
VARIABLES:      esd,0.5:                            !earliest start date
                edd,0.9:                            !earliest due date
                pr,1.0:                             !Order priority
                Enough,150:                         !Until time 150
                Number,0;                           Sorting number
;
;   Write output to pump1x.nna, where x is a running alphabet.
;
FILES:          SNNFile,"c:\siman\tmh.nna",,PRE;
;
;   Run this model till 500 time units.
;
REPLICATE,      ,0,500;
END;
```

```
BEGIN;
;************************************************************
;                                                            *
;                    SOURCE LISTING 2                        *
;                    ----------------                        *
;                                                            *
;       This is the SCHEDULING MODEL of the SIMULATOR. It consists of
;       two part: the model part and the experiment part. The model part
;       models the scheduling logic of a particular factory floor
;       environment. The experiment part is used to define the various
;       experimental conditions.
;
;
;              Programmer:     John Khaw
;              First Created:  1 November 1991
;              Latest Mod.:    28 October 1992
;
;
;              (C) Singapore Computer Systems, Ltd. 1993
;                    All Rights Reserved
;
;************************************************************
        CREATE;
;
;       Read in work order data from a file
;
;       This portion of codes correspond to step 1056 in Figure 10.
;       ********************************************************
;
ReadNext  READ,         SNNFile,Free:
                        WorkOrder,PartNo,CompGrp,
                        FamilyGrp,EarliestSD,DueDate,
                        RunTime,Priority,Score;
;
;       Delay until work order's earliest start date arrives
;
          DELAY:        EarliestSD - TNOW;
          DUPLICATE:    1,ReadNext;
;
;       Select machine tooled with the same part number
;
          ASSIGN:       Index = 1;
PN        BRANCH,       1:
                        If,NQ(P(PartNo,Index)) = 0,
                        Part:
                        If,AQUE(P(PartNo,Index),NQ(P(PartNo,Index)),
                        NSYM(PartNo)) <> PartNo,PartNextMach:
                        Else,GetMachPart;
Part      BRANCH,       1:
                        If,Pt(P(PartNo,Index))==
                        PartNo,SchedulePart:
                        Else,PartNextMach;
;
;       Next machine set up with the same part number
;
PartNextMach ASSIGN:    Index = Index + 1;
          BRANCH,       1:
                        If,P(PartNo, Index) <> -1,PN:
                        Else,GoToComp;
;
;       Make sure the due date is met
;
GetMachPart BRANCH,     1:
                        If,DueDate>(SAQUE(P(PartNo,Index),NSYM(RunTime))+
                        TNOW + RunTime),SchedulePart:
                        Else,PartNextMach;
;
;       Assign no setup time to work order with the same part number
;
SchedulePart ASSIGN:    M = P(PartNo, Index):
                        SetupTime = 0:
                        NEXT(Q);
;
;       If machine tooled with the same part number is not available,
;       then select machine set up with the same component group
;
```

```
GoToComp ASSIGN:        Index = 1;
CG       BRANCH,        1:
                        If,NQ(P(PartNo,Index)) == 0,
                        Component:
                        If,AQUE(P(PartNo,Index),NQ(P(PartNo,Index)),
                        NSYM(CompGrp)) <> CompGrp,CompNextMach:
                        Else,GetMachComp;
Component BRANCH,       1:
                        If,C(P(PartNo, Index)) ==
                        CompGrp,ScheduleComp:
                        Else,CompNextMach;
;
;       Next machine setup with the same component group
;
CompNextMach ASSIGN:    Index = Index + 1;
        BRANCH,         1:
                        If,P(PartNo, Index) <> -1,CG:
                        Else,GoToFamily;
;
;       Make sure the due date is met
;
GetMachComp BRANCH,     1:
                        If,DueDate>(SAQUE(P(PartNo,Index),NSYM(RunTime))+
                        TNOW + (RunTime + 1)),
                        ScheduleComp:
                        Else,CompNextMach;
;
;       Assign one time unit (4 hours) of setup time to work order
;       with the same component group
;
ScheduleComp ASSIGN:    M = P(PartNo, Index):
                        SetupTime = 1:
                        NEXT(Q);
;
;       If machine tooled with the same component group is not available,
;       then select machine set up with the same family group
;
GoToFamily ASSIGN:      Index = 1;
FG       BRANCH,        1:
                        If,NQ(P(PartNo, Index)) == 0,
                        Family:
                        If,AQUE(P(PartNo,Index),NQ(P(PartNo,Index)),
                        NSYM(FamilyGrp)) <> FamilyGrp,
                        FamilyNextMach:
                        Else,GetMachFamily;
Family   BRANCH,        1:
                        If,F(P(PartNo,Index)) ==
                        FamilyGrp,ScheduleFamily:
                        Else,FamilyNextMach;
;
;       Next machine setup with the same family group
;
FamilyNextMach ASSIGN:  Index = Index + 1;
        BRANCH,         1:
                        If,P(PartNo, Index) <> -1,FG:
                        Else,SelectMachine;
;
;       Make sure the due date is met
;
GetMachFamily BRANCH,   1:
                        If,DueDate>(SAQUE(P(PartNo,Index),NSYM(RunTime))+
                        TNOW + (RunTime + 2)),
                        ScheduleFamily:
                        Else,FamilyNextMach;
;
;       Assign two time units (8 hours) of setup time to work order
;       with the same family group
;
ScheduleFamily ASSIGN:  M = P(PartNo, Index):
                        SetupTime = 2:
                        NEXT(Q);
;
;       No machine with the same setup can be found, so select
;       machine with the minimum queue.
;
SelectMachine FINDJ,    P(PartNo, Mach(PartNo)),P(PartNo,1):
                        MIN(SAQUE(J, NSYM(RunTime)));
```

```
;       Assign 4 time units of setup time to the work order
;
        ASSIGN:         M = J:
                        SetupTime = 4:
                        NEXT(Q);
;
;       Schedule the work order on the machine selected
;
ARR     ASSIGN:         J = J + 1:
                        M = J;
Q       QUEUE,          M;
        SEIZE:          Machine(M):
                        Man;
        ASSIGN:         Pt(M) = PartNo:
                        C(M) = CompGrp:
                        F(M) = FamilyGrp:
                        StartDate = TNOW:
                        Rate = R(M);
        BRANCH,         1:
                        If,TNOW < 240,GoOn:
                        Else,Enough;
GoOn    DELAY:          SetupTime + RunTime;
        RELEASE:        Machine(M);
        RELEASE:        Man;
;
;       Write output to a file
;
        WRITE,          Reda,"(9(F5.0, 3X))":
                        WorkOrder,PartNo,CompGrp,
                        FamilyGrp,EarliestSD,DueDate,
                        RunTime,Priority,Score;
        WRITE,          Reda,"('Machine:', F3.0, 3X,
                        'Start Date:',F5.0, 3X,
                        'Setup Time:', F3.0, 3X,
                        'End Date:', F5.0)":
                        M,StartDate,SetupTime,TNOW;
        BRANCH,         1:
                        If,TNOW > DueDate,AddOne:
                        Else,Skip;
AddOne  COUNT:          OverDue Orders;
;
;       Collect statistics for flow time, tardiness, and order cost
;
Skip    TALLY:          FlowTime,INT(EarliestSD);
        TALLY:          Tardiness,MX(0,(TNOW-DueDate));
        TALLY:          OrderCost,(SetupTime+RunTime) * Rate;
Enough  DELAY:          0:
                        DISPOSE;
END;

BEGIN,          n,n;
;
;  This is the ELEMENT portion of the SCHEDULING MODEL of the SIMULATOR
;
;
;  This portion of codes correspond to step 1054 of Figure 10.
;  ********************************************************
;
PROJECT,        Scheduling Model,John Khaw,5/11/91;
ATTRIBUTES:     WorkOrder:
                PartNo:
                CompGrp:
                FamilyGrp:
                EarliestSD:
                DueDate:
                RunTime:
                Priority:
                Score:
                SetupTime:
                Index:
                StartDate:
                Rate;
VARIABLES:      Mach(30),5,5,1,5,5,5,7,7,1,8,8,7,
                8,5,5,7,5,7,4,7,6,6,4,4,4,7,8,6,8,
                7:
```

```
                        Pt(1..16),0:
                        C(1..16),0:
                        F(1..16),0:
                        R(16),20.0,16.0,28.0,22.5,25.0,
                        20.0,16.0,16.0,18.5,21.0,20.0,
                        24.0,24.0,20.0,28.0,36.0;
QUEUES:                 16;
RANKINGS:               1-16,LVF(Score);
COUNTERS:               OverDue Orders;
RESOURCES:              Machine(16),1,1,1,1,1,1,1,1,1,1,1,
                        1,1,1,1,1:
                        Man,SCHED(3);
;
;
; This portion of codes correspond to step 1058 of Figure 10.
; ************************************************************
;
;
SCHEDULES:              1,1*90,1*4,0*2,1*4,0*2,1*4,0*2,1*
                        4,0*2,1*4,0*2,1*4,0*2,1*4,0*2,1*4,
                        0*2,1*4,0*2,1*4,0*2:
                        2,1*4,0*2,1*4,0*2,1*4,0*2,1*4,0*2,
                        1*4,0*2:
                        3,16*4,0*2:
                        4,16*6;
ARRIVALS:               BLOCK(ARR),0.0,1,1,13,9,4,0,60,6,
                        1,1:
                        BLOCK(ARR),0.0,1,2,29,9,4,0,45,3,
                        1,1:
                        BLOCK(ARR),0.0,1,3,6,2,1,0,30,3,1,
                        1:
                        BLOCK(ARR),0.0,1,4,14,6,3,0,50,9,
                        1,1:
                        BLOCK(ARR),0.0,1,5,17,7,3,0,76,10,
                        1,1:
                        BLOCK(ARR),0.0,1,6,23,13,6,0,60,6,
                        1,1:
                        BLOCK(ARR),0.0,1,7,21,3,7,0,40,10,
                        1,1:
                        BLOCK(ARR),0.0,1,8,28,14,7,0,45,9,
                        1,1:
                        BLOCK(ARR),0.0,1,9,7,4,2,0,30,6,1,
                        1:
                        BLOCK(ARR),0.0,1,10,12,5,2,0,55,4,
                        1,1:
                        BLOCK(ARR),0.0,1,11,20,10,5,0,38,
                        6,1,1:
                        BLOCK(ARR),0.0,1,12,18,10,5,0,60,
                        6,1,1:
                        BLOCK(ARR),0.0,1,13,16,10,5,0,125,
                        12,1,1:
                        BLOCK(ARR),0.0,1,14,10,8,4,0,70,6,
                        1,1:
                        BLOCK(ARR),0.0,1,15,30,11,5,0,88,
                        11,1,1:
                        BLOCK(ARR),0.0,1,16,9,15,8,0,60,6,
                        1,1;
;
;
; This portion of codes correpond to step 1052 of Figure 10.
; ************************************************************
;
;
PARAMETERS:             PN1,1,2,3,11,12,-1:
                        PN2,1,2,3,11,12,-1:
                        PN3,16,-1:
                        PN4,1,2,3,11,12,-1:
                        PN5,1,2,3,11,12,-1:
                        PN6,1,2,3,11,12,-1:
                        PN7,4,5,6,7,8,9,10,-1:
                        PN8,4,5,6,7,8,9,10,-1:
                        PN9,16,-1:
                        PN10,1,2,3,11,12,13,14,15,-1:
                        PN11,1,2,3,11,12,13,14,15,-1:
                        PN12,4,5,6,7,8,9,10,-1:
                        PN13,1,2,3,11,12,13,14,15,-1:
                        PN14,4,5,6,9,10,-1:
```

```
                    PN15,4,5,6,9,10,-1:
                    PN16,1,2,11,12,13,14,15,-1:
                    PN17,4,5,6,9,10,-1:
                    PN18,1,2,11,12,13,14,15,-1:
                    PN19,5,6,7,8,-1:
                    PN20,1,2,11,12,13,14,15,-1:
                    PN21,5,6,7,8,9,10,-1:
                    PN22,5,6,7,8,9,10,-1:
                    PN23,5,6,7,8,-1:
                    PN24,5,6,7,8,-1:
                    PN25,5,6,7,8,-1:
                    PN26,4,5,6,7,8,9,10,-1:
                    PN27,1,2,3,11,12,13,14,15,-1:
                    PN28,5,6,7,8,9,10,-1:
                    PN29,1,2,3,11,12,13,14,15,-1:
                    PN30,1,2,11,12,13,14,15,-1;
TALLIES:            FlowTime,"flow.dat":
                    Tardiness,"tardy.dat":
                    OrderCost;
DSTATS:             NR(1)/MX(MR(1),NR(1),1),
                      Machine 1 Utilization:
                    NR(2)/MX(MR(2),NR(2),1),
                    Machine 2 Utilization:
                    NR(3)/MX(MR(3),NR(3),1),
                    Machine 3 Utilization:
                    NR(4)/MX(MR(4),NR(4),1),
                    Machine 4 Utilization:
                    NR(5)/MX(MR(5),NR(5),1),
                    Machine 5 Utilization:
                    NR(6)/MX(MR(6),NR(6),1),
                    Machine 6 Utilization:
                    NR(7)/MX(MR(7),NR(7),1),
                    Machine 7 Utilization:
                    NR(8)/MX(MR(8),NR(8),1),
                    Machine 8 Utilization:
                    NR(9)/MX(MR(9),NR(9),1),
                    Machine 9 Utilization:
                    NR(10)/MX(MR(10),NR(10),1),
                    Machine 10 Utilization:
                    NR(11)/MX(MR(11),NR(11),1),
                    Machine 11 Utilization:
                    NR(12)/MX(MR(12),NR(12),1),
                    Machine 12 Utilization:
                    NR(13)/MX(MR(13),NR(13),1),
                    Machine 13 Utilization:
                    NR(14)/MX(MR(14),NR(14),1),
                    Machine 14 Utilization:
                    NR(15)/MX(MR(15),NR(15),1),
                    Machine 15 Utilization:
                    NR(16)/MX(MR(16),NR(16),1),
                    Machine 16 Utilization:
                    NR(Man)/MX(MR(Man),NR(Man),1),
                    Manpower Utilization:
                    NQ(1),Queue 1:
                    NQ(2),Queue 2:
                    NQ(3),Queue 3:
                    NQ(4),Queue 4:
                    NQ(5),Queue 5:
                    NQ(6),Queue 6:
                    NQ(7),Queue 7:
                    NQ(8),Queue 8:
                    NQ(9),Queue 9:
                    NQ(10),Queue 10:
                    NQ(11),Queue 11:
                    NQ(12),Queue 12:
                    NQ(13),Queue 13:
                    NQ(14),Queue 14:
                    NQ(15),Queue 15:
                    NQ(16),Queue 16;
FILES:              Reda,"c:\siman\pump2\dummy1.nna",,
                    FRE:
                    SNNFile,"c:\siman\tma.nna",,FRE,
                    DIS;
REPLICATE,          ,0,180,,,30;
END;
```

```
/*********************************************************************/
/*                                                                   */
/*                      SOURCE LISTING 3                             */
/*                      ----------------                             */
/*                                                                   */
/* This program encodes the neuro-dynamic functions based on         */
/* Rumelhart's interactive activation and competitive model.         */
/* These functions are used in the competitive neural network        */
/* of the scheduling engine.                                         */
/*                                                                   */
/* These functions are recompiled and linked with NeuralWare's       */
/* libraries and are run from NeuralWorks Professional II+,          */
/* a product of NeuralWare, Inc. Pittsburgh, PA 15276.               */
/*                                                                   */
/* Name of programmer    : John Khaw Fook Cheon                      */
/* First created         : 10 January 1992                           */
/* Date of latest mod.   : 24 February 1993                          */
/*                                                                   */
/*                                                                   */
/*            (C) Singapore Computer Systems, Ltd. 1993              */
/*                      All Rights Reserved                          */
/*                                                                   */
/*********************************************************************/

/* 1-10-92 (usermath.c)   User-Defined Neuro-Dynamics Prototype */ define USERMATH
define USER_BACKPROP 1
undef USER_BACKPROP if defined(NW2d) || defined(NW2D)      /* * SPECIAL KLUDGE FOR NOW ** */
define C_ON_FLY
endif include <math.h>
include "usermath.h"

/* Useful preprocessor macros */
/* (a) Recall Schedule Macros: */
#define RCOLP    (ulp->r_col_p)    /* Recall column pointer */
#define RCOLX    (ulp->r_col_x)    /* Recall column index */
#define RSTEP    (RCOLP->rstep)
#define CLAMP    (RCOLP->iclamp)
#define FIRE     (RCOLP->fire)
#define RTEMP    (RCOLP->rtemp)
#define MODF     (RCOLP->modf)
#define GAIN     (RCOLP->gain)
/* (b) Learn Schedule Macros: */
#define LCOLP    (ulp->l_col_p)    /* Learn column pointer */
#define LCOLX    (ulp->l_col_x)    /* Learn column index */
#define LSTEP    (LCOLP->lcount)
#define LCOEF1   (LCOLP->lcoef1)
#define LCOEF2   (LCOLP->lcoef2)
#define LCOEF3   (LCOLP->lcoef3)
#define LTEMP    (LCOLP->ltemp)
/* (c) Network Counter Macros: */
#define RCOUNT   (um_ctr[CTR_RECALL])
#define LAYER    (um_ctr[CTR_LAYER])
#define LCOUNT   (um_ctr[CTR_LEARN])
#define AUX1     (um_ctr[CTR_AUX1])
#define AUX2     (um_ctr[CTR_AUX2])
#define AUX3     (um_ctr[CTR_AUX3])
#define WORK1    (um_ctr[CTR_WRK1])
#define WORK2    (um_ctr[CTR_WRK2])
/* (d) Layer Parameter macros: */
#define SCALE    (ulp->scale)
#define OFFST    (ulp->offset)
#define LO_CLIP  (ulp->lo_clip)
#define HI_CLIP  (ulp->hi_clip)
#define FP_OFF   (ulp->fprime_off)
define INPUT    (ulp->l_dsp.g_name != src_lp->l_dsp.g_name)   /* Input layer */ define EXPLIM   12.0    /* limit for exponentials to be fixed */ ifndef DPK
/* um_event() is called whenever a significant event occurs which might
   require attention by this particular usermath routine.  It is ONLY
   called if the current network uses a user-math function in one of
   its layers. */
```

```
#if defined(ANSI_HEADER)

NINT    um_event( XB *netnp, XB *csnp, USR_LYR *SLayerp, NINT code )

#else

NINT    um_event( netnp, csnp, SLayerp, code )
XB      *netnp;         /* network name (ascii) */
XB      *csnp;          /* control strategy name pointer */
USR_LYR *SLayerp;       /* current super-layer pointer */
NINT    code;           /* event code */ endif
{
    NINT  rc;    /* return code */ rc = 0;
    switch( code ) {
    case UME_LSTART:    /* start of learning */
 rc = 1; break;
    case UME_LEND:      /* end of learning */
 rc = 2; break;
    case UME_TSTART:    /* start of recall test */
 rc = 3; break;
    case UME_RSTART:    /* start of recall */
 rc = 4; break;
    case UME_REND:      /* end of recall */
 rc = 5; break;
    case UME_LOAD:      /* network has been loaded */
 rc = 6; break;
    case UME_SAVE:      /* network is about to be saved */
 rc = 7; break;
    case UME_DELETE:    /* network is about to be deleted */
 rc = 8; break;

default:
 rc = 9; break;
    }
    return( rc );
}

/* um_chkpt is called when User check-pointing is active in the NWorks
   Run/CheckPoints dialog box. um_chkpt( ) is called at the requested
   checkpoints for each PE in each layer with a User Math function. */ if defined(ANSI_HEADER)

NINT um_chkpt( USR_PE *upep, USR_CN_HDR *uchp, USR_LYR *ulp)

#else

NINT um_chkpt( upep, uchp, ulp )

USR_PE     *upep;       /* Pointer to current PE */
USR_CN_HDR *uchp;       /* Pointer to connection header */
USR_LYR    *ulp;

#endif
{
    NINT  rc;    /* return code */
    rc = 0;
    return( rc );
}

/******************************************************************/
/*                                                                */
/*                    User Summation Functions                    */
/*                                                                */
/* Back-propagation summation function used in recurrent neural network */
/*                                                                */
/* This portion of codes correspond to steps 2120 and 2140 in Figure 24 */
/* ============================================================== */
/*                                                                */
/******************************************************************/

/* The um_s_user routines are called if the "sum" bit of the math microcode
   is set and a user summation function is selected in the summation
   scroll window of the layer dialog box */
```

```
#ifdef USER_BACKPROP
/* bkpstdSum */ if defined(ANSI_HEADER)

NINT um_s_backprop( USR_PE *upep, USR_CN_HDR *uchp, USR_LYR *ulp)

#else

NINT um_s_backprop(upep, uchp, ulp)
USR_PE          *upep;          /* Pointer to current PE */
USR_CN_HDR      *uchp;          /* Pointer to connection header */
USR_LYR         *ulp;

#endif
{
 USR_CONN  *ct;         /* Connection Table */
 NINT      wx, wf;
 REAL      wv, accum;
 NINT      sizewts;

if ( IS_INIT )
   return (0);
 if ( IS_PRE_POST )
   return (0);
 accum = 0.0;
   sizewts = ulp->functions.size_wts;
 for ( wx = 0, ct = &uchp->conn_table[0];
       wx < uchp->num_conns; wx++, UPDWXP(ct,sizewts) ) {
   wf = ct->flag;
   wv = ct->weight;
   if ( (wf & CN_DISABLED) != 0 ) continue;
   wf &= CN_WT_MASK;
   if ( wf == CN_SET )  wv *= CLAMP;
   else if ( wf == CN_MOD )  wv *= MODF;
   accum += ( ct->src_pe->out_val * wv);
 }
 upep->sum_val = accum;
 return(0);
} endif
/***********************************************************/
/*                                                         */
/* The interactive activation and competitive (IAC) summation function */
/* used in competitive neural network.                     */
/*                                                         */
/*                                                         */
/* This portion of the codes correspond to step 2220 in Figure 25. */
/* =================================================       */
/*                                                         */
/***********************************************************/ if defined(ANSI_HEADER)

NINT um_s_iac( USR_PE *upep, USR_CN_HDR *uchp, USR_LYR *ulp )

#else

NINT    um_s_iac(upep, uchp, ulp)
USR_PE          *upep;          /* Pointer to current PE */
USR_CN_HDR      *uchp;          /* Pointer to connection header */
USR_LYR         *ulp;

#endif
{
  USR_CONN      *ct;            /* Connection table */
  NINT          wx, wn, count_pn, count_cg, count_fg;
  NINT          count1[18], count2[18], count3[18];
  REAL          wv, ww;
  REAL          excitation;     /* Excitatory connection */
  REAL          inhibition;     /* Inhibitory connection */
  NINT          sizewts;
  LOCAL         pn;             /* Part number */
  LOCAL         cg;             /* Component group */
  LOCAL         fg;             /* Family group */
```

```
if ( IS_INIT )
{
  if ( IS_PRELYR )      /* Initialization to setup constraints */
  {
    count_pn = 0;
    count_cg = 0;
    count_fg = 0;
    pn = 0;
    cg = 0;
    fg = 0;
  }
}
if ( IS_POSTLYR ) return (0);

/* Initialize count values at the beginning of processing */
for ( wn = 2; wn <= 18; wn++ )
{
  count1[wn] = 0;
  count2[wn] = 0;
  count3[wn] = 0;
} sizewts = ulp->functions.size_wts;

for ( wx = 0, ct = &uchp->conn_table[0];
    wx < uchp->num_conns; wx++, UPDWXP(ct, sizewts) )
{
  if ( ct->src_pe->out_val == 1.0 ) /* Identify activated input PE */
  {
    if ( ct->src_pe->cer_val == 35.0 || ct->src_pe->cer_val == 30.0 ||
      ct->src_pe->cer_val == 25.0 ) /* only applied to PN, CG & FG */
    {
      if ( ct->src_pe->cer_val == 35.0 )
      {
        count_pn += 1;
        for ( wn = 2; wn <= 18; wn++ )
        { /* Each connection has weights to identify machines */
          if ( ct->weights[wn] == 35.0 )
          {
            count1[wn] += 1;
            if ( !pn && count1[wn] == count_pn ) pn = 1; /* Same PN */
          }
        }
      }
      if ( ct->src_pe->cer_val == 30.0 )
      {
        count_cg += 1;
        for ( wn = 2; wn <= 18; wn++ )
        {
          if ( ct->weights[wn] == 30.0 )
          {
            count1[wn] += 1;
            if ( !cg && count1[wn] == count_cg ) cg = 1; /* Same CG */
          }
        }
      }
      if ( ct->src_pe->cer_val == 25.0 )
      {
        count_fg += 1;
        for ( wn = 2; wn <= 18; wn++ )
        {
          if ( ct->weights[wn] == 25.0 )
          {
            count3[wn] += 1;
            if ( !fg && count3[wn] == count_fg ) fg = 1; /* Same FG */
          }
        }
      }
    }
  }
}
if ( pn )    /* Setup excitatory constraints for part number (PN) */
{
  for ( wx = 0, ct = &uchp->conn_table[0];
      wx < uchp->num_conns; wx++, UPDWXP(ct, sizewts) )
  {
    if ( ct->src_pe->out_val == 1.0 && ct->src_pe->cer_val == 35.0 )
```

```c
    {
      ct->last_dw = ct->weight;
      ct->weight = 1.0;
    }
    if ( ct->src_pe->out_val == 1.0 && ct->src_pe->cer_val == 30.0 )
    {
      ct->last_dw = ct->weight;
      ct->weight = 0.75;
    }
    if ( ct->src_pe->out_val == 1.0 && ct->src_pe->cer_val == 25.0 )
    {
      ct->last_dw = ct->weight;
      ct->weight = 0.5;
    }
  }
}
if ( cg )    /* Setup excitatory constraints for component group (CG) */
{
  for ( wx = 0, ct = &uchp->conn_table[0];
        wx < uchp->num_conns; wx++, UPDWXP(ct, sizewts) )
  {
    if ( ct->src_pe->out_val == 1.0 && ct->src_pe->cer_val == 30.0 )
    {
      ct->last_dw = ct->weight;
      ct->weight = 0.75;
    }
    if ( ct->src_pe->out_val == 1.0 && ct->src_pe->cer_val == 25.0 )
    {
      ct->last_dw = ct->weight;
      ct->weight = 0.5;
    }
  }
}
if ( fg )    /* Setup excitatory constraints for family group (FG) */
{
  for ( wx = 0, ct = &uchp->conn_table[0];
        wx < uchp->num_conns; wx++, UPDWXP(ct, sizewts) )
  {
    if ( ct->src_pe->out_val == 1.0 && ct->src_pe->cer_val == 25.0 )
    {
      ct->last_dw = ct->weight;
      ct->weight = 0.5;
    }
  }
}
}

/***********************************************************************/
/*                                                                     */
/*     This portion of codes correspond to step 2230 in Figure 25.     */
/*     ==========================================================      */
/*                                                                     */
/***********************************************************************/ if ( IS_PRE_POST )  return (0);

excitation = 0.0;
inhibition = 0.0;
sizewts = ulp->functions.size_vts;

if ( um_micro & MF_SETBIT )
{
  for ( wx = 0, ct = &uchp->conn_table[0];
        wx < uchp->num_conns; wx++, UPDWXP(ct, sizewts) )
  {
    wv = ct->weight;
    if ( (ct->flag & CN_DISABLED) != 0 ) continue;
    if ((ct->src_pe->out_val>0.0 || ct->src_pe->err_val==20.0))
    {
      if ( wv > 0.0 ) excitation += ( ct->src_pe->out_val * wv );
      else  inhibition += ( ct->src_pe->out_val * wv );
    }
  }
} else
{
  for ( wx = 0, ct = &uchp->conn_table[0];
        wx < uchp->num_conns; wx++, UPDWXP(ct, sizewts) )
```

```
        {
           wv = ct->weight;
           if ( (ct->flag & CN_DISABLED) != 0 ) continue;
           if ( ct->src_pe->out_val > 0.0 )
              {
                 if ( wv > 0.0 ) excitation += ( ct->src_pe->out_val * wv );
                 else inhibition += ( ct->src_pe->out_val * wv );
              }
        }
    }
    /* FIRE and MODF represent the alpha and gamma parameters respectively */
    upep->sum_val = FIRE*excitation + MODF*inhibition;
    return(0);
}
/****************************************************************************/
/*                                                                          */
/*                      User Transform routines                             */
/*                                                                          */
/*   Back-propagation transfer function used in recurrent neural network    */
/*                                                                          */
/*                                                                          */
/*  This portion of codes correspond to steps 2120 and 2140 in Figure 24    */
/*  ======================================================================  */
/*                                                                          */
/****************************************************************************/

/* The um_t_user routines are called in any of three cases :

> an INIT button is selected, which sets the UMCF_INIT flag

> the "e*=f'" bit is selected, which sets the UMCF_DERIV flag

> if the "tran" bit of the math microcode is set and a user transfer
  function is selected in the current layer. ( neither UMCF_INIT
  nor UMCF_DERIV will be set )
*/ ifdef USER_BACKPROP
if defined(ANSI_HEADER)

NINT um_t_backprop( USR_PE *upep, USR_CN_HDR *uchp, USR_LYR *ulp)

#else

NINT um_t_backprop(upep, uchp, ulp)
USR_PE     *upep;      /* Pointer to current PE */
USR_CN_HDR *uchp;      /* Pointer to connection header */
USR_LYR    *ulp;       /* Pointer to current layer */ endif
{
  REAL    wr;      /* work real */
  REAL    rv;      /* random value */ if ( IS_INIT )
     return (0);

if ( IS_PRE_POST )
     return (0);

if ( IS_DERIV ) {
     if ( fabs( SCALE ) < NRZRO ) {
        upep->err_val = 0.0;
     } else {
        upep->err_val /= SCALE;      /* remove scaling from error */
        /* Strip off scale and offset from tran value */
        wr = ( upep->trn_val - OFFST ) / SCALE;
        wr = wr * (1.0-wr) * GAIN;
        wr += FP_OFF;

upep->err_val *= wr;
     }
```

```
    else /* not DERIV */ {
      wr = upep->sum_val * GAIN;  /* value to work with */ rv = 0.0;
      if ( (um_micro & MF_LNOISE) != 0 ) rv += LTEMP;
      if ( (um_micro & MF_RNOISE) != 0 ) rv += RTEMP;
      if ( rv > 0.0 ) {
        rv = 0.02 * rv;  /* scale to 2 * percentage */
        wr += rv * ( nrand( ) * RANDINV - 0.5 ); /* add noise */
      } if ( wr > EXPLIM )  wr = 1.0;
      else if ( wr < -EXPLIM )  wr = 0.0;
      else wr = 1.0 / ( 1.0 + exp( -wr ) );
      /* Offset, scale and hard limit */
      upep->trn_val = SCALE * wr + OFFST;
      if ( upep->trn_val < LO_CLIP ) upep->trn_val = LO_CLIP;
      if ( upep->trn_val > HI_CLIP ) upep->trn_val = HI_CLIP;
    }
    return (0);
}
endif
/*********************************************************/
/*                                                       */
/*  The interative activation and competitive (IAC) transfer function  */
/*                                                       */
/*                                                       */
/*  This portion of codes correspond to step 2230 in Figure 26  */
/*  ===================================================  */
/*                                                       */
/*********************************************************/ if defined(ANSI_HEADER)

NINT um_t_iac( USR_PE *upep, USR_CN_HDR *uchp, USR_LYR *ulp)

#else

NINT um_t_iac(upep, uchp, ulp)
USR_PE        *upep;    /* Pointer to current PE */
USR_CN_HDR    *uchp;    /* Pointer to connection header */
USR_LYR       *ulp;     /* Pointer to current layer */ endif
{
  if ( IS_INIT )
    return (0);

if ( IS_PRE_POST ) return (0);

if ( upep->sum_val > 0.0 )
  { /* LCOEF1, LCOEF2, LCOEF3, and GAIN are parameters for
         max, min, decay and rest respectively */
    upep->trn_val += (LCOEF1 - upep->trn_val) * upep->sum_val -
                     LCOEF3 * (upep->trn_val - GAIN);
  } else
  {
    upep->trn_val += (upep->trn_val - LCOEF2) * upep->sum_val -
                     LCOEF3 * (upep->trn_val - GAIN);
  }
  if (upep->trn_val > LCOEF1 ) upep->trn_val = LCOEF1;
  if (upep->trn_val < LCOEF2 ) upep->trn_val = LCOEF2;
  return (0);
}
/*********************************************************/
/*                                                       */
/*              User Defined Output Functions            */
/*                                                       */
/*********************************************************/

/* The um_o_user routines are called if the "output" bit of the math microcod
   is set and a user output function is selected in the output function
   scroll window of the layer dialog box */
```

```
/******************************************************************/
/*                                                                */
/*    User defined output function for competitive network        */
/*                                                                */
/*    This portion of codes correspond to step 2250 in Figure 25  */
/*    ========================================================    */
/*                                                                */
/******************************************************************/ if defined (ANSI_HEADER)
NINT um_o_iac( USR_PE *upep, USR_CN_HDR *uchp, USR_LYR *ulp )
else NINT um_o_iac(upep, uchp, ulp)
USR_PE          *upep;    /* Pointer to current PE */
USR_CN_HDR      *uchp;    /* Pointer to connection header */
USR_LYR         *ulp;     /* Pointer to current layer */ endif
{
  USR_CONN      *ct;              /* Connection table */
  USR_PE        *pew;             /* Winning PE */
  NINT          sizewts;
  NINT          wx,wy;            /* Working integer number */
  NINT          wrk1,wrk2;        /* Working values */
  REAL          wr;               /* Working real number */ if ( IS_INIT ) return (0);

if ( IS_PRELYR )
  { /* Initialization at pre-processing phase */
    ulp->pe_kcur = (USR_PE *)0;
    ulp->val_kcur = -MAXFLOAT;
    wrk1 = 0;
    wrk2 = 0;
  } else if ( !(IS_POSTLYR) )    /* Not at post processing */
  { /* Neuron with higher tranfer value is the current winner */
    wr = upep->trn_val;
    if ( wr > ulp->val_kcur + NRZRO )
    {
      ulp->pe_kcur = upep;
      ulp->val_kcur = wr;
    }
    if ( upep->des_val != (upep+1)->des_val ) /* Not in the same pool */
    { /* /* Current winning neuron is assigned a output value of 1/0 */
      ulp->pe_kcur->out_val = 1.0;
      if ( !(upep->flag & PE_LASTPE) ) /* Not the last neuron in the chain */
      {
        ulp->pe_kcur = (USR_PE *)0;
        ulp->val_kcur = -MAXFLOAT;
      }
    }
  } else         /* At post processing phase */
  {
    wy = 0;
    sizewts = ulp->functions.size_wts;
    if ( (pew = ulp->pe_kcur) != ( USR_PE *)0 )
    {
      for ( wx = 0, ct = &uchp->conn_table[0];
            wx < uchp->num_conns; wx++, UPDWXP(ct,sizewts) )
      {
        if ( (ct->flag & (CN_DISABLED|CN_WT_MASK)) != CN_VAR )
          continue;

/* To determine the no. of time units needed according to run time */
        if ( ct->src_pe->out_val == 1.0 && ct->src_pe->cer_val > 60.0 )
        {
          if ( ct->src_pe->cer_val == 61.0 ) wy += 1;
          if ( ct->src_pe->cer_val == 62.0 ) wy += 2;
          if ( ct->src_pe->cer_val == 64.0 ) wy += 4;
          if ( ct->src_pe->cer_val == 68.0 ) wy += 8;
        }
      }
      for ( wx = 1; wx < wy; wx++ )
```

```
        {
          (pew+wx)->out_val = 1.0;
        }
      }
    }
    /* Check for clash between time units and machine at input layer */
    if ( um_micro & MF_SETBIT )
    {
      if ( upep->out_val == 1.0 || upep->out_val == 0.5 )
      {
        sizewts = ulp->functions.size_wts;
        for ( wx = 0, ct = &uchp->conn_table[0];
          wx < uchp->num_conns; wx++, UPDWXP(ct,sizewts) )
        {
          if ( (ct->flag & (CN_DISABLED|CN_WT_MASK)) != CN_VAR )
            continue;
          if ( ct->src_pe->err_val == 20.0 )
          {
            upep->err_val = ct->src_pe->cer_val;
            wrk1 += 1;
          }
          AUX1 = wrk1;
/*        if ( ct->flag &= CN_USER && ct->src_pe->err_val == 20.0)
            wrk2 += 1;
*/        }
        WORK2 = wrk2;
      }
    }
    return (0);
}
/****************************************************************/
/*                                                              */
/*            User Defined Error Functions                      */
/*                                                              */
/*                                                              */
/* Back-propagation error function used in recurrent neural network. */
/*                                                              */
/* This portion of codes correspond to step 2140 in Figure 24.  */
/* ============================================================ */
/*                                                              */
/****************************************************************/

/* The um_e_user routines are called if the "e-=w" bit of the math microcode
   is set and an error function is selected in the error function
   scroll window of the layer dialog box */ ifdef USER_BACKPROP if defined(ANSI_HEADER)

NINT um_e_backprop( USR_PE *upep, USR_CN_HDR *uchp, USR_LYR *ulp)

#else

NINT um_e_backprop(upep, uchp, ulp)
USR_PE       *upep;    /* Pointer to current PE */
USR_CN_HDR   *uchp;    /* Pointer to connection header */
USR_LYR      *ulp;     /* Pointer to current layer */ endif

{
  if ( IS_INIT )
    return (0);

if ( IS_PRE_POST )  return ( 0 );

upep->err_val = upep->err_val - upep->trn_val;

/* check for apriori error modifications */
  if ( (um_micro & MF_ERRFAC) != 0 )
    upep->err_val *= upep->err_fac;

/* special variant of back-propagation */
  if( fabs( upep->err_val ) < LCOEF3 )
    upep->err_val = 0.0;
  return (0);
```

```
)
#endif

/**********************************************************************/
/*                                                                    */
/*   User defined error function for competitive neural network       */
/*                                                                    */
/*                                                                    */
/*   This portion of codes correspond to step 2250 in Figure 25       */
/*   ==========================================================       */
/*                                                                    */
/**********************************************************************/ if defined (ANSI_HEADER)
NINT um_e_iac( USR_PE *upep, USR_CN_HDR *uchp, USR_LYR *ulp )
else NINT um_e_iac(upep, uchp, ulp)
USR_PE        *upep;    /* Pointer to current PE */
USR_CN_HDR    *uchp;    /* Pointer to connection header */
USR_LYR       *ulp;     /* Pointer to current layer */ endif
{
   USR_CONN    *ct;          /* Connection table */
   NINT        sizewts;
   NINT        wx,wy;        /* Working integer number */
   NINT        wrk1,wrk2;    /* Working values */
   REAL        wr;           /* Working real number */ if ( IS_INIT ) return (0);

if ( IS_PRE_POST ) return(0);

if ( upep->out_val == 1.0 )
   {
     if ( upep->cer_val == 2.0 )
     {
       sizewts = ulp->functions.size_wts;
       for ( wx = 0, ct = &uchp->conn_table[0];
           wx < uchp->num_conns; wx++, UPDWXP(ct,sizewts) )
       {
         if ( (ct->flag & (CN_DISABLED|CN_WT_MASK)) != CN_VAR )
            continue;
         if ( ct->src_pe->cer_val < 20.0 )
         ct->src_pe->err_val += 10.0;
       }
     }
     if ( upep->cer_val == 1.0 && (upep+1)->out_val != 1.0 &&
          upep->des_val == 4.0 ) (upep+1)->out_val = 0.5;
   }

/*     if ( ct->src_pe->err_val == 20.0 )
       {
         upep->err_val = ct->src_pe->cer_val;
         wrk1 += 1;
       }
       AUX1 = wrk1;
*/
   return (0);
}

/**********************************************************************/
/*                                                                    */
/*                  User Defined Learn Functions                      */
/*                                                                    */
/*                                                                    */
/*   Back-propagation learn function used in recurrent neural network */
/*   during learning phase.                                           */
/*                                                                    */
/**********************************************************************/

/* The um_l_user routines are called if the "learn" bit of the math microcode
   is set and a user learn function is selected in the learn function
   scroll window of the layer dialog box */
```

```
#ifdef USER_BACKPROP
if defined(ANSI_HEADER)
NINT um_1_backprop( USR_PE *upep, USR_CN_HDR *uchp, USR_LYR *ulp)
else NINT um_1_backprop(upep, uchp, ulp)
USR_PE      *upep;      /* Pointer to current PE */
USR_CN_HDR  *uchp;      /* Pointer to connection header */
USR_LYR     *ulp;       /* Pointer to current layer */ endif

Figure 27:
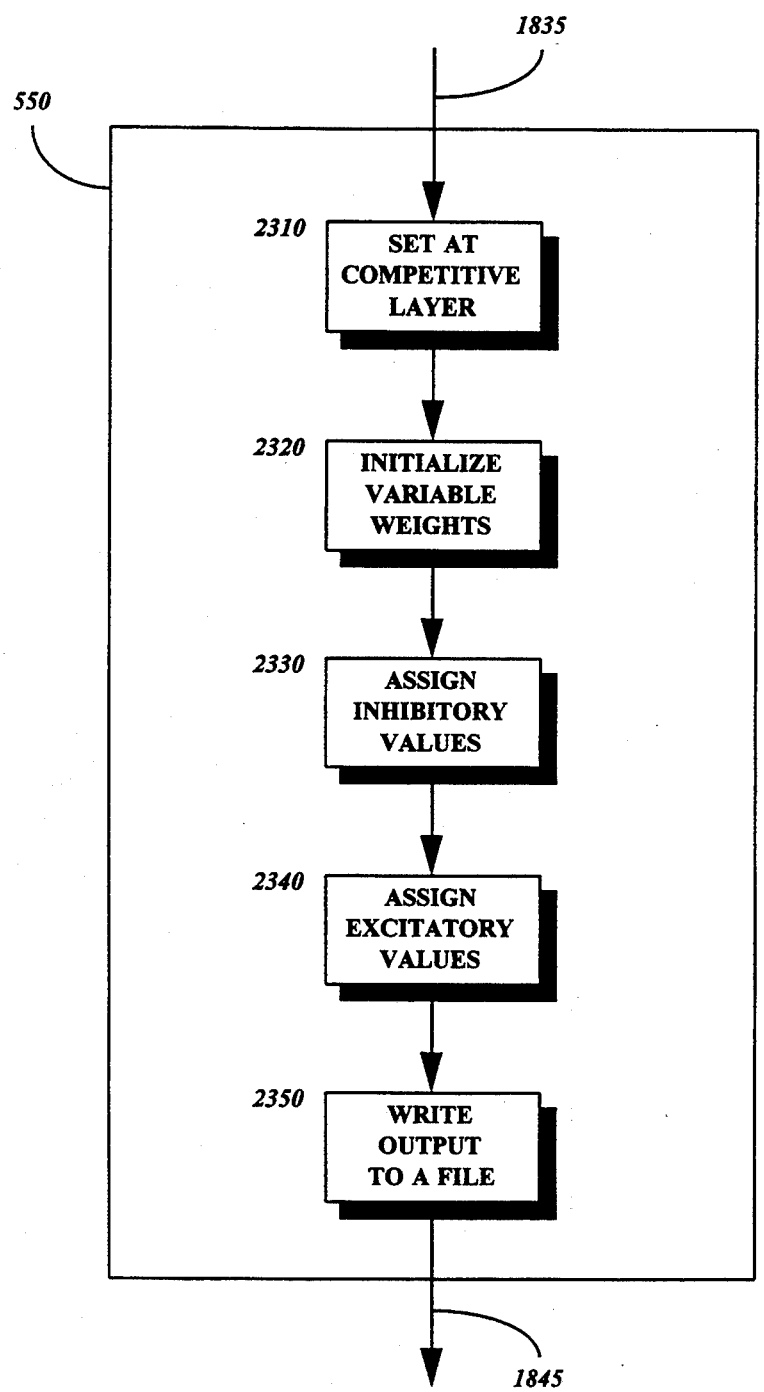
FIG. 27 is one embodiment of a detailed block diagram of one embodiment of the steps of updating connection weights of FIG. 22 for propagating constraints between competitive neural network 1700 and trained recurrent neural network 130.

{
  REAL    lcoef, wv;
  NINT    wx;
  USR_CONN *ct;         /* Connection Table */
  NINT    sizewts;

if ( IS_INIT )
    return (0);

if ( IS_PRE_POST )  return ( 0 );

lcoef = LCOEF1 * upep->err_val;

sizewts = ulp->functions.size_wts;
  for ( wx = 0, ct = &uchp->conn_table[0];
      wx < uchp->num_conns; wx++, UPDWXP(ct,sizewts) ) {
    if ( (ct->flag & (CN_DISABLED|CN_WT_MASK)) != CN_VAR )
      continue;      /* Not a variable weight */
    /* compute the weight change */
    wv = lcoef * ct->src_pe->out_val + LCOEF2 * ct->last_dw;
    ct->last_dw = wv;
    ct->weight += wv;
  }
  return ( 0 );
}
endif
/**********************************************************************/
/*                                                                    */
/* This is the user defined learn function for competitive network    */
/*                                                                    */
/*    This portion of codes correspond to step 2320 in Figure 27      */
/*    =============================================================   */
/*                                                                    */
/**********************************************************************/ if defined(ANSI_HEADER)

NINT um_1_iac( USR_PE *upep, USR_CN_HDR *uchp, USR_LYR *ulp)

#else

NINT um_1_iac(upep, uchp, ulp)
USR_PE        *upep;        /* Pointer to current PE */
USR_CN_HDR    *uchp;        /* Pointer to connection header */
USR_LYR       *ulp;         /* Pointer to current layer */ endif

{
  REAL      wv;
  NINT      wx,ww;
  USR_CONN  *ct;            /* Connection table */
  NINT      sizewts;

if ( IS_INIT ) return (0);
/*
  sizewts = ulp->functions.size_wts;

for ( wx = 0, ct = &uchp->conn_table[0];
        wx < uchp->num_conns; wx++, UPDWXP(ct,sizewts) )
  {
    for ( ww = 2; ww <= 18; ww++ )
    {
```

```
            if ( ww == (int)upep->err_val )
              ct->weights[ww] = 0.0;
          }
      }
    } else */     /* Not init */
    {
      if ( IS_PRE_POST ) return (0);

sizewts = ulp->functions.size_wts;

if ( upep->out_val < NRZRO ) return (0);

/*    if ( um_micro & MF_SETBIT )
      {
        if ( upep->out_val == 1.0 && upep->cer_val == 1.0 )
        {
          for ( wx = 0, ct = &uchp->conn_table[0];
            wx < uchp->num_conns; wx++, UPDWXP(ct,sizewts) )
          {
            if ( (ct->flag & (CN_DISABLED|CN_WT_MASK)) != CN_VAR )
              continue;
            if ( ct->flag & CN_USER && ct->src_pe->err_val == 20.0 )
            {
              if ( ct->src_pe->out_val > 0.0 ) wv = ct->src_pe->cer_val;
              else wv = -(ct->src_pe->cer_val);
              ct->last_dw = wv;
              ct->weight = wv;
            }
          }
        }
      } else */          /* Constraint Propagation */
/****************************************************************************/
/*                                                                          */
/*   This portion of codes correspond to step 2330 in Figure 27             */
/*   ================================================================       */
/*                                                                          */
/****************************************************************************/ if ( upep->out_val == 1.0 )
      {
        if ( upep->cer_val == 1.0 )   /* Time units */
        {
          for ( wx = 0, ct = &uchp->conn_table[0];
            wx < uchp->num_conns; wx++, UPDWXP(ct,sizewts) )
          {
            if ( (ct->flag & (CN_DISABLED|CN_WT_MASK)) != CN_VAR )
              continue;    /* Not a variable weight */
            /* Connections between time unit and machine at input layer */
            if ( ct->src_pe->err_val == 20.0 )
              ct->weight = -0.2;
            /*  ct->flag &= CN_USER; */ /* To flag connection for inhibition */
          }
        } else if ( upep->cer_val == 2.0 ) /* Machine units in IAC layer */
        {
          for ( wx = 0, ct = &uchp->conn_table[0];
            wx < uchp->num_conns; wx++, UPDWXP(ct,sizewts) )
          {
            if ( (ct->flag & (CN_DISABLED|CN_WT_MASK)) != CN_VAR )
              continue;        /* Not a variable weight */

/* Connections between machine and machine */
            if ( ct->src_pe->err_val == 20.0 )
              ct->weight = -0.1;
            /*  ct->flag &= CN_USER; */

/* Connections between machine and part number */
            if ( ct->src_pe->out_val == 1.0 && ct->src_pe->cer_val == 35.0 )
              ct->weights[(int)upep->err_val] = 35.0;

/* Connections between machine and component group */
            if ( ct->src_pe->out_val == 1.0 && ct->src_pe->cer_val == 30.0 )
              ct->weights[(int)upep->err_val] = 30.0;
```

```c
        /* Connections between machine and family group */
        if ( ct->src_pe->out_val == 1.0 && ct->src_pe->cer_val == 25.0 )
            ct->weights[(int)upep->err_val] = 25.0;
        }
    }

/* Locate the next PE in the time unit pool to learn */
/*      if ( upep->cer_val == 1.0 && (upep+1)->out_val != 1.0 )
        {
        if ( (upep+1)->des_val == 6.0 )
            (upep+1)->out_val = 0.5;
        else if ( (upep+1)->des_val == 7.0 )
        {
            (upep-9)->out_val = 0.5;
            for ( wx=1; ; wx++ )
            {
                if ( (upep-wx)->des_val==5.0 && (upep-wx)->out_val==1.0 )
                {
                    if ( (upep-(wx+1))->des_val==6.0 )
                    {
                        (upep-(wx+9))->out_val=0.5;
                        for ( ww=1; ; ww++)
                        {
                            if ((upep-ww)->des_val == 4.0 && (upep-ww)->out_val == 1.0
                            (upep-(ww+1))->out_val=0.5;
                            break;
                        }
                    } else
                    {
                        (upep-(wx+1))->out_val = 0.5;
                        break;
                    }
                }
            }
        }
    }       */
}
/***************************************************************************/
/*                                                                         */
/*    This portion of codes correspond to step 2340 in Figure 27           */
/*    ===================================================                  */
/*                                                                         */
/***************************************************************************/ else if ( upep->out_val == 0.5 )
    {
        sizewts = ulp->functions.size_wts;
        for ( wx = 0, ct = &uchp->conn_table[0];
              wx < uchp->num_conns; wx++, UPDWXP(ct,sizewts) )
        {
            if ( (ct->flag & (CN_DISABLED|CN_WT_MASK)) != CN_VAR )
                continue;

if ( ct->src_pe->out_val == 1.0 )
            {
                if ( ct->src_pe->cer_val == 35.0 )
                    ct->weights[(int)upep->err_val] = 35.0;

if ( ct->src_pe->cer_val == 30.0 )
                    ct->weights[(int)upep->err_val] = 30.0;

if ( ct->src_pe->cer_val == 25.0 )
                    ct->weights[(int)upep->err_val] = 25.0;
            }
        }
    }
}
return(0);
} endif /* not DPK */

/* setup_umath is called just once as part of NeuralWorks initialization code
   It is used to bind user names and function pointers to the function
   indices. */
```

```
#ifndef TRANS_PHYS

IMPORT  NINT DR_Sum, DR_Tran, DR_Compf, DR_Learn, DR_ErrF, DR_Noise;

IMPORT  NINT AddUserFunction ARGLIST(( NINT *, NINT, TEXT *, TEXT *,
            NINT (*)(), NINT, NINT ));

/* The arguments to AddUserFunction ( dir, index, my_name, menu_name,
   FNP(fn_ptr), min_nwtflds , default_nwtflds)

are as follows :

> a pointer to one of the following "directories" -
   DR_Sum, DR_Tran, DR_Compf, DR_Learn, DR_ErrF, DR_Noise -
   which must not be modified in any fashion!

> index of the function

> the actual name of the function as it appears in the C code
   ( used to generate Designer Pack code )

> name of the function to appear on the Layer Edit menu

> actual function address, which will be bound to the layer; example
   FNP(um_1_whatsit). The FNP macro is needed to work properly with Designer
   Pack.

> minimum number of "weight fields" the function requires.

> default number of "weight fields" the function requires.
*/
#ifdef DPK
#define FNP(a)  0
#else
#define FNP(a)  a
#endif /* not DPK */

NINT  setup_umath( NO_ARGS )
{
/* Sum functions */ ifdef USER_BACKPROP
 AddUserFunction(&DR_Sum,  LS_USER1,
     "um_s_backprop", "bkpstdSum", FNP(um_s_backprop), 1, 1);
endif AddUserFunction(&DR_Sum, LS_USER2,
     "um_s_iac", "IAC", FNP(um_s_iac), 18, 18);

/* Transfer functions */ ifdef USER_BACKPROP
 AddUserFunction(&DR_Tran, LT_USER1,
     "um_t_backprop", "bkpstdTran", FNP(um_t_backprop), 1, 1);
endif AddUserFunction(&DR_Tran, LT_USER2,
     "um_t_iac", "IAC", FNP(um_t_iac), 18, 18);

/* Output functions */

AddUserFunction(&DR_Compf, LU_USER2,
     "um_o_iac", "IAC", FNP(um_o_iac), 18, 18);

/* Error functions */ ifdef USER_BACKPROP
 AddUserFunction(&DR_ErrF, LE_USER1,
     "um_e_backprop", "bkpstderr", FNP(um_e_backprop), 1, 1);
endif AddUserFunction(&DR_ErrF, LE_USER2,
     "um_e_iac", "IAC", FNP(um_e_iac), 18, 18);

/* Learn functions */
```

```
#ifdef USER_BACKPROP

AddUserFunction(&DR_Learn, LL_USER3,
    "um_1_backprop", "bkpstdLrn", FNP(um_1_backprop), 2, 2);
endif AddUserFunction(&DR_Learn, LL_USER4,
    "um_1_iac", "IAC", FNP(um_1_iac), 18, 18);
}
#endif /* not TRANS_PHYS */
```

What is claimed:

1. A computer neural network scheduling system adapted for scheduling of a manufacturing resource on a factory floor, the scheduling process producing a schedule for a list of work orders given the manufacturing resource having at least one machine, the scheduling system comprising:
a sequencer, for sorting said list of work orders in a sequence for scheduling in accordance with a work orders priority index;
a scheduling engine, for producing a schedule for a sequence of work orders in accordance with said sorted list of work orders and capacity of said manufacturing resource, comprising:
a trained recurrent neural network, comprising a scheduling knowledge base, for predicting possible schedules for said sequence of work orders in accordance with said sorted list of work orders and said capacity of manufacturing resource and in accordance with weights;
a competitive neural network, responsive to said trained recurrent neural network, for producing a schedule in accordance with said sorted list of work orders; and
a constraint relaxation module, responsive to said competitive neural network, for relaxing constraints in the event of an unsuccessful assignment of a work order; and knowledge processor, comprising:
an encoder, responsive to said sequencer, for encoding said sorted list of work orders and capacity of said manufacturing resource to a neural network format for input into said scheduling engine; and
a decoder, responsive to said scheduling engine, for decoding said schedule from said scheduling engine into a format suitable for storage into a database.

2. The computer neural network scheduling system of claim 1, wherein said sequencer comprises:
a trained feedforward neural network, comprising an operational policy knowledge base, for determining operational policies in accordance with machine workload and performance measure; and
means for calculating said priority index in accordance with said operational policies for each of said work orders.

3. The system as in claim 1 further comprising:
first connections for connecting an input layer of said trained recurrent neural network to an output layer of said competitive neural network;
means for setting up weights of said first connections in accordance with a work order from said sorted list of work orders and in accordance with said capacity of manufacturing resource prior to scheduling of said work order;
means for updating said weights of said first connections in accordance with output of said competitive neural network after scheduling of said work order; and
second connections, between an output layer of said trained recurrent neural network and an output layer of said competitive neural network, for propagating said possible schedules to said competitive neural network.

4. The system as in claim 1, wherein said competitive neural network further comprises means for neurons to interact and compete among themselves to determine output, that represent said schedule, in accordance with said weights from said first connections and in accordance with said possible schedules from said second connections.

5. The system as in claim 1, wherein said constraint relaxation module further comprises a user intervention module for allowing a user to interact with said scheduling process directly.

6. A computer-based scheduling method adapted for scheduling of manufacturing resource on a factory floor, the scheduling process producing a schedule for a list of work orders given the manufacturing resource having at least one machine, the computer-based scheduling method comprising the steps of:
(a) determining/generating operational policies from a trained feedforward neural network using machine workload and performance measure as input;
(b) calculating a priority index of each said work order using said operational policies;
(c) sorting said list of work orders in accordance with said priority index;
(d) selecting a work order with the highest said priority index from said sorted list of work orders;
(e) initializing weights, for connections between an input layer of a trained recurrent neural network and an output layer of a competitive neural network in accordance with said selected work order and in accordance with a capacity of said manufacturing resource;
(f) predicting possible schedules in accordance with said selected work order and in accordance with a capacity of said manufacturing resource, said predicting being performed by said trained recurrent neural network;
(g) determining outputs that represent a schedule by allowing neurons in the competitive neural network to interact and compete among themselves in accordance with said weights and in accordance with said possible schedules, said determining being performed by said competitive neural network;
(h) updating said weights for connections between an input layer of said trained recurrent neural network and an output layer of said competitive neural network in accordance with said output; and (i) selecting a next work order with the next highest priority index from said sorted list of work orders and repeating steps (e) to (h) until all said work orders are scheduled.

7. The computer-based scheduling method of claim 6, further comprising a method for handling situations when a work order assignment is unsuccessful, the method comprising the steps of:

relaxing soft constraints, starting with the least important group of constraints, when an assignment is not successful by restoring said weights that represent the said constraint group to their initial values; and allowing a user to interact with said scheduling process when no more said group of constraints can be relaxed.

8. A computer neural network scheduling system adapted for scheduling of manufacturing resource on a factory floor, the scheduling process producing a schedule for a list of work orders given the manufacturing resource having at least one machine, the scheduling system comprising:

a sequencer, for sorting said list of work orders in a sequence for scheduling in accordance with a work orders priority index;

a scheduling engine, for producing a schedule for a sequence of work orders in accordance with said sorted list of work orders and capacity of said manufacturing resource, comprising:

a trained recurrent neural network, comprising a scheduling knowledge base, for predicting possible schedules for said sequence of work orders in accordance with said sorted list of work orders and said capacity of manufacturing resource and in accordance with weights;

a competitive neural network, responsive to said trained recurrent neural network, for producing a schedule in accordance with said sorted list of work orders; and a constraint relaxation module, responsive to said competitive neural network, for relaxing constraints in the event of an unsuccessful assignment of a work order; and a knowledge of processor, comprising:

an encoder, responsive to said sequencer, for encoding said sorted list of work orders and capacity of said manufacturing resource to a neural network format for input into said scheduling engine; and a decoder, responsive to said scheduling engine, for decoding said schedule from said scheduling engine into a format suitable for storage into a database.

9. The computer neural network scheduling system of claim 8, wherein said sequencer comprises:

a trained feedforward neural network, comprising an operational policy knowledge base, for determining operational policies in accordance with machine workload and performance measure; and a calculation mechanism for calculating said priority index in accordance with said operational policies for each of said work orders.

10. The system of claim 9 wherein said trained feedforward neural network further comprises:

a learning mechanism, responsive to training data for adjusting weights, to produce said operational policy knowledge base;

a predicting mechanism, responsive to said operational policy knowledge base, for predicting said operational policies in accordance with input data and in accordance with said weights; and an input mechanism for entering training data comprising typical machine workload, performance measure, and corresponding operational policies.

11. The system of claim 8 wherein said trained recurrent neural network further comprises:

an input mechanism for entering said training data comprising typical work orders, capacity of said manufacturing resource, and corresponding schedules;

a learning mechanism, responsive to training data for adjusting weights, for producing a scheduling knowledge base; and a predicting mechanism, responsive to said scheduling knowledge base, for predicting schedules in accordance with said weights.

12. The system as in claim 8 further comprising:

first connections, for connecting an input layer of said trained recurrent neural network and an output layer of said competitive neural network;

a first determination mechanism for setting up weights of said first connections in accordance with a work order from said sorted list of work orders and in accordance with said capacity of manufacturing resource prior to scheduling of said work order;

a second determination mechanism for updating said weights of said first connections in accordance with output of said competitive neural network after scheduling of said work order; and second connections, between an output layer of said trained recurrent neural network and an output layer of said competitive neural network, for propagating said possible schedules to said competitive neural network.

13. The system as in claim 8, wherein said competitive neural network further comprises a mechanism allowing neurons to interact and compete among themselves to determine output, that represent said schedule, in accordance with said weights from said first connections and in accordance with said possible schedules from said second connections.

14. The system as in claim 8, wherein said constraint relaxation module further comprises a user intervention module for allowing a user to interact with said scheduling process directly.

15. The computer neural network scheduling system of claim 8, further comprising a computer-based simulator for modeling said scheduling process for generating said training data.

16. The system of claim 15 wherein said computer-based simulator comprises:

a first modeling means, for modeling the creation of said sorted list of work orders, in accordance with machine workload and operational policies;

a second modeling means, responsive to said sorted list of work orders, for modeling scheduling logic of human expert schedulers of said factory floor to produce a schedule and their corresponding performance measures in accordance with said capacity of manufacturing resource; and means for sorting a list of work orders according to a priority index determined from said operational policies.

17. A neural network based scheduling method adapted for scheduling of a manufacturing resource on a factor floor, the scheduling process producing a schedule for a sorted list of work orders given the manufacturing resource having at least one machine, the neural network based scheduling method comprising the steps of:
- (a) selecting a work order from a sorted list of work orders;
- (b) initializing weights for connections between an input layer of a first trained neural network and an output layer of a second trained neural network in accordance with said selected work order and in accordance with a capacity of said manufacturing resource;
- (c) predicting possible schedules in accordance with said selected work order and in accordance with said capacity of said manufacturing resource, said predicting being performed by said first neural network;
- (d) determining output that represents a schedule by allowing neurons in said second trained neural network to interact and compete among themselves in accordance with said weights and in accordance with said possible schedules, said determining being performed by said second neural network;
- (e) updating said weights for connections between an input layer of said first trained neural network and an output layer of said second trained neural network in accordance with said output; and
- (f) selecting a next work order from said sorted list of work orders and repeating steps (a) to (e) until all said work orders are scheduled.

18. The computer-based scheduling method of claim 17, further comprising a method for handling situations when a work order assignment is unsuccessful, comprising the steps of:
- relaxing soft constraints, starting with the least important group of constraints, when an assignment is not successful by restoring said weights that represent the said constraint group to their initial values; and
- allowing a user to interact with said scheduling process when no more said group of constraints can be relaxed.

19. The computer-based scheduling method of claim 17 wherein said sorted list of work is produced using the steps of:
- determining/generating operational policies from a third trained neural network using machine workload and performance measure as input;
- calculating a priority index of each said work order using said operational policies; and
- sorting said work orders in accordance with said priority index.

20. A computer neural network scheduling system adapted for scheduling of a manufacturing resource on a factory floor, the scheduling process producing a schedule for a sorted list of work orders given the manufacturing resource having at least one machine, the computer neural network scheduling system comprising:
- a first neural network, comprising a scheduling knowledge base, for predicting possible schedules for said sorted list of work orders in accordance with a capacity of said manufacturing resource and a first set of weights;
- a second neural network, responsive to said first neural network, for producing a schedule in accordance with said sorted list of work orders and said capacity of said manufacturing resource and in accordance with a second set of weights;
- a constraint relaxation module for relaxing constraints by adjusting said second set of weights in the event of unsuccessful assignment of a work order;
- first connections for connecting an input layer of said first neural network and an output layer of said second neural network;
- a first determination mechanism for setting up weights of said first connections in accordance with a work order from said sorted list of work orders and in accordance with said capacity of said manufacturing resource prior to scheduling of said work order;
- a second determination mechanism for updating said weights of said first connections in accordance with output of said second neural network after scheduling of said work order; and
- second connections, between an output layer of said first neural network and an output layer of said second neural network, for propagating said possible schedules to said second neural network.

21. The system of claim 20 wherein said first neural network further comprises:
- an input mechanism for entering training data comprising typical work orders, capacity of said manufacturing resource, and corresponding schedules;
- a learning mechanism, responsive to said training data for adjusting weights, for producing a scheduling knowledge base; and
- a predicting mechanism, responsive to said scheduling knowledge base, for predicting schedules in accordance with said sorted list of work orders and said capacity of said manufacturing resource and in accordance with said first set of weights.

22. The system as in claim 20 wherein said second neural network further comprises a mechanism allowing neurons to interact and compete among themselves to determine output which represents said schedule, in accordance with said first set of weights from said first neural network and in accordance with said possible schedules from said second neural network.

23. The system as in claim 20 wherein said constraint relaxation module further comprises a user intervention module for allowing a user to interact with said scheduling process directly.

24. The computer neural network scheduling system of claim 20, further comprising a computer-based simulator for modeling said scheduling process for generating said training data.

25. The system of claim 24 wherein said computer-based simulator comprises:
- a first modeling means, for modeling the creation of said sorted list of work orders, in accordance with machine workload and operational policies;
- a second modeling means, responsive to said sorted list of work orders, for modeling scheduling logic of human expert schedulers of said factory floor to produce a schedule and corresponding performance measures in accordance with said capacity of manufacturing resource; and means for sorting a list of work orders according to a priority index determined from said operational policies.

26. A computer neural network scheduling system adapted for scheduling of a manufacturing resource on a factory floor, the scheduling process producing a schedule for a list of work orders given the manufacturing resource having at least one machine, the computer neural network scheduling system comprising:

a trained feedforward neural network, comprising an operational policy knowledge base, for determining operational policies in accordance with machine workload and performance measure;

a calculation mechanism, responsive to said operational policies, for calculating a priority index of each work order for sorting said list of work orders;

a trained recurrent neural network, comprising a scheduling knowledge base, for predicting possible schedules in accordance with said sorted list of work orders and a capacity of said manufacturing resource and in accordance with a first set of weights;

a competitive neural network, responsive to said trained recurrent neural network, for producing a schedule in accordance with said sorted list of work orders and said capacity of manufacturing resource and in accordance with a second set of weights; and a constraint relaxation module, for relaxing constraints by adjusting said second set of weights in the event of an unsuccessful assignment of a work order.

27. The system of claim 26 wherein the trained recurrent neural network further comprises:

an input mechanism for entering training data comprising typical work orders, capacity of manufacturing resource, and corresponding schedules;

a learning mechanism, responsive to said training data, for adjusting said first set of weights, for producing said scheduling knowledge base; and a predicting mechanism responsive to said scheduling knowledge base, for predicting schedules in accordance with said sorted list of work orders and said capacity of manufacturing resource and in accordance with said first set of weights.

28. The system of claim 26 further comprising:

first connections, for connecting an input layer of said trained recurrent neural network and an output layer of said competitive neural network;

a first determination mechanism for setting up weights of said first connections in accordance with a work order from said sorted list of work orders and in accordance with said capacity of manufacturing resource prior to scheduling of said work order;

a second determination mechanism for updating said weights of said first connections in accordance with output of said competitive neural network after scheduling of said work order; and second connections, between an output layer of said trained recurrent neural network and an output layer of said competitive neural network, for propagating said possible schedules to said competitive neural network.

29. The system as in claim 26, wherein said competitive neural network further comprises a mechanism allowing neurons to interact and compete among themselves to determine output, that represent said schedule, in accordance with said weights from said first connections and in accordance with said possible schedules from said second connections.

30. The system as in claim 26, wherein said constraint relaxation module further comprises a user intervention module for allowing a user to interact with said scheduling process directly.

31. A computer neural network scheduling system adapted for scheduling of a manufacturing resource on a factory floor, the scheduling producing a schedule for a list of work orders given the manufacturing resource having at least one machine, the computer neural network scheduling system comprising:

a first neural network, comprising an operational policy knowledge base, for determining operational policies in accordance with machine workload and performance measure;

a calculation mechanism, responsive to said operational policies, for calculating a priority index of each work order for sorting said list of work orders;

a second neural network, comprising a scheduling knowledge base, for predicting possible schedules in accordance with said sorted list of work orders and capacity of said manufacturing resource and in accordance with a first set of weights;

a third neural network, responsive to said second trained neural network, for producing a schedule in accordance with said sorted list of work orders and said capacity of manufacturing resource and in accordance with a second set of weights;

a constraint relaxation module, for relaxing constraints by adjusting said second set of weights in the event of an unsuccessful assignment of a work order;

first connections, for connecting an input layer of said second neural network and an output layer of said third neural network;

first determination mechanism for setting up weights of said first connections in accordance with a work order from said sorted list of work orders and in accordance with said capacity of manufacturing resource prior to scheduling of said work order;

a second determination mechanism for updating said weights of said first connections in accordance with output of said third neural network after scheduling of said work order; and second connections, between an output layer of said second neural network and an output layer of said third neural network, for propagating said possible schedules to said third neural network.

32. The system of claim 31 wherein the second neural network further comprises:

an input mechanism for entering training data comprising typical work orders, capacity of manufacturing resource, and corresponding schedules;

a learning mechanism, responsive to said training data for adjusting said first set of weights, for producing said scheduling knowledge base; and a predicting mechanism responsive to said scheduling knowledge base, for predicting schedules in accordance with said sorted list of work orders and said capacity of manufacturing resource and in accordance with said first set of weights.

33. The system as in claim 31, wherein said third neural network further comprises a mechanism allowing neurons to interact and compete among themselves to determine output that represents said schedule, in accordance with said weights from said first connections and in accordance with said possible schedules from said second connections.

34. The system as in claim 31, wherein said constraint relaxation module further comprises a user intervention module for allowing a user to interact with said scheduling process directly.

* * * * *

UNITED STATES PATENT AND TRADEMARK OFFICE
CERTIFICATE OF CORRECTION

PATENT NO. : 5,432,887

DATED : July 11, 1995

INVENTOR(S) : Khaw, Fook C.

It is certified that error appears in the above-indentified patent and that said Letters Patent is hereby corrected as shown below:

Column 3, line 51, delete "is" and insert therefor --shows--.

Column 4, line 45, delete "is" and insert therefor --shows--.

Column 4, line 48, delete "schedgle" and insert therefor --schedule--.

Column 9, line 24, delete "$PR_iw$ and insert therefor --$PR_i*w$--.

Column 16, line 16, delete "min < rest < 0" and insert therefor --min ≤ rest ≤ 0--.

Signed and Sealed this

Twenty-seventh Day of February, 1996

Attest:

BRUCE LEHMAN

*Attesting Officer*     Commissioner of Patents and Trademarks